(12) United States Patent
Ma et al.

(10) Patent No.: US 11,122,609 B2
(45) Date of Patent: Sep. 14, 2021

(54) SYSTEMS AND METHODS FOR GRANT-FREE UPLINK TRANSMISSIONS

(71) Applicants: Jianglei Ma, Ottawa (CA); Liqing Zhang, Ottawa (CA); Yu Cao, Kanata (CA)

(72) Inventors: Jianglei Ma, Ottawa (CA); Liqing Zhang, Ottawa (CA); Yu Cao, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/818,248

(22) Filed: Mar. 13, 2020

(65) Prior Publication Data

US 2020/0221486 A1 Jul. 9, 2020

Related U.S. Application Data

(63) Continuation of application No. 15/588,229, filed on May 5, 2017, now Pat. No. 10,595,336.
(Continued)

(51) Int. Cl.
*H04W 72/12* (2009.01)
*H04W 72/04* (2009.01)
(Continued)

(52) U.S. Cl.
CPC ......... *H04W 72/1289* (2013.01); *H04L 1/189* (2013.01); *H04L 1/1812* (2013.01);
(Continued)

(58) Field of Classification Search
CPC ..... H04L 1/1812; H04L 1/1896; H04L 1/189; H04L 1/1893; H04W 72/042;
(Continued)

(56) References Cited

U.S. PATENT DOCUMENTS

2014/0254544 A1 9/2014 Kar Kin Au et al.
2016/0302076 A1 10/2016 Chou et al.
(Continued)

FOREIGN PATENT DOCUMENTS

CN 105072690 A 11/2015
CN 105356967 A 2/2016
(Continued)

OTHER PUBLICATIONS

Nokia, Alcatel-Lucent Shanghai Bell, "Relationship between grant-free and grant-based access" [online], 3GPP TSG-RAN WG1#86 R1-1609655, Internet URL: http://www.3gpp.org/ftp/tsg_ran/WG1_RL1/TSGR1_769/Docs/R1-166752.zip> Aug. 26, 2016, total 6 pages.
(Continued)

*Primary Examiner* — Kyaw Z Soe

(57) ABSTRACT

Systems and methods are disclosed for performing combined grant-free and grant-based UL resource allocation. In a particular embodiment, a network entity sends a first type of UL transmission resource assignment selected from two types of UL transmission resource assignment mechanisms to a UE for grant-free transmission and a second type of UL transmission resource assignment from two types of UL transmission resource assignment mechanism to a UE for grant based transmission. The network entity then receives a first data transmission from the UE for grant free transmission using an assigned transmission resource and a second data transmission from the UE for grant based transmission using an assigned transmission resources. Other embodiments pertain to changing the resource allocation scheme from grant free to grant based for a UE, or vice versa. Examples reasons for doing so may include HARQ re-transmisisons.

20 Claims, 28 Drawing Sheets

Related U.S. Application Data

(60) Provisional application No. 62/422,560, filed on Nov. 15, 2016, provisional application No. 62/423,186, filed on Nov. 16, 2016, provisional application No. 62/455,583, filed on Feb. 6, 2017.

(51) Int. Cl.
*H04L 1/18* (2006.01)
*H04W 72/14* (2009.01)

(52) U.S. Cl.
CPC .......... *H04L 1/1893* (2013.01); *H04L 1/1896* (2013.01); *H04W 72/042* (2013.01); *H04W 72/1268* (2013.01); *H04W 72/14* (2013.01); *H04L 1/1822* (2013.01)

(58) Field of Classification Search
CPC ......... H04W 72/1268; H04W 72/1289; H04W 72/14; H04W 72/12
See application file for complete search history.

(56) References Cited

U.S. PATENT DOCUMENTS

| | | | |
|---|---|---|---|
| 2016/0302231 A1 | 10/2016 | Chien et al. | |
| 2017/0311337 A1 | 10/2017 | Mo et al. | |
| 2018/0035406 A1 | 2/2018 | Hao et al. | |
| 2018/0077719 A1 | 3/2018 | Nory et al. | |
| 2018/0092122 A1 | 3/2018 | Babaei et al. | |
| 2018/0092125 A1* | 3/2018 | Sun | H04W 74/02 |
| 2018/0098349 A1* | 4/2018 | Sun | H04W 72/0406 |
| 2018/0124813 A1 | 5/2018 | Li et al. | |

FOREIGN PATENT DOCUMENTS

| | | |
|---|---|---|
| CN | 105722225 A | 6/2016 |
| CN | 106060937 A | 10/2016 |
| JP | 2016514416 A | 5/2016 |
| JP | 2016191057 A | 11/2016 |
| JP | 2019208086 A | 12/2019 |
| WO | 2016099345 A1 | 6/2016 |

OTHER PUBLICATIONS

Samsung, "Discussion on grant-free/contention-based non-orthogonal multiple access" [online], 3GPP TSG-RAN WG1#86 R1-166752, Internet URL: http://www.3gpp.org/ftp/tsg_ran/WG1_RL1/TSGR1_769/Docs/R1-166752.zip> Aug. 26, 2016, total 6 pages.
Intel Corporation, "Grant-free UL transmissions in NR" [online], 3GPP TSG-RAN WG1#86b R1-1609499, Internet URL: http://www.3gpp.org/ftp/tsg_ran/WG1_RL1/TSGR1_86b/Docs/R1-1609499.zip>, Oct. 14, 2016, total 9 pages.
Catt, "Discussion on UL grant-free transmission" [online], 3GPP TSG RAN WG1 #87 R1-1611400, Internet URL: http://www.3gpp.org/ftp/tsg_ran/WG1_RL1/TSGR1_87/Docs/R1-1611400.zip>, Nov. 5, 2016, total 4 pages.
Samsung, "UL URLLC Transmissions" [online], 3GPP TSG RAN WG1 #87 R1-1612545, Internet URL: http://www.3gpp.org/ftp/tsg_ran/WG1_RL1/TSGR1_87/Docs/R1-1612545.zip>, Nov. 5, 2016. total 5 pages.
Nokia, Alcatel-Lucent Shanghai Bell, "Grant-free to grant-based switching for URLLC" [online], 3GPP TSG RAN WG1 #87 R1-1612253, Internet URL: http://www.3gpp.org/ftp/tsg_ran/WG1_RL1/TSGR1_87/Docs/R1-1612253.zip>, Nov. 5, 2016, total 5 pages.
Ericsson, "Framework For Grant-free Access" [online], 3GPP TSG RAN WG1#87 R1-1612955, Internet URL: http://www.3gpp.org/ftp/tsg_ran/WG1_RL1/TSGR1_87/Docs/R1-1612955.zip>, Nov. 4, 2016, total 6 pages.
Huawei, HiSilicon:"Resource allocation and management for grant-free UL", 3GPP TSG RAN WG1 Meeting #86bis, R1-1608861, Lisbon, Portugal, Oct. 10-14, 2016, total 5 pages. XP051148915.
Fujitsu, "Discussion on grant-free transmission for UL multiple access", 3GPP TSG RAN WG1 Meeting #86bis R1-1608803, Lisbon, Portugal, Oct. 10-14, 2016, total 3 pages.

* cited by examiner

302

| UE | Index for 3-tuple | {P1} Initial Tx | {P2} 1st Re-Tx | {P3} 2nd Re-Tx |
|---|---|---|---|---|
| 110a | 1 | p11 | p21 | p31 |
| 110b | 2 | p12 | p22 | p32 |
| 110c | 3 | p13 | p23 | p33 |

304

| UE | Index for 3-tuple | Initial Tx | 1st Re-Tx | 2nd Re-Tx |
|---|---|---|---|---|
| 110a | 1 | codebook A1 | codebook B1 | codebook C1 |
| 110b | 2 | codebook A2 | codebook B2 | codebook C2 |
| 110c | 3 | codebook A3 | codebook B3 | codebook C3 |

306

| UE | Index for 3-tuple | Initial Tx | 1st Re-Tx | 2nd Re-Tx |
|---|---|---|---|---|
| 110a | 1 | resource A1 | resource B1 | resource C1 |
| 110b | 2 | resource A2 | resource B2 | resource C2 |
| 110c | 3 | resource A3 | resource B3 | resource C3 |

FIG. 3B

SYSTEMS AND METHODS FOR GRANT-FREE UPLINK TRANSMISSIONS

RELATED APPLICATIONS

This application is a continuation application of U.S. patent application Ser. No. 15/588,229 filed on May 5, 2017, and claims priority to U.S. Provisional Application No. 62/422,560 filed on Nov. 15, 2016, U.S. Provisional Application No. 62/423,186 filed on Nov. 16, 2016 and U.S. Provisional Application No. 62/455,583 filed on Feb. 6, 2017, each of which is incorporated by reference in their entirety.

TECHNICAL FIELD

The present invention relates generally to wireless communications, and in particular embodiments, to methods and systems for grant-free uplink transmissions.

BACKGROUND

In some wireless communication systems, a user equipment (UE) wirelessly communicates with a Transmission and Receive Point (TRP), for example a base station to send data to the UE and/or receive data from the UE. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame, this transmission mode is called grant based transmission.

The base station is aware of the identity of the UE sending the uplink transmission using the granted uplink resources, because the base station specifically granted those uplink resources to that UE. However, there may be schemes in which the base station does not know which UE, if any, is going to send an uplink transmission using certain uplink resources. An example is a grant-free uplink transmission scheme in which UEs may send uplink transmissions using certain uplink resources shared by the UEs, without specifically requesting use of the resources and without specifically being granted the resources by the base station. The base station will therefore not know which UE, if any, is going to send a grant-free uplink transmission using the resources.

In some cases, when a particular UE sends a grant-free uplink transmission, the base station may not be able to decode the data in the uplink transmission.

SUMMARY

Technical advantages are generally achieved, by embodiments of this disclosure which describe methods and systems for.

Some embodiments provide a network method to solve a resource allocation scheme for the coexistence of grant free transmission and the grant based transmission. The method comprises: sending, by a network entity, a first type of UL transmission resource assignment to a first UE, wherein the first type of UL transmission resource assignment indicates a grant-free transmission for the first UE; sending, by the network entity, a second type of UL transmission resource assignment for a second UE, the second type of UL transmission resource assignment indicates a grant based transmission for the second UE; receiving, by the network entity, a first data transmission from the first UE for grant free transmission using an grant free transmission resource; receiving, by the network entity, a second data transmission from the second UE for grant based transmission using an assigned grant based transmission resource.

Based on the above method, the BS sets two type of UL transmission resource assignment and select one type of UL transmission resource assignment corresponding to grant free transmission or grant based transmission based on the resource allocation scheme, thus BS can configure each UE transmission mode after the UEs initial access network.

Some embodiments provide a new scheme to solve how to switch between the grant free and grant based transmission.

In some embodiments, the method may further comprise: transmitting, by the network entity, an UL transmission resource assignment to the first UE, wherein the UL transmission resource assignment indicates that the first UE is to be switched to a grant based mode and includes an allocated grant based transmission resource; or transmitting, by the network entity, a signal to the first UE to switch to a grant based mode, and transmitting an UL transmission resource assignment to the first UE based on a scheduling request, wherein the UL transmission resource assignment indicates an allocated grant based transmission resource.

In some embodiments the method may further comprise: transmitting, by the network entity, a signal to the second UE to switch to a grant free mode, and transmitting an UL transmission resource assignment to the second UE, wherein the UL transmission resource assignment indicates an allocated grant free transmission resource.

Based on the above embodiment, the BS can control the two types of UL transmission scheme switch, thus the BS can flexible switch grant free UE and grant based UE transmission base on the actual transmission requirement, and further improve transmission resource efficiency utilization.

Some embodiments provide a new switch scheme to solve how to switch between initial transmission and retransmission using grant free transmission resource or grant based transmission resource.

In some embodiments the method may further comprise: receiving, by the network entity, the first data transmission from the first UE as a grant free retransmission using the grant free transmission resource; or sending, by the network entity, a DCI grant for retransmission to the first UE, and receiving the first data transmission from the first UE based on the assigned retransmission resource in the DCI grant.

In some embodiments the method may further comprise: sending, by the network entity, a DCI grant or NACK for retransmission to the second UE, and receiving the second data transmission from the second UE based on the assigned retransmission resource; or sending, by the network entity, a NACK or an indicator to switch to grant free retransmission mode and grant free retransmission resource, and receiving the second data transmission from the second UE for grant free transmission using the grant free transmission resource.

Based on the above embodiment, the BS can control the initial transmission and retransmission using different transmission mode, and the BS can flexible switch the transmission mode and improve the transmission resource efficiency utilization.

According to another aspect, there is provided a method for data transmission. The method involves sending, by a network entity, a first type of UL transmission resource assignment to a first UE, wherein the first type of UL transmission resource assignment indicates a grant-free transmission for the first UE. The method further involves sending, by the network entity, a second type of UL transmission resource assignment for a second UE, the second type of UL transmission resource assignment indicates a grant based transmission for the second UE. The method further involves receiving, by the network entity, a first data transmission from the first UE for grant free transmission using a grant free transmission resource. The method further involves receiving, by the network entity, a second data transmission from the second UE for grant based transmission using an assigned grant based transmission resource.

According to another aspect, there is provided a network device. The network device includes a processor and a computer-readable storage medium storing processor executable instructions for execution by the processor. The instructions are for performing a method that involves sending, by a network entity, a first type of UL transmission resource assignment to a first UE, wherein the first type of UL transmission resource assignment indicates a grant-free transmission for the first UE. The method performed by the instructions also involve sending, by the network entity, a second type of UL transmission resource assignment for a second UE, the second type of UL transmission resource assignment indicates a grant based transmission for the second UE. The method performed by the instructions also involve receiving, by the network entity, a first data transmission from the first UE for grant free transmission using an grant free transmission resource. The method performed by the instructions also involve receiving, by the network entity, a second data transmission from the second UE for grant based transmission using an assigned grant based transmission resource.

According to another aspect, there is provided a method for data transmission. The method involves at least one of: receiving, by user equipment, a first type of UL transmission resource assignment, wherein the first type of UL transmission resource assignment indicates a grant-free transmission for the UE and sending, by the UE, a first data transmission from the UE for grant free transmission using an grant free transmission resource; or receiving, by the UE, a second type of UL transmission resource assignment, wherein the second type of UL transmission resource assignment indicates a grant based transmission for the UE; and sending, by the UE, a second data transmission from the UE for grant based transmission using an assigned grant based transmission resource.

According to another aspect, there is provided a User Equipment (UE) including a processor and a computer-readable storage medium storing processor executable instructions for execution by the processor. The instructions are for performing a method that involves receiving, by user equipment, a first type of UL transmission resource assignment, wherein the first type of UL transmission resource assignment indicates a grant-free transmission for the UE and sending, by the UE, a first data transmission from the UE for grant free transmission using an grant free transmission resource. Alternatively, the instructions are for performing a method that involves receiving, by the UE, a second type of UL transmission resource assignment, wherein the second type of UL transmission resource assignment indicates a grant based transmission for the UE; and sending, by the UE, a second data transmission from the UE for grant based transmission using an assigned grant based transmission resource.

Other aspects and features will become apparent to those of ordinary skill in the art upon review of the following description.

BRIEF DESCRIPTION OF THE DRAWINGS

Embodiments will be described, by way of example only, with reference to the accompanying figures wherein:

FIG. 3B illustrates three tables, each showing an example mapping between User Equipment (UE) and multiple access (MA) signatures or physical resources;

DETAILED DESCRIPTION

For illustrative purposes, specific example embodiments will now be explained in greater detail below in conjunction with the figures.

Figure 1:
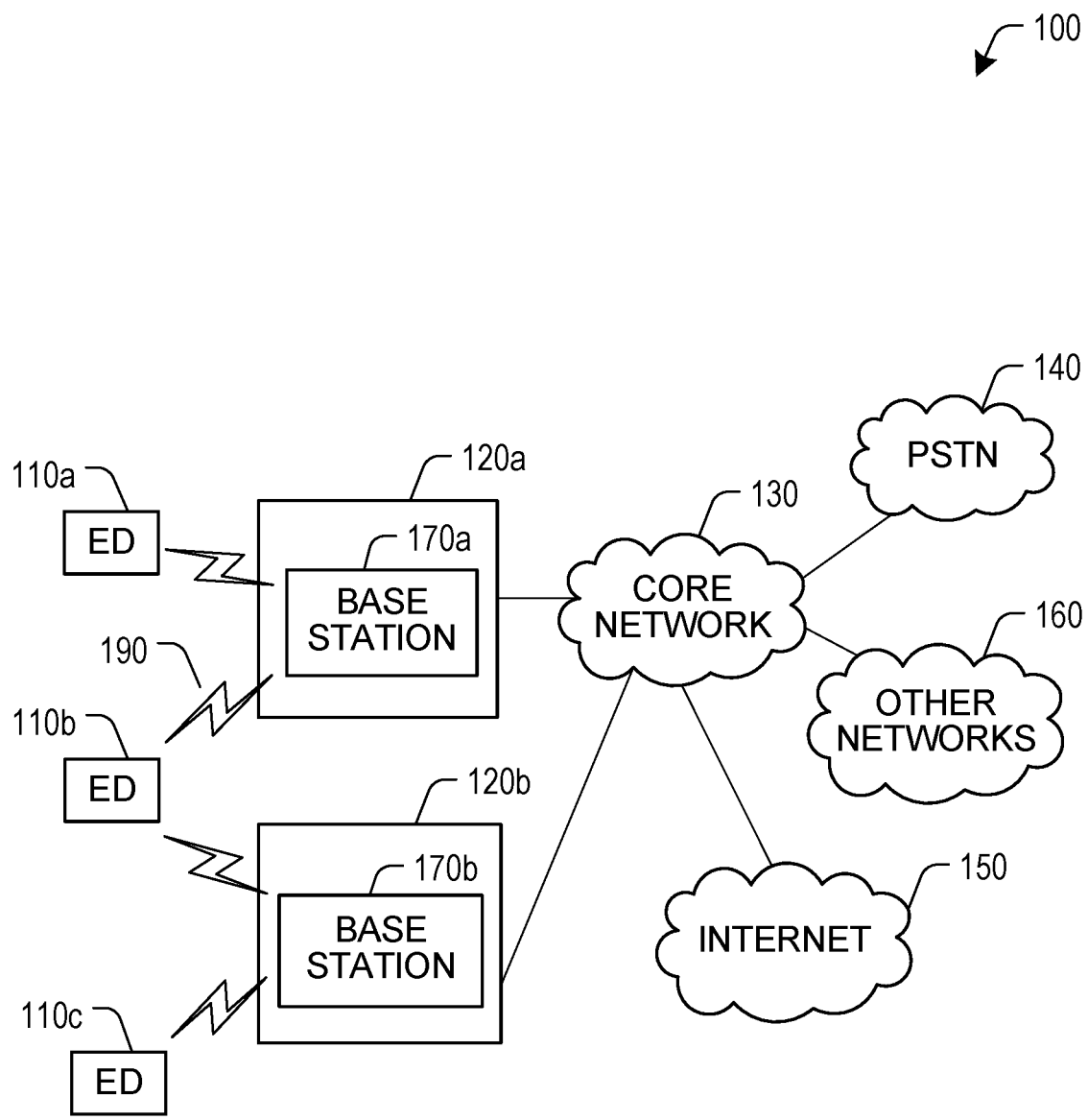
FIG. 1 illustrates a block diagram of a wireless network for communicating data.

FIG. 1 illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit (WTRU), cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c (which may also be referred to as UEs 110a to 110c herein) to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The cnetwork 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
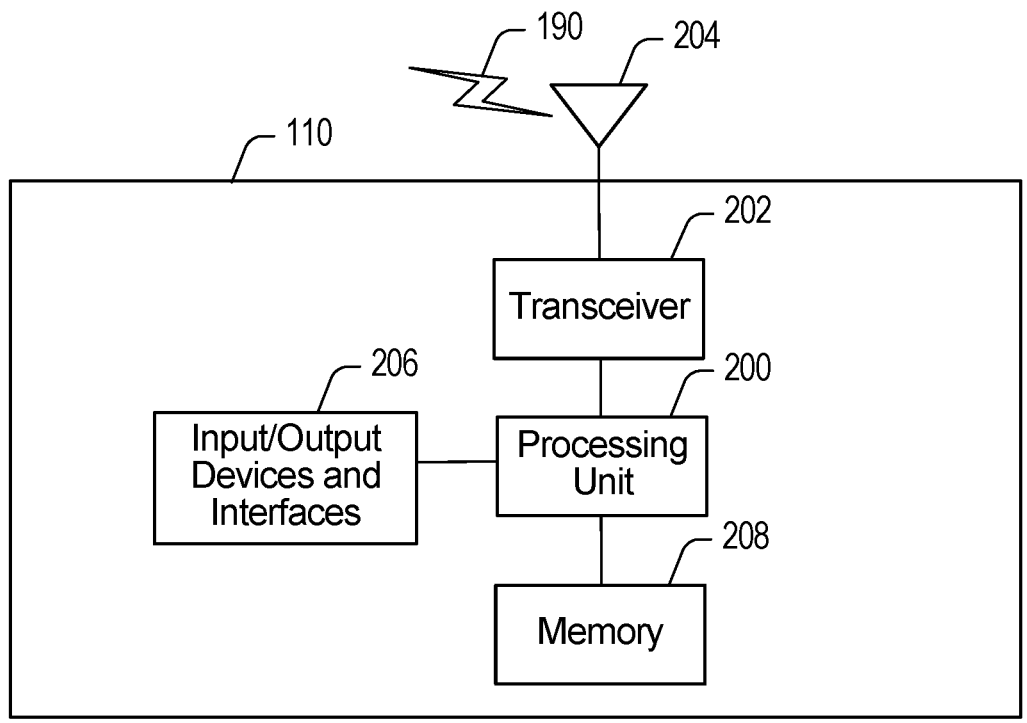
FIG. 2A illustrates an example Electronic Device (ED) structure according to FIG. 1.
Figure 2B:
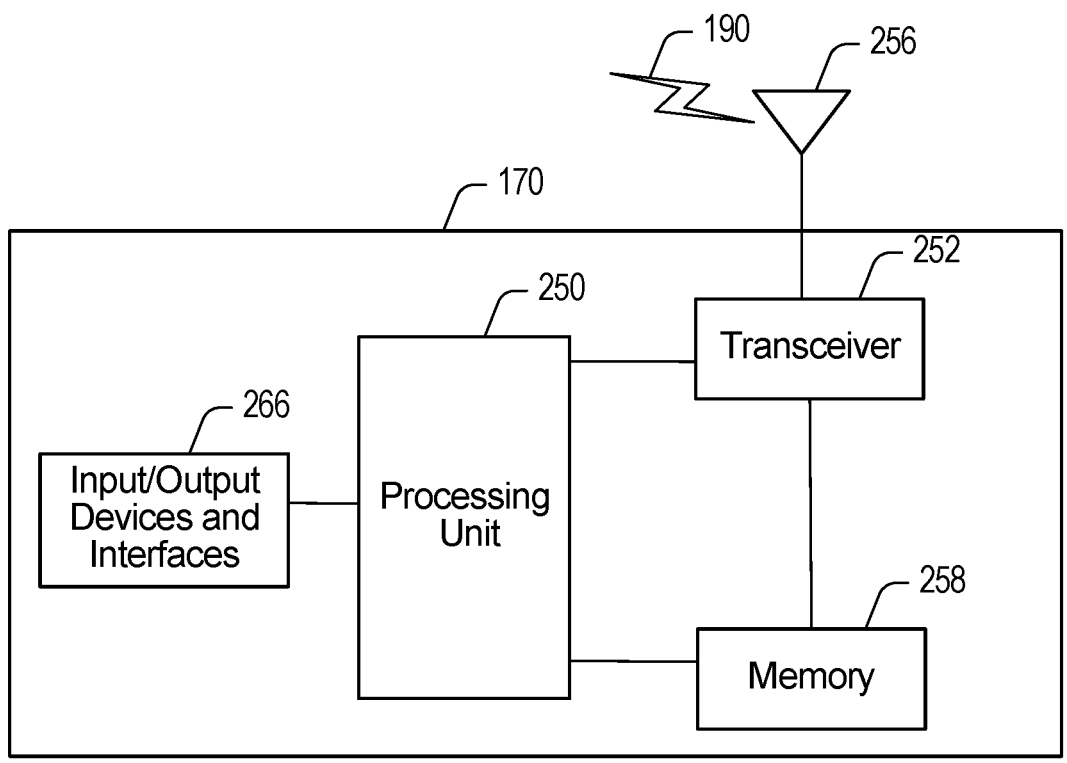
FIG. 2B illustrates an example base station structure according to FIG. 1.

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit. While only a single processing unit is shown in FIG. 2, there could be multiple processing units within ED 110 performing the above described operations.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transceiver 252, which includes functionality for a transmitter and a receiver, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transceiver 252 includes any suitable structure for generating signals for wireless or wired transmission to one or more EDs or other devices. Each transceiver 252 further includes any suitable structure for processing signals received wirelessly or by wire from one or more EDs or other devices. Although shown combined as a transceiver 252, a transmitter and a receiver could be separate components. Each antenna 256 includes any suitable structure for transmitting and/or receiving wireless or wired signals. While a common antenna 256 is shown here as being coupled to the transceiver 252, one or more antennas 256 could be coupled to the transceiver(s) 252, allowing separate antennas 256 to be coupled to the transmitter and the receiver if equipped as separate components. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Grant-free uplink transmissions are sometimes called "grant-less", "schedule free", or "schedule-less" transmissions. Grant-free uplink transmissions from different EDs 110a-c may be transmitted using the same designated resources, in which case the grant-free uplink transmissions are contention-based transmissions. One or more base stations, e.g. base station 100, may perform blind detection on the grant-free uplink transmissions.

Grant-free uplink transmissions may be suitable for transmitting bursty traffic with short packets from the EDs 110a-110c to the base station 170a-170b, and/or for transmitting data to the base station 170a-170b in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to the applications described above.

FIG. 1 illustrates messages sent by EDs 110a-110c in a grant-free uplink transmission over uplink channel. The messages are transmitted using a multiple access (MA) resource. A MA resource is comprised of a MA physical resource (e.g. a time-frequency block) and at least one MA signature. The MA signature may include (but is not limited to) at least one of the following: a codebook/codeword, a sequence, an interleaver and/or mapping pattern, a demodulation reference signal (e.g. a reference signal for channel estimation), a preamble, a spatial-dimension, and a power-dimension. The term "pilot" refers to a signal that at least includes a reference signal. In some embodiments, the pilot may include the demodulation reference signal (DMRS), possibly along with a channel-estimation-oriented preamble, or a random access channel (LTE-like RACH) preamble.

Figure 3A:
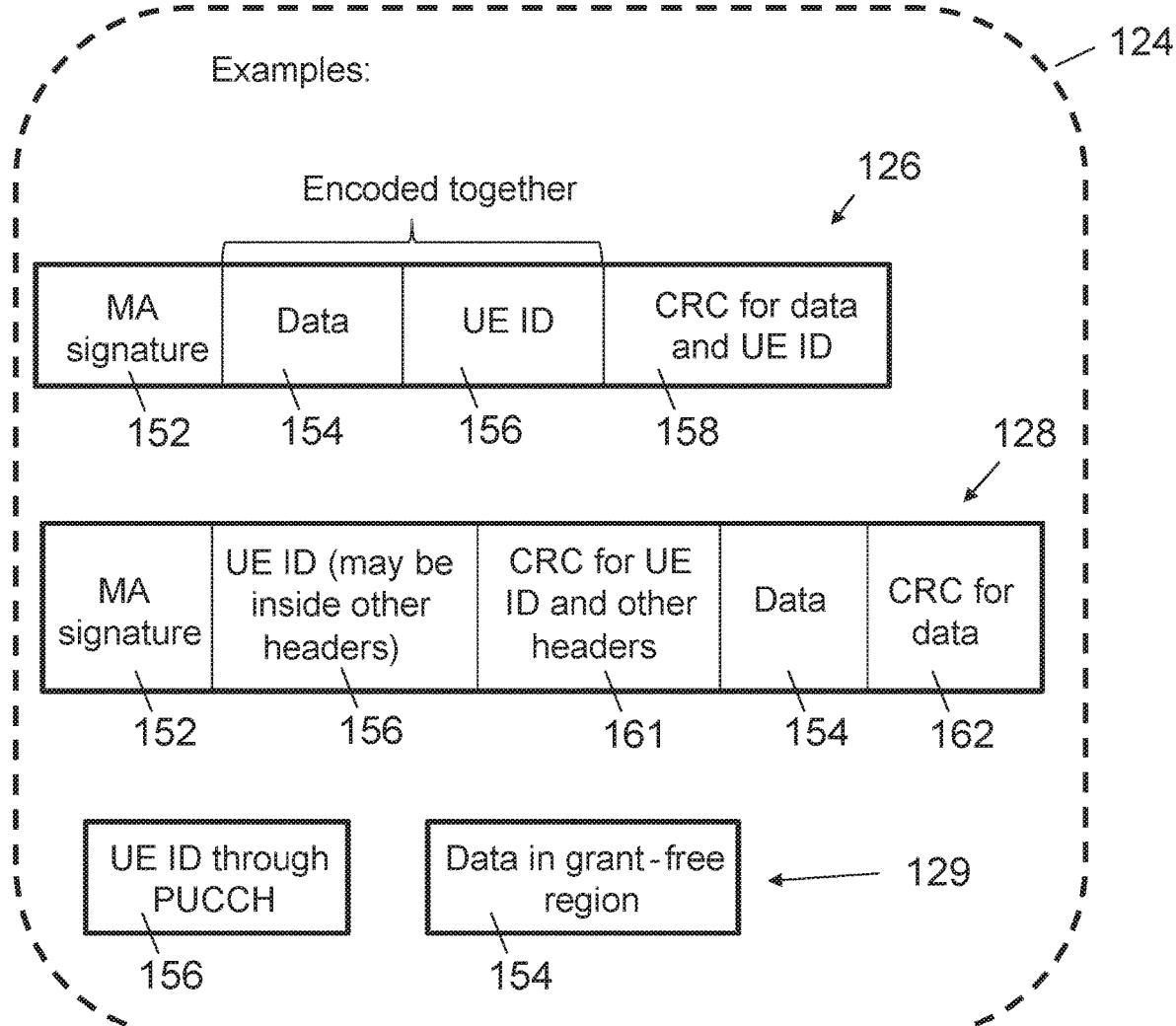
FIG. 3A illustrates example formats for a message sent from an ED to a base station according to embodiments disclosed herein.

FIG. 3A shows example formats for the message which are illustrated in stippled bubble 124. In a first example 126, the message includes a MA signature 152, as well as data 154 and an indication of the identity of the UE: UE ID 156. The data 154 and the UE ID 156 are encoded together, and a corresponding cyclic redundancy check (CRC) 158 is generated and included in the message 126. In some embodiments, the UE ID 156 is instead embedded in the CRC 158, which may reduce the payload size. In another example, the MA signature 152 may be optional if the signature was previously acknowledged for use. Example 128 is a variation of example 126 in which the UE ID 156 is separately encoded from the data 154. Therefore, a separate CRC 161 is associated with the UE ID 156 in addition to the CRC 162 for the data. In some embodiments, the UE ID 156 may be inside one or more other headers, in which case the CRC 161 is for the headers in which the CRC 161 is located. In example 128, the UE ID 156 may be transmitted with a lower (i.e. lower and more robust) modulation and coding scheme (MCS), i.e. having a lower rate than the data 154 in order to facilitate decoding of the UE ID 156. There may be situations in which the UE ID 156 is successfully decoded, but the data 154 is not successfully decoded.

In examples 126 and 128, the MA signature 152 is illustrated as occupying separate time-frequency resources from the data 154, e.g. at the start of the message. This may be the case if, for example, the MA signature 152 consists of a reference signal and/or a preamble. However, the MA signature 152 may instead be part of the transmission scheme itself, e.g. the codebook used or the mapping pattern used, in which case the MA signature 152 would not occupy separate time-frequency resources from the data 154. Also, in embodiments in which the MA signature 152 does occupy separate time-frequency resources from the data 154, the resources do not necessarily have to be at the start of the message.

In another embodiment, the message may contain only a MA signature which is sent and then followed by a message that includes both a MA signature and data information.

In some embodiments, there may be a one-to-one mapping between an MA signature 152 and a UE or a one to more than one mapping between an MA signature 152 and multiple UEs. That is, each UE is assigned use of a different MA signature that is known by the base station and the UE. For example, the base station and UE receives the allocation by the network or pre-configured by the network. When there is a mapping between an MA signature 152 and a UE, then successful detection of the MA signature 152 reveals the identity of the UE that sent the message. In embodiments in which there is a mapping between the MA signature 152 and the UE, the base station may use the MA signature 152 to check a lookup table to determine the identity of the UE that sent the MA signature 152. Also, in embodiments in which there is a mapping between the MA signature 152 and the UE, then the UE ID 156 may not even need to be transmitted as part of the message.

Example 129 shows a variation in which the UE ID 156 and the data 154 are transmitted through different resources. For example, the UE ID 156 may be transmitted as part of a control channel, such as a physical uplink control channel (PUCCH). The data 154 may be transmitted in a grant-free region of an uplink data channel. The MA signature is not illustrated in example 129, but the MA signature may be part of the data transmission.

When the UE sends a message to the base station, the base station first attempts to detect the MA signature. Detecting the MA signature is referred to as activity detection. By successfully performing activity detection, the base station knows that a UE has sent a grant-free uplink transmission. However, successful activity detection may or may not reveal the identity of the UE to the base station. If there is a one-to-one mapping between a UE and an MA signature, then successful activity detection reveals the identity of the UE that sent the grant-free uplink transmission. If there is not one-to-one mapping between a UE and a MA signature, then successful activity detection does not reveal the identity of the UE that sent the grant-free uplink transmission, although it may reveal that the UE is from a particular group of UEs, if different groups of UEs are assigned different MA signatures. In some embodiments, activity detection may further include obtaining the UE ID, e.g. if the UE ID is encoded separately from the data 154, as in example message 128.

After activity detection is successful, the base station then attempts to perform channel estimation based on the MA signature and optionally additional reference signals multiplexed with the data message, and then decode the data 154. If data decoding is also successful, then the base station can send an ACK to the UE in the downlink indicating that the base station has successfully decoded the data 154. In embodiments in which successful activity detection does not reveal the identity of the UE, then successful decoding of the rest of the message will reveal the identity of the UE, in which case the base station 100 will know the UE to which to send the ACK.

As one example, the MA signature 152 in example 126 may be a reference signal. The base station may first successfully perform activity detection by successfully decoding the reference signal sequence. The reference signal sequence may then be used by the base station for channel estimation of the uplink channel. To facilitate successful decoding of the reference signal, the reference signal may be transmitted with a low and robust MCS. Once the reference signal is successfully decoded and channel estimation performed, the base station then decodes the payload having the data 154 and UE ID 156. The base station can then read the UE ID 156 to be informed of which UE the grant-free transmission came from. The base station can then send an ACK to the UE in the downlink indicating that the base station 100 has successfully decoded the data 154.

As mentioned above, in some embodiments there may be a mapping relationship between MA signatures and UEs, it can be one MA signature maps to one UE or one MA signature maps to multiple UEs. FIG. 3B illustrates three tables 302, 304, and 306, showing respective examples of mapping relationships. In table 302, the MA signature is a reference signal. A pool {P} of nine reference signals (i.e. nine MA signatures) are partitioned into three sets {P1}, {P2}, and {P3}. The reference signals may be pilots. Each row in table 302 represents a 3-tuple. In this example, the pool {P} is divided into three exclusive sets {P1}, {P2}, and {P3}, such that each set has three of the nine reference signals. Specifically, {P1} includes reference signals p11, p12, and p13, {P2} includes reference signals p21, p22, and p23, and {P3} includes reference signals p31, p32, and p33. Three of the nine reference signals are designated as initial reference signals, another three of the nine reference signals are designated as first retransmission reference signals, and the last three of the nine reference signals are designated as second retransmission reference signals. There is a one-to-one mapping between UEs and reference signals. For example utilizing the three UEs from FIG. 1, UE 110a may be assigned 3-tuple index 1, UE 110b may be assigned 3-tuple index 2, and UE 110c may be assigned 3-tuple index 3. Therefore, when the base station 170a performs successful activity detection (i.e. successfully decodes the reference signal), then the base station 170a, knows from the reference signal sequence which UE sent the grant-free uplink transmission. In the example in table 302, each reference signal sequence also indicates to the base station 170a, whether the grant-free uplink transmission is an initial transmission, a first retransmission, or a second retransmission. In alternative embodiments, there may still be a one-to-one mapping between reference signals and UEs, but the reference signals may only be mapped to the identity of the UE and not mapped to initial transmissions or retransmission. For example, reference signal p11 may be assigned to a first UE, reference signal p12 may be assigned to a second UE, . . . , and reference signal p33 may be assigned to a ninth UE. Each of the nine UEs may then use their same assigned reference signal for their initial transmissions and retransmissions.

Table 304 is similar to table 302 in that the table defines a 3-tuple index for each of three UEs as well as an MA signature for an initial transmission, a first retransmission and a second retransmission. The MA signature may be a codebook value from a multiple access scheme, such as: non-orthogonal multiple access (NOMA), sparse code multiple access (SCMA), interleave-grid multiple access (IGMA), multi-user shared access (MUSA), low code rate spreading, frequency domain spreading, non-orthogonal coded multiple access (NCMA), pattern division multiple access (PDMA), resource spread multiple access (RSMA), low density spreading with signature vector extension (LDS-SVE), low code rate and signature based shared access (LSSA), non-orthogonal coded access (NOCA), interleave division multiple access (IDMA), repetition division multiple access (RDMA), or group orthogonal coded access (GOCA). Here taking SCMA for an example, the MA signature is a SCMA codebook. Nine SCMA codebooks {A1, A2, A3, B1, B2, B3, C1, C2, and C3} are partitioned into initial and retransmission sets and assigned to each one of UEs 110a-110c using a one-to-one mapping. For example, the use of codebook A1 indicates to the base station 170a that UE 110a sent the transmission, and that the transmission is an initial data transmission. In some embodiments, there may also be a one-to-one mapping between reference signals and SCMA codebooks. In such embodiments, the reference signal sequence or the SCMA codebook may be used to identify the UE and/or whether the transmission is an initial transmission, a first retransmission, or a second retransmission. Also, in such embodiments, identifying the reference signal sequence reveals the SCMA codebook used, and vice versa.

Table 306 is similar in scope to table 302, except instead of MA signatures, there is a one-to-one mapping between physical uplink resources used for the grant-free transmissions and UEs. Nine different time-frequency locations {A1, A2, A3, B1, B2, B3, C1, C2, and C3} are partitioned into initial and retransmission sets and assigned to each one of UEs 110a-c using a one-to-one mapping. For example, the receipt, by a base station 170a, of a grant-free uplink transmission on physical uplink resources A1 indicates to the base station 170a that UE 110a sent the transmission, and that the transmission is an initial data transmission.

In the examples described above in relation to FIG. 3B, there is a mapping relationship between MA signatures or physical resources and the UEs. However, in some embodiments there does not have to be a one-to-one mapping to UEs. More generally, the mapping relationship between the different MA signatures or physical resources, i.e. the 3-tuples in the tables in FIG. 3B, may be used to identify that the initial transmission and the retransmissions belong to the same packet. For example, UE 110a may use index 3-tuple 1 in table 302 (p11, p21, p31) for a first data packet being transmitted to the base station 170a, and UE 110a may use index tuple 2 (p12, p22, p32) for a second data packet being transmitted to the base station 170a. In some embodiments, a UE may choose or be configured to use different tuples for different packets. In some embodiments, two UEs may choose the same 3-tuple, e.g. if they randomly select MA signatures for the initial transmission, which may occur, for example, in mMTC applications.

Hybrid Automatic Repeat reQuest (HARQ) procedures for grant-free uplink transmissions will now be described in more detail. HARQ procedures that already exist for grant-based schemes may not be applicable to grant-free uplink transmissions, because of the nature of grant-free uplink transmissions. For example, in a grant-free uplink transmission scheme, there may be no scheduling grant from the base station that specifies information such as which UEs are to transmit initial and retransmissions using which resources. Some of the systems and methods disclosed below may address problems such as how to perform ACK and/or NACK for grant-free uplink transmissions, how to determine and signal retransmission timing, and/or how to determine the transmission/retransmission attempt and the RV for HARQ operations.

As wireless networks evolve, diverse applications will require the networks to be able to serve different types of traffic and users in terms of quality of service (QoS) and capacity. For low latency applications, such as URLLC, and massive connectivity applications with a large number of users, such mMTC, as well as infrequent small packets in applications such as mMTC, URLLC and eMBB services, a user packet has to "arrive and go" to satisfy the latency requirements (e.g., URLLC) and/or to reduce signaling overhead (e.g., mMTC). Grant-free transmissions would be advantageous for these types of scenarios. For other applications, such as eMBB or large-packet transmissions with normal latency and reliability requirements, the grant-based schemes can be used. It is expected that a mix of grant-free and grant-based schemes will be simultaneously operational in future networks.

Figure 3C:
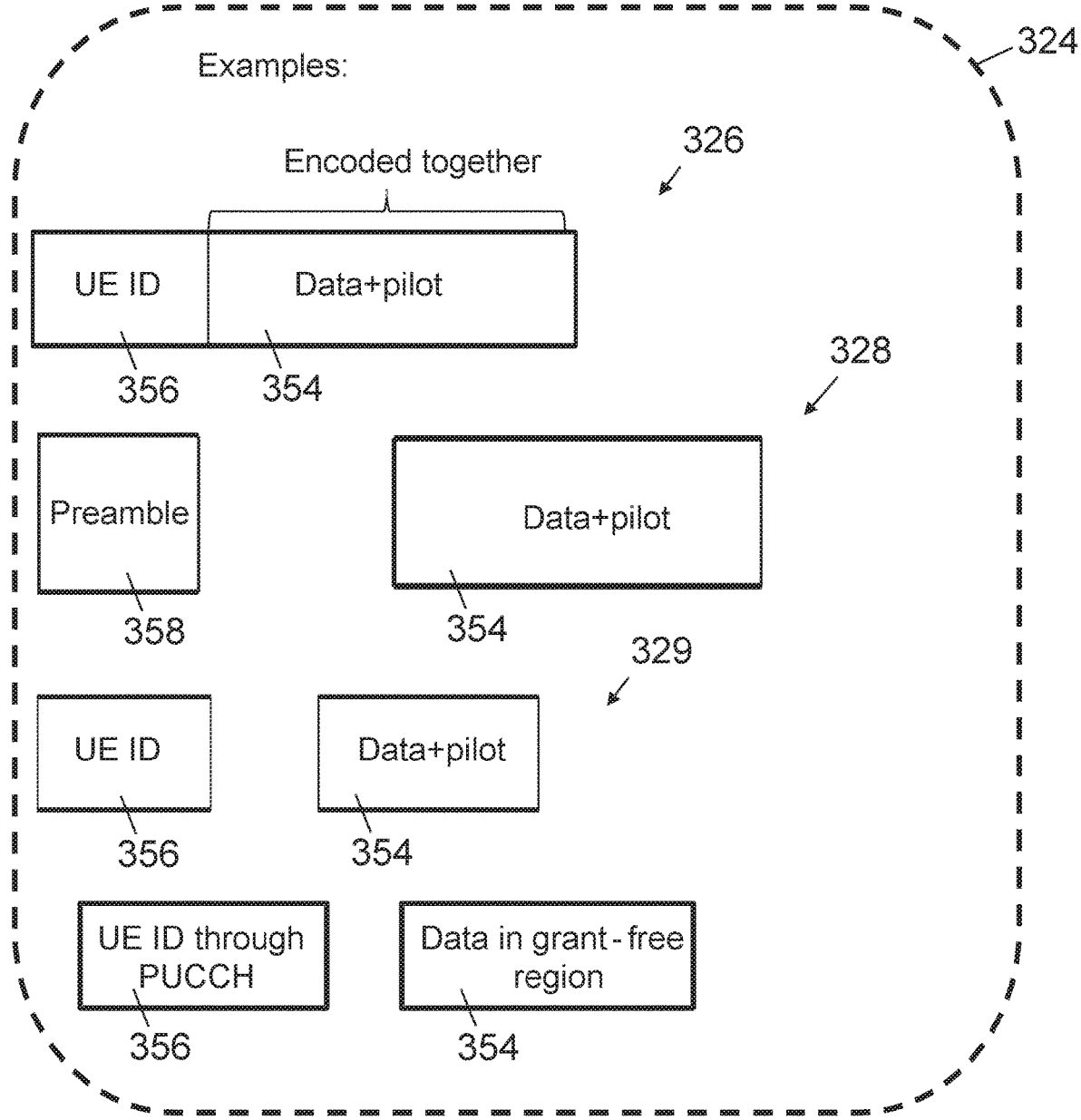
FIG. 3C illustrates another example of formats for a message sent from an ED to a base station according to embodiments disclosed herein.

FIG. 3C shows another group 324 of example message formats sent by UEs in a grant-free uplink transmission over an uplink channel. In example 326, the message includes UE ID 356 and a combination of data and one or more pilots 354. As indicated in some embodiments, the pilot may include the demodulation reference signal (DMRS), whose physical locations can be a first one or more symbols in a sub-frame structure, and/or, optionally, spread over different frequency and time elements among the sub-frames. Using different pilots for initial and retransmissions for one packet of a UE, the pilots can also be used for UE activity and transmissions detection and identification, for e.g., HARQ signalling combining and decoding at the base station.

In example 328, a first message includes a preamble 358 and a second message includes data and at least one pilot 354. In a particular example where the UE is utilizing URLLC, the preamble 358 may be a sequence assigned to the URLLC UE for dedicated usage in which the preamble 358 has a one-to-one mapping relationship with UE ID 356 for the URLLC UE. The first message may be transmitted separately from the data and at least one pilot 354. The transmit receive point (TRP) receives the first message and identifies the URLLC UE based on the mapping relationship. The TRP receives the second message, detects the pilot in the second message, performs channel estimation using the detected pilot and then decodes the data.

In another embodiment, the preamble 358 may be linked to a dedicated UE connection ID in which the preamble 358 has a one-to-one mapping relationship with the UE connection ID. The UE connection ID may be a dedicated Cell Radio Network Temporary Identifier (C-RNTI) or an assigned C-RNTI.

Such a scheme can also be applicable to other services such as eMBB.

In an explicit way, in an example 329, UE ID 356 only may be transmitted separately from the data and at least one pilot 354. A first message includes UE ID 356 and a second message includes data and pilot 354. In some embodiments, there is a predefined mapping from UE ID to data transmission resource 354, where once the UE ID 356 is detected the TRP will have knowledge of where and when the data signal will be and can then detect and decode the data signal accordingly.

The TRP receives the first message and identifies the UE ID 356. The TRP then receives the second message, detects the pilot in the second message, performs channel estimation using the detected pilot and then decodes the data.

In one implementation of example 329, the UE ID 356 may be transmitted separately from the data and pilot 354 and the UE ID message is protected by a Cyclical Redundancy Code (CRC). The first message can be transmitted using a different numerology than the second message. Symbols used for the UE ID 356 message can use different numerology than the symbols used for the data and pilot 354. In a particular embodiment, symbols used for the UE ID 356 message can use a larger Cyclic Prefix (CP) for the UE ID message 356 than the symbols used for the data and pilot 354.

In some implementations, UE ID 356 of example 329, preamble 358 of the example 328, or the pilot included in the examples, may also carry buffer status information as well as MCS. This may allow the network to decide an appropriate resource size in the UL grant for future transmissions of the UE.

Figure 4A:
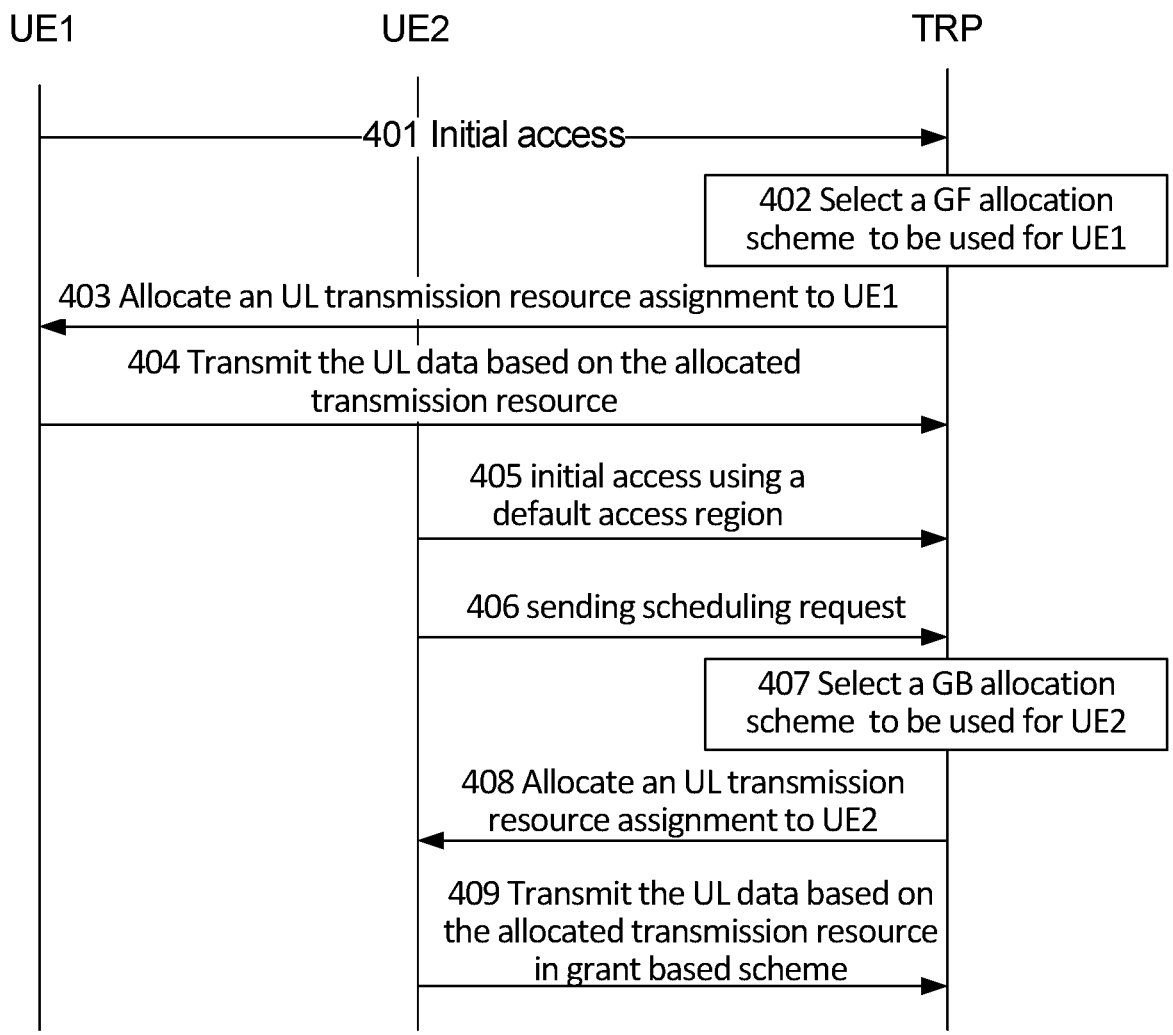
FIG. 4A is a signalling diagram illustrating an example of communications between a grant free UE and a base station and a grant based UE and a base station according to embodiments disclosed herein.

FIG. 4A shows an embodiment of a configuration and signaling procedure for UE initial access to data transmissions for a grant-free mode (steps 401, 402, 403 and 404) and UE initial access to data transmissions for a grant-based mode (steps 405, 406, 407, 408 and 409).

Basically, the embodiment provides a process to configure a mixture of grant-free (GF) and grant-based (GB) UEs in a cell or a system, which enable functionalities such as, but not limited to:

resource (including MA PHY resources and MA signatures) pre-allocations to GF UEs and/or providing explicit/implicit mapping between the resources and GF UEs;

modulation coding scheme (MCS) pre-configurations to GF UEs;

numerology pre-assignments to GF and GB UEs; and dynamic control signaling for GB UEs.

In FIG. 4A there are two occurrences of the TRP selecting an allocation scheme for use by a UE. Before a UE will transmit, the TRP must know the resource allocation mode the UE is to use. As described above, a first type of UL transmission resource assignment mechanism uses a pre-configured resource allocation or pre-allocated channel resource for grant-free UE transmission. A second type of UL transmission resource assignment mechanism uses a dynamically assigned channel resource for grant-based UE. That is, the TRP must know if the UE will be using a grant-free or grant-based mode. In step 402 of FIG. 4A, the TRP selects the allocation scheme for a first UE, UE1, to be a grant free scheme and in step 407 the TRP selects the allocation scheme for a second UE, UE2 to be a grant based scheme.

In order to determine the allocation scheme, the TRP identifies whether the UE will use a GF mode or a GB mode based on at least one of the following options.

In a first option, the UE has been pre-configured to use a GF mode or GB mode based on the conditions of the UE, such as device type and/or application category, and the TRP follows the pre-configuration. An example of this is shown in FIG. 4A.

In a second option, the network and/or the TRP makes the decision about whether the UE will be using GF or GB mode based on at least one of the following factors: service type, traffic type, traffic load, device type, UE type, pre-configuration of the UE, capability of the UE and/or the TRP, UE's quality of service (QoS) requirement.

The service type refers to the type of service that is the UE is using, such as, but not limited to, mMTC, eMBB, or URLLC. The traffic type refers to the type of traffic that the UE will be transmitting/receiving, such as, but not limited to, short packets (more suitable for GF mode), large packets, bursty packets or periodic packets. For example, when the user traffic is mainly short packet, the UE may preferably use GF mode. The traffic load refers to, for example, whether the arrival rate of the packets is high or low. The device type refers to the type of device, such as, but not limited to, an LTE device or a New Radio (NR) device. The UE type may refer to, for example, a specific type of UE defined by the standard that may have different respective receiver capabilities. A UE may be pre-configured to use GF mode or GB mode or both modes. The UE and the TRP may each have particular receiver capabilities that make them preferred for one or both of the GF or GB modes. The UE's quality of service (QoS) requirement may refer to the quality of service that the UE is expected to provide. For example, a UE may be expected to transmit with low latency. In such a case, a grant-free mode may be preferred as this mode may reduce the latency by avoiding the round trip time involved in UE sending scheduling request and TRP respond to the scheduling request.

In a third option, once the UE has entered the network, the UE may send an indicator to indicate its preference of whether to transmit in GF or GB mode. In some embodiments, the indicator may be an indication field, for example in the physical random access channel (PRACH), to indicate whether the UE prefers the GF or GB mode. The decision of whether a UE would prefer to use the GF mode or the GB mode is based on at least one of the following factors: service type, traffic type, traffic load, device type, UE type, pre-configuration of the UE, capability of the UE and/or the TRP and UE's quality of service (QoS) requirement.

The service type refers to the type of service that the UE is using, such as, but not limited to mMTC, eMBB, or URLLC. The traffic type refers to the type of traffic that the UE will be transmitting/receiving, such as, but not limited to, short packets (more suitable for GF mode), large packets, bursty packets or periodic packets. For example, when the user traffic is mainly short packet, the UE may prefer to use GF mode. The traffic load refers to, for example, whether the arrival rate of the packets is high or low. The device type refers to the type of device, such as, but not limited to, an LTE device or a New Radio (NR) device. The UE type may refer to, for example, a specific type of UE that may have different respective receiver capabilities. A UE may be pre-configured to use GF mode or GB mode or both modes. The UE and the TRP may each have particular receiver capabilities that make them preferred for one or both of the GF or GB modes.

In a fourth option, the UE may transmit a buffer status report (BSR). The transmission of the BSR can be done in an initial access process or any time before the TRP transmits the transmission allocation information for the UE. The TRP may make the decision on whether to configure the UE on GF or GB mode based on the BSR as well.

Referring back to FIG. 4A, the following discussion will describe UE1 operating in GF mode starting from step 401 and UE2 operating in GB mode starting from step 406. While FIG. 4A illustrates the TRP communicating with UE1 and UE2 for initial access and a single transmission of data, it is to be understood that once steps 404 and 409 are finished further transmissions may occur between UE1 and the TRP and UE2 and the TRP. It is also to be understood that there may be acknowledgement of the data received by the TRP. Examples of the acknowledge processes may be found in portions of FIGS. 6A to 6G.

In step 401 UE1 initially accesses the network.

In step 402, the TRP selects the allocation scheme to be used by UE1 to be grant free based on one or more of the options described above. The detailed allocation scheme may include transmitting information defining the GF resource. The information may be provided to UE1 by functionality such as, but not limited to, the following examples: through broadcast or semi-persistent signaling, e.g., using radio resource control (RRC) signaling and Downlink Control Information (DCI) of PDCCH-like channels; through RRC signaling, e.g., Dedicated UE specific channel using Physical Downlink Shared Channel (PDSCH)-like channel; through dynamic signaling, e.g., using DCI of Physical Downlink Control Channel (PDCCH)-like channel; or can be UE specific signaling or UE group based signaling, e.g., shared resources can be broadcast signaled.

The allocation of resources is pre-configured or pre-assigned by the TRP, or the network, using the above signalling options, in two steps. In a first step, MA resources are pre-assigned to a group of UEs, which in the example of FIG. 4A would include UE1. This can, for example, be broadcast signalling or semi-persistent scheduling for a block of resources to a group of UEs. The time and frequency resources (say, N logical slots×M logical RBs, N>=1 and M>=1) can be allocated to a group of GF UEs, where the logical units can be mapping to physical real resource element (RE) locations with pre-defined diversity patterns by the network. Moreover, such an allocation can be semi-statically updated or updated on demand.

In a second step, a mapping or mapping rule of MA resources is pre-configured to each GF enabled UE. For example, using RRC signalling to pre-configure each UE one or more resource units (each unit with 1 slot×1 RB) from above resource allocated to the group of UEs. At the same time, each UE will be associated with one or more MA signatures, such as pilots for the data transmission, and also associated with a spatial ID such as beams based on, e.g., UE location or mobility. For pilot association, there are two ways to associate the MA signatures with each UE. In a first scenario, the MA signatures have a mapping with GF resources. For example, P pilots {p1, p2, . . . } and B beam-forming beams (b1, b2, . . . ) can be pre-defined and used in the GF resource. The pilots and beams can be assigned over 1 slot×1 Resource Block (RB) resource units either along a frequency-to-time direction or a time-to-frequency direction. For the resource size of M RB×N time slots, P pilots will can be associated with each resource unit of 1 slot×1 RB along the frequency-direction and expand to the time direction, and will repeat the pilots to cover all the resource units. As a result, along the frequency to time direction, the pilot index will be associated with resource unit as e.g. (P=M+1), 1, 2, 3, . . . , M (first slot), M+1,1 (repeat pilots), 2, . . . , (second slot), . . . (N slot), where each column will include M pilots, with a total of N columns. In this way, once a UE is pre-allocated any resource units, then the UE will use the corresponding pilot(s) associated with the allocated resource units. In a second scenario, one or more pilots can be pre-allocated to a UE using pre-defined mapping, such as its UE ID modulo (mod) a total number of configured pilots and with a defined variation. In any case, a UE is based on certain factors, e.g., its current location, to be associated with one or more beams from B beams.

An alternative option to the first scenario described above that involves association for P pilots with the resource units, is as follows. The P pilots and B beams can be associated with each resource unit along time (N)–frequency (M) direction (horizontal direction). P pilots will associate each with a resource unit over time domain and then frequency domain, and the pilots will repeat themselves if P is less than N×M, as a result, the first row of the resources will associate pilot index as, e.g. (P=N+2), 1, 2, 3, . . . , N (first RB), N+1, N+2, 1(repeat pilots), 2, . . . (second RB), (M RB), where each row will include N pilots, with a total of M rows in one pre-configured resource area.

In another embodiment, when the number of UEs in a cell is more than the number of resources, partial resource overlapping among UEs can be applied. In such a case, each user can choose a hopping pattern from a hopping pool. For example, a hopping pattern with frequency slots (M)×time slots (N) can have a set of random sequences, each having N values and each value taking a value between 1 to M.

The mapping can be performed explicitly or implicitly. Mapping explicitly may involve for each UE, mapping a time-frequency logical row index, a pilot row index and a beam row index to the UE. Mapping implicitly may involve, using UE ID (pre-defined or pre-allocated) based mapping to the resource row indexes, randomly choosing row indexes from above resource definitions, etc. One of the advantages with such a resource mapping and usage is to reduce significantly the continuous collisions of user MA signatures.

In other embodiments, MA resources such as pilots can be associated with a preconfigured basic resource region, consisting of one or more resource units (each with 1 slot×1 RB), which can be used by one GF enabled UE or shared by multiple GF enabled UEs. In one example, if P different and orthogonal pilots are associated with the basic resource region, up to P UEs can be pre-configured to access this basic resource region, each UE with pre-defined unique mapping to use one of the P pilots. In another example, less than P GF enabled UEs can be pre-configured to access this basic resource region, each UE with pre-defined unique mapping to use two or more pilots from the P pilots for, e.g., initial and retransmissions, respectively, and thus UE activity and transmission identifications of the same packet. In such a scenario, for one HARQ process, the initial transmission uses one pilot and all the retransmissions use the other pilot. In yet another example, more than P UEs can be pre-configured to access this basic resource region, each UE with a pre-defined random mapping to use one of the P pilots for, e.g., massive connection (mMTC) applications, where each UE traffic arrival is infrequent and sporadic with a relatively small arrival rate.

There are two modes for the GF mode to operate under. In a first mode, the UE simply uses the allocated transmission resource in an "arrive and go" style, i.e. the transmission resource is assumed to be available and accessible when it is allocated for use.

In a second mode, the TRP dynamically signals the activation (permission) of the resources pre-allocated by RRC signaling for the grant-free UEs. In this second mode, the UE needs to listen for such an activation message before any grant-free data transmission can be performed. This form of activation of the transmission resource may be of particular use to allow the TRP, to "borrow" some of the pre-allocated resource for the UEs using the GF mode for the GB based traffic (e.g., GB eMBB UEs), if not many UEs are using the GF mode and there is significant usage of the GB mode. The TRP can temporarily reclaim some of the pre-allocated resource to use for UEs in the GB mode, but indicating that the resource is not available to the UEs in GF mode, or more accurately, dynamically indicate via a DL control channel (such as PDCCH-like channel) when the pre-allocated resource can be used by the UEs in the GF mode.

In some embodiments, the activation may be sent as downlink control information (DCI). The UE may be provided information that defines a search space to look for the DCI activation in one or more of system information broadcast to UEs and the RRC signaling after initial access.

In some embodiments, the TRP will configure one of the two modes of the GF mode based on user traffic types. For example, for URLLC the TRP will configure the UE for the first mode and for mMTC the TRP will configure the UE for the second mode. In the first mode, the UEs do not need to listen for a dynamic activation instruction, the UE simply follows an "arrive and go" procedure. In the second mode, the TRP will dynamically indicate (e.g., PDCCH-like control channel, DCI or broadcast channel) if the current one or next one or more pre-configured resources are allowed to be used or not. As indicated above, the second mode can be used to share the GF resources with GB (i.e., GF and GB traffic multiplexing) to enhance the resource utilization, with a trade-off between control signaling overhead versus resource utilization and collision control.

Referring back to FIG. 4A, in the step 403, UE resource assignment for individual or group based resources for grant-free transmissions and the UE specific resource allocation are provided by the TRP using the signalling options given below. During step 403, the information provided to the UE regarding the allocation transmission resource may also include Timing Advance (TA) adjustment, and MCS configuration, and UL grant. Such information may be provided using a dedicated physical downlink shared channel (PDSCH)-like channel. In some embodiments, the information may be transmitted using Radio Resource Control (RRC) signaling. In some embodiments, the fields being used to transmit information to define the grant free resource may be transmitted using fields that are similar to LTE semi-persistent scheduling (SPS) fields. In some embodiments, step 403 includes a signalling or an indication, or both, for the UE, that is transmitted in GF mode and the configuration of grant-free transmission resources for the UE. The indication of the UE to be transmitted in GF mode and the resource configuration for the GF UE can be in the same message or transmitted in separate messages.

In some embodiments, step 403 includes a signalling or an indication, or both, for an UL transmission scheme without grant of a specific transmission resource that can support K (K>=1) repetitions, in addition to an initial transmission, with the same or different Redundancy Version (RV) and optionally with different MCS, for the same transport block. The number of repetitions, K, is a configurable parameter, which is determined by many factors, such as UE channel conditions and MCS schemes; such a parameter can be UE-specific parameter or a common parameter to all UEs.

In other embodiments, multiple scenarios for applications of initial UL transmissions with K repetitions can be configured, for example, in support of URLLC services. A first scenario may pertain to after the initial transmission, the UE is monitoring for any ACK message from the TRP and gets ready to terminate the transmissions during the K repetitions when the UE has successfully transmitted the data before the K transmissions have finished. However, with a particular delay in receiving an ACK from the TRP, one or more additional transmissions may incur. Avoiding such a delay may be possible by using fast feedback, e.g., in a self-contained frame structure. A second scenario may pertain to after the UE initial transmission and finishing all the K repetition transmissions without seeing any ACK. After the K repetition transmissions, the UE will stop and wait for an acknowledgement (ACK) or negative acknowledge (NACK) from The TRP. If an ACK is received, the UE will stop the current packet transmission, otherwise (if a NACK is received), the UE will perform grant-free re-transmissions, where the GF re-transmission can also be the repetition transmissions with pre-configured K values that are optionally different from the initial repetition number.

In some embodiments, step 403 of FIG. 4A includes a signalling or an indication, or both, for an UL transmission scheme without grant of a transmission resource that includes hopping mechanisms that can be applied over multiple transmissions or the K repetitions. For example, the TPR configures the transmission resource assignment to comprise an index, the index having a pre-defined relationship with a transmission resource hopping pattern, the transmission resource hopping pattern comprising a time-frequency resource hopping pattern and a reference signal (RS) pattern, the combination of each time-frequency resource and each RS being unique for each UE.

In some embodiments, step 403 includes a configuration on at least one HARQ process for GF enabled UEs, thus one or more HARQ process IDs can be pre-defined by high-layer signalling, and/or DCI signalling. To support HARQ GF transmissions and signalling combining for detection, the transmission identifications for initial and retransmissions from a same packet of the same UE should be detected and processed at the receiver to perform HARQ operations. One of the solutions is to employ two or more pilots per UE per HARQ process for the initial and retransmissions of the packet of the UE.

In some embodiments, step 403 includes a DL resource configuration for the GF enabled UEs for DL GF transmissions. This may be used for certain service or application scenarios; for example, mMTC services have a large number of UEs in the system. Using a DL resource configuration for the GF enabled UEs can avoid other types of signaling that may be problematic. For example, using DL DCI dynamic resource grant and scheduling can result in congestion due to significant signalling overhead.

In some embodiments, step 403 includes a signalling or an indication, or both, for an UL transmission scheme without grant of a transmission resource in a way similar to LTE semi-persistent scheduling (SPS) configurations with enhancements. For example, one more field can be added to an SPS-like configuration to include configurable repetition parameter, K, such that SPS will start initial transmissions, each including K multiple consecutive redundant transmissions for each new packet. The UE can be configured to monitor the ACK feedback in every time slot during the K-repetition transmissions in order to be terminated earlier before the K transmissions. Also, an SPS periodicity parameter value can be configured to be any integer number.

In step 404, the UE operating in GF mode performs the UL transmission based on the assigned transmission resource. The detailed data format and TRP detections may be as shown in the embodiment of FIGS. 3A to 3C. However, as described above, the UE performs the UL transmission in one of the two modes, either "arrive and go" or once the UE has received an activation message from the TRP that the pre-allocated resource is available at the signalling time slot.

When the UE is known to be using the GB mode, in step 405 the UE performs initial access to the network using a default access region. In some embodiments, the default access region may be defined for the UE based on system signaling broadcast by the TRP. In some embodiments, the initial access may also serve as a first time scheduling request (SR). In such a case, step 406 may not be required.

In step 406, if utilized, the UE transmits a SR once the UE has configured a UL control channel, such as, for example, a Physical Uplink Control Channel (PUCCH).

In step 407, the TRP selects a GB allocation scheme for UE2. In this example the TRP may have determined to use a GB allocation to UE2 based on the various options above.

Step 408 involves the TRP transmitting the resource allocation to the UE.

Step 409 involves the UE transmitting at the appropriate time based on the GB scheduling. It is also to be understood that there may be acknowledgement of the data received by the TRP. Examples of the acknowledge processes may be found in portions of FIGS. 6A to 6G.

Figure 4B:
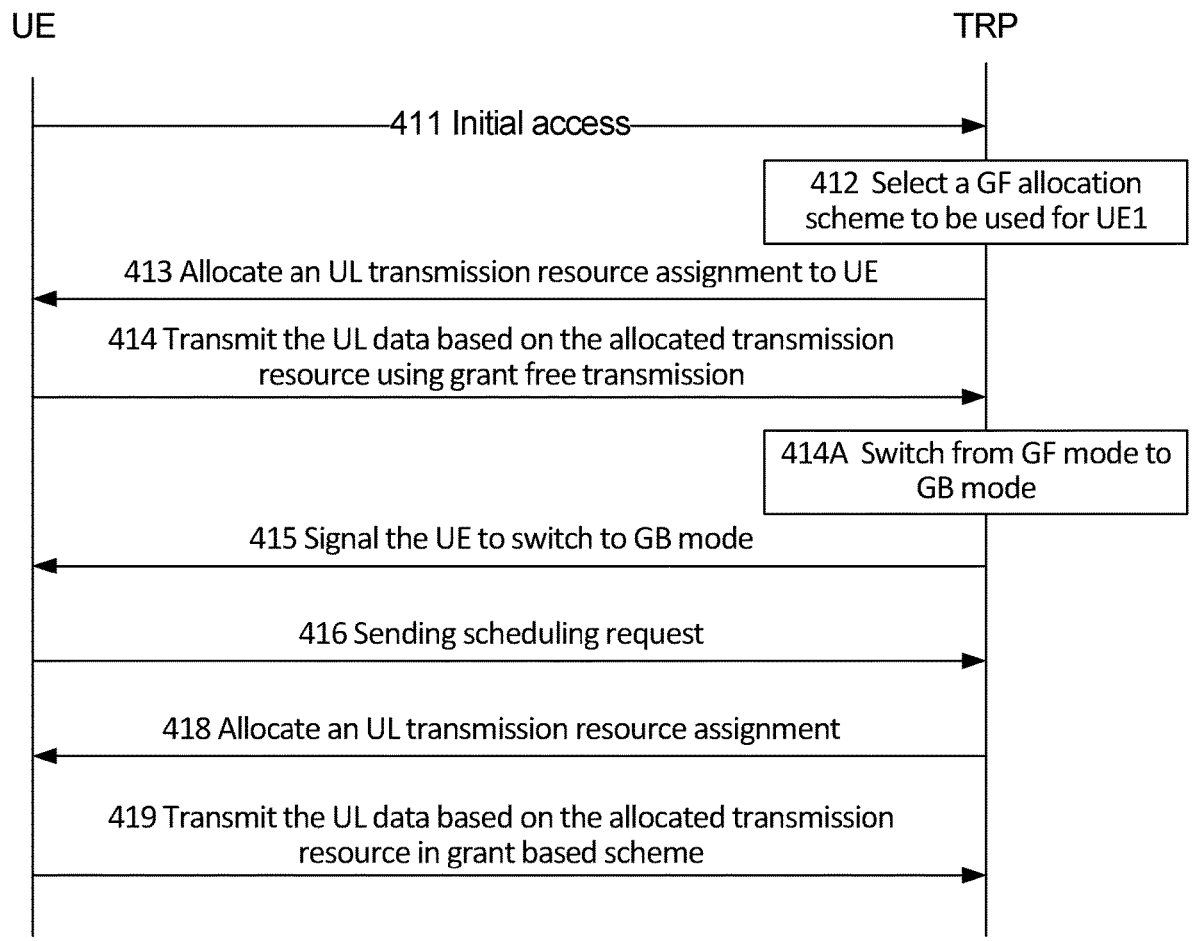
FIGS. 4B to 4D are signalling diagrams illustrating various examples of communications between a UE and a base station according to embodiments disclosed herein.
Figure 4C:
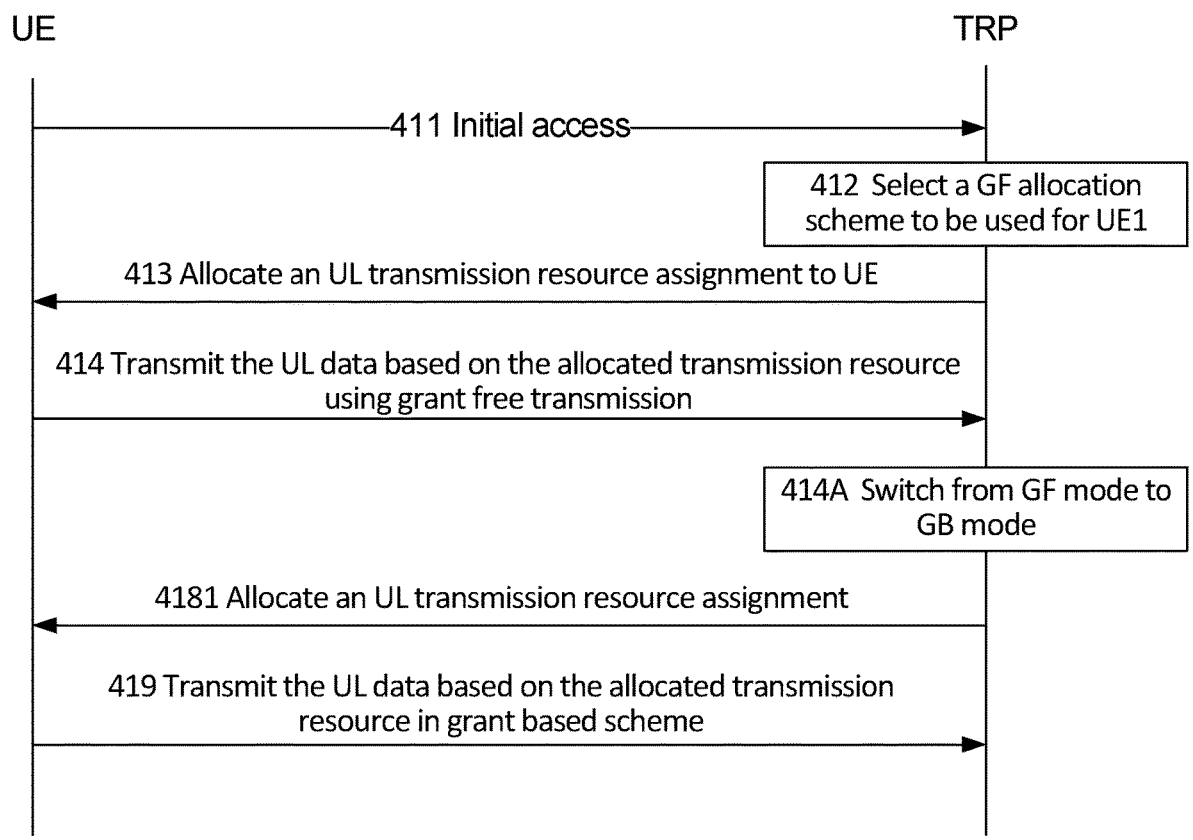
Figure 4D:
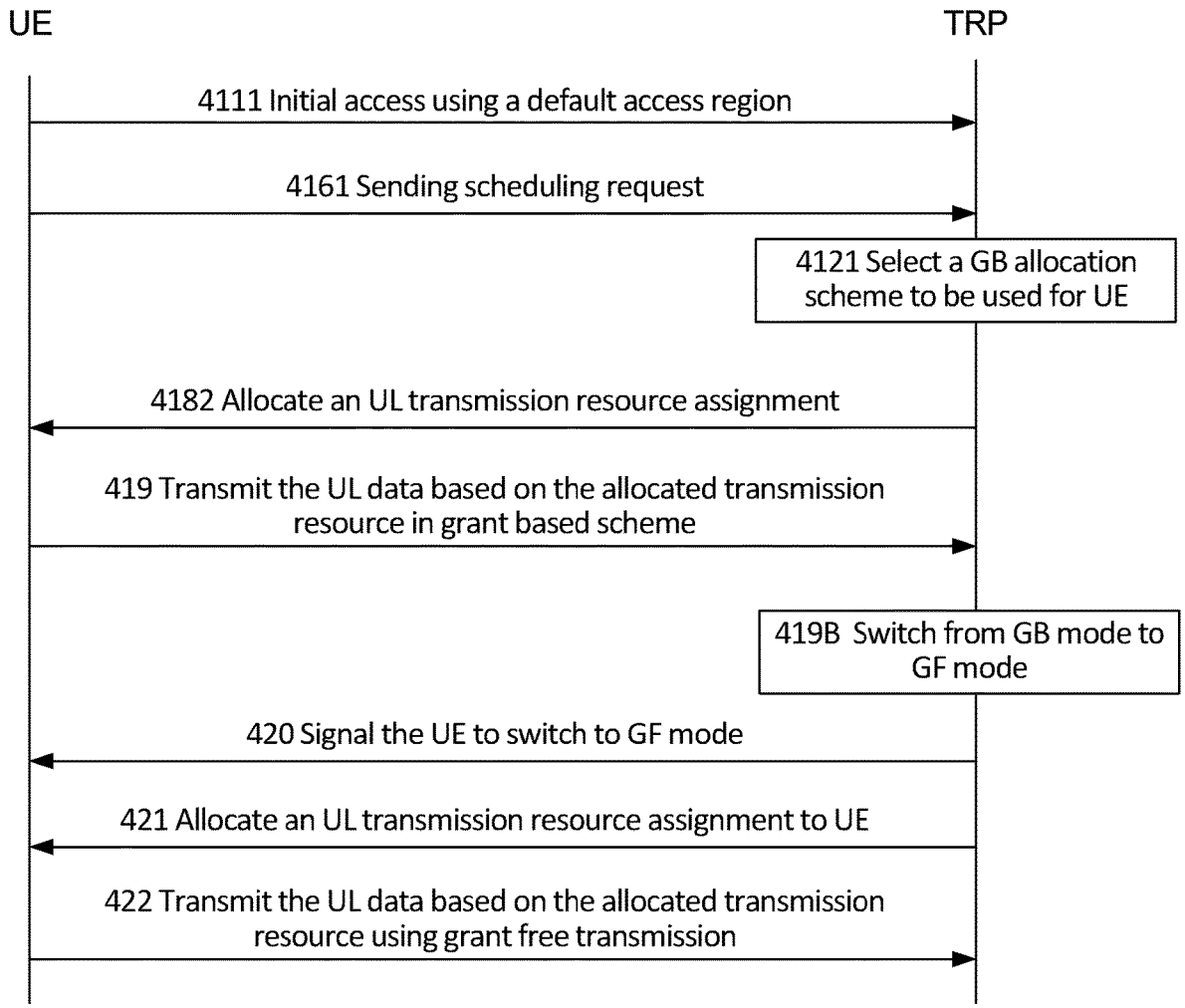

FIG. 4A includes the example of when a UE (UE1) is currently operating in a GF allocation mode and the TRP determines that the UE should be allocated a GF transmission resource and when a UE (UE2) is currently operating in a GB allocation mode and the TRP determines that the UE should be allocated a GB transmission resource. FIGS. 4B and 4C include examples of when a UE is currently operating in a GF allocation mode and then the TRP determines that the UE should be allocated a GB transmission resource. FIG. 4D includes an example of when a UE is currently operating in a GB allocation mode and then the TRP determines that the UE should be allocated a GF transmission resource.

Referring to FIG. 4B, in step 411 the UE initially accesses the network.

In step 412, the TRP selects the allocation scheme to be used by the UE is a GF mode. The determination made by the TRP may be based on the options described in detail above for determining if the UE should be allocated a GF allocation or a GB allocation.

In step 413, UE group based resources for grant-free transmissions and UE specific resource allocation are provided by the TRP using signalling options described below. The UE group based resource and UE specific resource information may be provided to the UE by various types of signalling. Examples of such types of signalling may include, but are not limited to, broadcast signalling or semi-persistent signaling, e.g., using radio resource control (RRC) signaling and Downlink Control Information (DCI) of PDCCH-like channels, RRC signaling, e.g., Dedicated UE specific channel using Physical Downlink Shared Channel (PDSCH)-like channel, dynamic signaling, e.g., using DCI of Physical Downlink Control Channel (PDCCH)-like channel, or UE specific signaling or UE group based signaling, e.g., shared resources can be broadcast signaled. During step 413, the information provided to the UE regarding the allocation transmission resource may also include Timing Advance (TA) adjustment, and MCS configuration, and UL grant. Such information may be provided using a dedicated PDSCH-like channel.

In step 414, the UE operating in GF mode performs the UL transmission based on the assigned transmission resource. The detailed data format and TRP detections may be as shown in the embodiment of FIGS. 3A to 3C. However, as described above, the UE performs the UL transmission in one of the two modes, either "arrive and go" or once the UE has received an activation message from the TRP that the pre-allocated resource is available at the signalling time slot.

At some point subsequent to step 414, the TRP makes a decision 414A that the UE should switch from GF mode to a GB mode. The decision made by the TRP can be based one or more factors in determining whether to perform a grant-free to grant-based switch. The following are at least some of the one or more factors that may affect the TRP's decision.

A grant-free message sent by the UE includes a buffer status report indicating that the UE has data (or more data) to send. In response, the TRP may perform a grant-free to grant-based switch.

The data in a grant-free message is unsuccessfully decoded. In response, the TRP may perform a grant-free to grant-based switch for a retransmission of the data.

Another factor may be related to latency. If a UE is close to a pre-defined latency boundary, then the TRP may perform a grant-free to grant-based switch. If the TRP does not perform the switch, the TRP may instead send an ACK or NACK without a scheduling grant, or the TRP may not send anything. Any subsequent transmissions (or retransmissions) by the UE may then be sent via grant-free uplink transmissions. More generally, regardless of a latency requirement, if the TRP determines that a grant-free to grant-based switch for a UE is not to be performed, then that UE may continue grant-free transmissions/retransmissions.

Another factor may be related to a number of transmissions. For example, if a UE has sent several (e.g. three) retransmissions of data via grant-free uplink transmission, and decoding of the data by the TRP still fails, then the TRP may perform a grant-free to grant-based switch by sending a scheduling grant for the next retransmission. In some embodiments, the number of retransmissions may be determined by a reference signal identification (e.g. the reference signal used in the retransmission) or by a separate indicator sent by the UE in the grant-free uplink transmission.

Another factor that may influence the TRP's decision is that the UE may send an indicator that indicates that the UE desires to switch to grant-based uplink transmission, based on the UE's known circumstances or requirements. This may include, but is not limited to, the UE's latency requirement, traffic load, channel conditions, etc. The TRP may perform a grant-free to grant-based switch if the UE indicates a desire to switch to grant-based uplink transmission.

Another factor that may influence the TRP's decision is the traffic load of grant-free UEs, e.g. the number of transmissions that arrive from grant-free UEs in a current or recent subframe(s). If the number of grant-free uplink transmissions and/or the number of UEs permitted to send grant-free uplink transmissions exceeds a certain threshold, then in response, a grant-free to grant-based switch may be performed for one or more UEs.

Another factor that may influence the TRP's decision is if there is a potential future collision from a currently detected UE operating in grant-free transmission mode. In such a scenario, a grant-free to grant-based switch may be performed to try to avoid the potential future collision.

Another factor that may influence the TRP's decision is Quality of Service (QoS) requirements. Depending upon the QoS requirements of a UE sending a grant-free uplink transmission, a grant-free to grant-based switch may be initiated by the TRP for that UE.

In step 415, the TRP signals the UE to switch to GB mode. The signal may be sent through DCI, higher layer signaling (e.g. RRC) or common control channel (e.g. for example through paging). The DCI may contain a new field for the indicator that indicates the UE is being switched from GF mode to GB mode. In some embodiments, the indicator may contain only one bit. In some embodiments, the indication for the UE to switch may be implied using one of an existing field in the DCI format for uplink scheduling. Similarly, if the signal is sent using RRC signaling, the RRC signaling may contain a regular RRC signaling format for uplink scheduling with additional fields to indicate a switch from GF mode to GB mode. In some embodiments, the indicator may contain only one bit. In some embodiment, the indicators may be implied using one of existing field in the RRC signaling format.

After receiving the signal to switch to GB mode, the UE will switch to GB mode. In step 416, the UE sends a scheduling request once the UE has configured a UL control channel, such as a Physical Uplink Control Channel (PUCCH), to communicate the scheduling request to the TRP.

Step 418 involves the TRP allocating an UL transmission resource assignment to the UE. The assignment may be made using a DL control channel. The step may also include an indicator to notify the UE to switch back to GF after a first grant-based transmission. In some embodiments, this indicator is not explicitly sent and by default the UE remains in the grant-based transmission mode after the grant-based transmission in step 419. In some other embodiments, the indicator is not explicitly sent and by default the UE switches back to grant-free transmission after the grant-based transmission in step 419.

Step 419 involves the UE transmitting data to the TRP at the appropriate time based on the allocated GB transmission resource signaled in step 418. It is also to be understood that there may be acknowledgement of the data received by the TRP. Examples of the acknowledge processes may be found in portions of FIGS. 6A to 6G.

FIG. 4C shows a further example of how the TRP may change the status of the UE from a GF mode to a GB mode.

In step 411, the UE initially accesses the network.

In step 412, the TRP selects, based on reasoning described above, that the allocation scheme to be used by the UE is a GF mode. The detailed allocation scheme may include transmitting information defining the GF resource.

In step 413, the UE group based resources for grant-free transmissions and the UE specific resource allocation are provided by the TRP, using the signalling options described below. The UE group based resource and UE specific resource information may be provided to the UE by various types of signalling. Examples of such types of signalling may include, but are not limited to, broadcast signalling or semi-persistent signaling, e.g., using radio resource control (RRC) signaling and Downlink Control Information (DCI) of PDCCH-like channels; RRC signaling, e.g., Dedicated UE specific channel using Physical Downlink Shared Channel (PDSCH)-like channel; through dynamic signaling, e.g., using DCI of Physical Downlink Control Channel (PDCCH)-like channel; UE specific signaling or UE group based signaling, e.g., shared resources can be broadcast signaled. During step 413, the information provided to the UE regarding the allocation transmission resource may also include Timing Advance (TA) adjustment, and MCS configuration, and UL grant. Such information may be provided using a dedicated PDSCH-like channel.

In step 414, the UE operating in GF mode performs the UL transmission based on the assigned transmission resource. The detailed data format and TRP detections may be as shown in the embodiment of FIGS. 3A to 3C. Once again, the UE can perform the UL transmission in one of the two modes, either "arrive and go" or once the UE has received an activation message from the TRP that the pre-allocated resource is available at the signalling time slot.

At some point subsequent to step 414, the TRP makes a decision 414A that the UE should switch from GF mode to a GB mode. The decision made by the TRP can be based one or more factors in determining whether to perform a grant-free to grant-based switch. The following are at least some of the one or more factors that may affect the TRP's decision.

A grant-free message sent by the UE includes a buffer status report indicating that the UE has data (or more data) to send. In response, the TRP may perform a grant-free to grant-based switch.

The data in a grant-free message is unsuccessfully decoded. In response, the TRP may perform a grant-free to grant-based switch for a retransmission of the data.

Another factor may be related to latency. If a UE is close to a pre-defined latency boundary, then the TRP may perform a grant-free to grant-based switch. If the TRP does not perform the switch, the TRP may instead send an ACK or NACK without a scheduling grant, or the TRP may not send anything. Any subsequent transmissions (or retransmissions) by the UE may then be sent via grant-free uplink transmissions. More generally, regardless of a latency requirement, if the TRP determines that a grant-free to grant-based switch for a UE is not to be performed, then that UE may continue grant-free transmissions/retransmissions.

Another factor may be related to a number of transmissions. For example, if a UE has sent several (e.g. three) retransmissions of data via grant-free uplink transmission, and decoding of the data by the TRP still fails, then the TRP may perform a grant-free to grant-based switch by sending a scheduling grant for the next retransmission. In some embodiments, the number of retransmissions may be determined by a reference signal identification (e.g. the reference signal used in the retransmission) or by a separate indicator sent by the UE in the grant-free uplink transmission.

Another factor that may influence the TRP's decision is that the UE may send an indicator that notifies the TRP that the UE desires to switch to grant-based uplink transmission, based on the UE's known circumstances or requirements. This may include, but is not limited to, the UE's latency requirement, traffic load, channel conditions, etc. The TRP may perform a grant-free to grant-based switch if the UE indicates a desire to switch to grant-based uplink transmission.

Another factor that may influence the TRP's decision is the traffic load of grant-free UEs, e.g. the number of transmissions that arrive from grant-free UEs in a current or recent subframe(s). If the number of grant-free uplink transmissions and/or the number of UEs permitted to send grant-free uplink transmissions exceeds a certain threshold, then in response, a grant-free to grant-based switch may be performed for one or more UEs.

Another factor that may influence the TRP's decision is if there is a potential future collision from a currently detected UE operating in grant-free transmission mode. In such a scenario, a grant-free to grant-based switch may be performed to try to avoid the potential future collision.

Another factor that may influence the TRP's decision is Quality of Service (QoS) requirements. Depending upon the QoS requirements of a UE sending a grant-free uplink transmission, a grant-free to grant-based switch may be initiated by the TRP for that UE.

Instead of explicitly signaling the UE to switch to GB mode and having the UE sending a scheduling request as described in relation to FIG. 4B, in step 4181 of FIG. 4C, the TRP directly transmits an UL transmission resource assignment to the UE. The transmission resource assignment carries the information that includes a full scheduling grant of the next transmission. This assignment may also contain an indication that the UE should be switched to grant-based transmission. In some embodiments, the indication is not explicitly transmitted to the UE, but based on the assignment of grant-based resources, the UE implicitly determines that the UE should switch to grant-based transmission. In some embodiments, the allocation of resource assignments in 4181 may also include an indicator notifying the UE to switch back to grant-free transmission mode or stay in grant-based transmission mode after the grant-based transmission in step 419. In some embodiments, this indicator is not explicitly sent and by default the UE by remains in grant-based transmission mode after the grant-based transmission in step 419. In some other embodiments, the indicator is not explicitly sent and by default the UE by switches back to grant-free transmission after the grant-based transmission in step 419. In some embodiments, the assignment of step 4181 may be transmitted using DCI. The DCI may contain a regular DCI format for uplink scheduling with one or more additional fields to indicate one or both indicators described above. In some embodiments, each indicator may contain only one bit. In some embodiments, the indicators may be implied using an existing field in the DCI format for uplink scheduling.

Step 419 involves the UE transmitting at the appropriate time based on the GB scheduling in step 4181. It is also to be understood that there may be acknowledgement of the data received by the TRP. Examples of the acknowledge processes may be found in portions of FIGS. 6A to 6G.

In some embodiments, in step 414, the UE may send a buffer status report (BSR) or a scheduling request (SR) along with data transmission. In response to the SR/BSR, the TRP may send a scheduling assignment in step 4181 for a new transmission.

In some embodiments, step 4181 may be part of a retransmission process in which the scheduling assignment of the GB scheduling assignment is for a retransmission of the GF transmission in step 414. In this scenario, the UL data transmission in 419 corresponds to a retransmission of the UL data in 414.

FIG. 4D shows an example of how when a UE is in a GB mode, the TRP may change the operation of the UE to a GF mode.

In step 4111 the UE initially accesses the network using a default access region known to the UE for such a purpose. In some embodiments, the default access region may be defined for the UE based on system signaling broadcast by the TRP.

In step 4161, the UE transmits a scheduling request once the UE has configured a UL control channel, such as for example a Physical Uplink Control Channel (PUCCH), for communicating the scheduling request to the TRP. In some other embodiments, the scheduling request sent in 4161 may be among part of the initial access process in step 4111. For example, the scheduling request can be sent implicitly or explicitly together with a preamble by the UE to the TRP in the initial access process.

In step 4121, the TRP selects an allocation scheme to be used by the UE the scheme selected is a GB scheme. This determination may be made based on, or related to, factors described below.

In response to determining that the UE should use the GB scheme, in step 4182, the TRP transmits an UL transmission resource assignment to the UE. The transmission of the assignment uses a GB transmission resource. In some embodiments, the assignment of the scheduling grant is transmitted using RRC signaling, or DCI, or a combination thereof.

Step 419 involves the UE transmitting at the appropriate time based on the GB transmission resource sent in step 4182.

At some point subsequent to step 419, the TRP determines 419B that the UE should be changed from GB mode to GF mode. The decision made by the TRP can be based one or more factors in determining whether to perform a grant-based to grant-free switch. The following are at least some of the one or more factors that may affect the TRP's decision.

Another factor may be related to latency. If a UE has a tight requirement on latency, but has been configured as a grant-based mode only UE, then the TRP may perform a grant-based to grant-free mode switch such that for the following transmission, the UE can avoid delay due to the round trip time of sending a scheduling request and waiting for a scheduling grant before the transmission.

Another factor that may influence the TRP's decision is packet size. For example, if a UE has small packets to be transmitted in a following uplink transmission, the TRP may perform a grant-based to grant-free switch as grant-free transmission is more efficient for small packet transmission due to savings of signalling overhead and latency reduction.

Another factor that may influence the TRP's decision is potential overhead savings. For example, if the TRP determines that overhead involved in scheduling the UEs is not worthwhile, then TRP may perform a grant-free to grant-based switch for one or multiple UEs for savings of signalling overhead.

Another factor that may influence the TRP's decision is the UE sending an indicator that notifies the TPR that the UE desires to switch to grant-free uplink transmission, based on the UE's known circumstances or requirements. This may include, but is not limited to, the UE's latency requirement, traffic load, channel conditions, etc. The TRP may perform a grant-based to grant-free switch if the UE indicates a desire to switch to grant-free uplink transmission.

Another factor that may influence the TRP's decision is the traffic load of grant-free UEs, e.g. the number of transmissions that arrive from grant-free UEs in a current or recent subframe(s). If the number of grant-free uplink transmissions and/or the number of UEs permitted to send grant-free uplink transmissions is below a certain threshold, then in response, a grant-based to grant-free switch may be performed for one or more UEs.

Another factor that may influence the TRP's decision is Quality of Service (QoS) requirements. Depending upon the QoS requirements of a UE sending a grant-free uplink transmission, a grant-based to grant-free switch may be initiated by the TRP for that UE.

In step 420, the TRP signals the UE to switch from GB mode to GF mode. The signal may contain a one bit indicator that specifies to switch the UE from GB mode to GF mode. The transmission of the signal to switch to GF (the indicator) may be sent through DCI, higher layer signaling (e.g. RRC) or common control channel (e.g. for example through paging).

Step 421 is an optional step that involves the TRP transmitting an UL transmission resource assignment to the UE to be used for grant-free transmission. If the UE was previously configured in GF mode and assigned a GF resource and the UE has maintained that configuration information, then the TRP may not need to resend the resource allocation. However, if the UE was not previously configured in GF mode or not previously assigned a GF resource, or both, the TRP may send the appropriate information. When the GF transmission resource is transmitted, the signal may be sent through DCI, higher layer signaling (e.g. RRC) or common control channel (e.g. for example through paging).

In some embodiments, the information being transmitted in steps 420 and 421, which are shown being transmitted separately, may be transmitted together.

After receiving the signal to switch to GF transmission, the UE will switch to GF mode. In step 422, the UE transmits at the appropriate time based on the GF resource that is either previously provided or provided at the time. It is also to be understood that there may be acknowledgement of the data received by the TRP. Examples of the acknowledge processes may be found in portions of FIGS. 6A to 6G.

After step 422, by default the UE may remain in GF transmission mode for the subsequent uplink transmissions. In some other embodiments, by default the UE may switch back to GB transmission mode for subsequent uplink transmissions after step 422. In some embodiments, the allocation of resource assignments in 421 may also include an indicator notifying the UE to remain in grant-free mode or switch back to grant-based transmission mode after the grant-free transmission in step 422. In which case, based on this indicator, the UE will perform grant-free or grant-based transmission after step 422.

For any of the examples of FIGS. 4A to 4D, if resource pre-allocation is applied, two scenarios can be supported. In particular, a first scenario involves either transmission of a first data package and retransmission of that same data package in a single time period or transmission of a first data package and transmission of a new data package in a single time period. A second scenario involves a periodicity scheme that changes the resource allocation of a given UE from time period to time period. The periodicity may be of a different duration for different UEs. These two scenarios can be seen in FIGS. 5A, 5B and 5C.

Figure 5A:
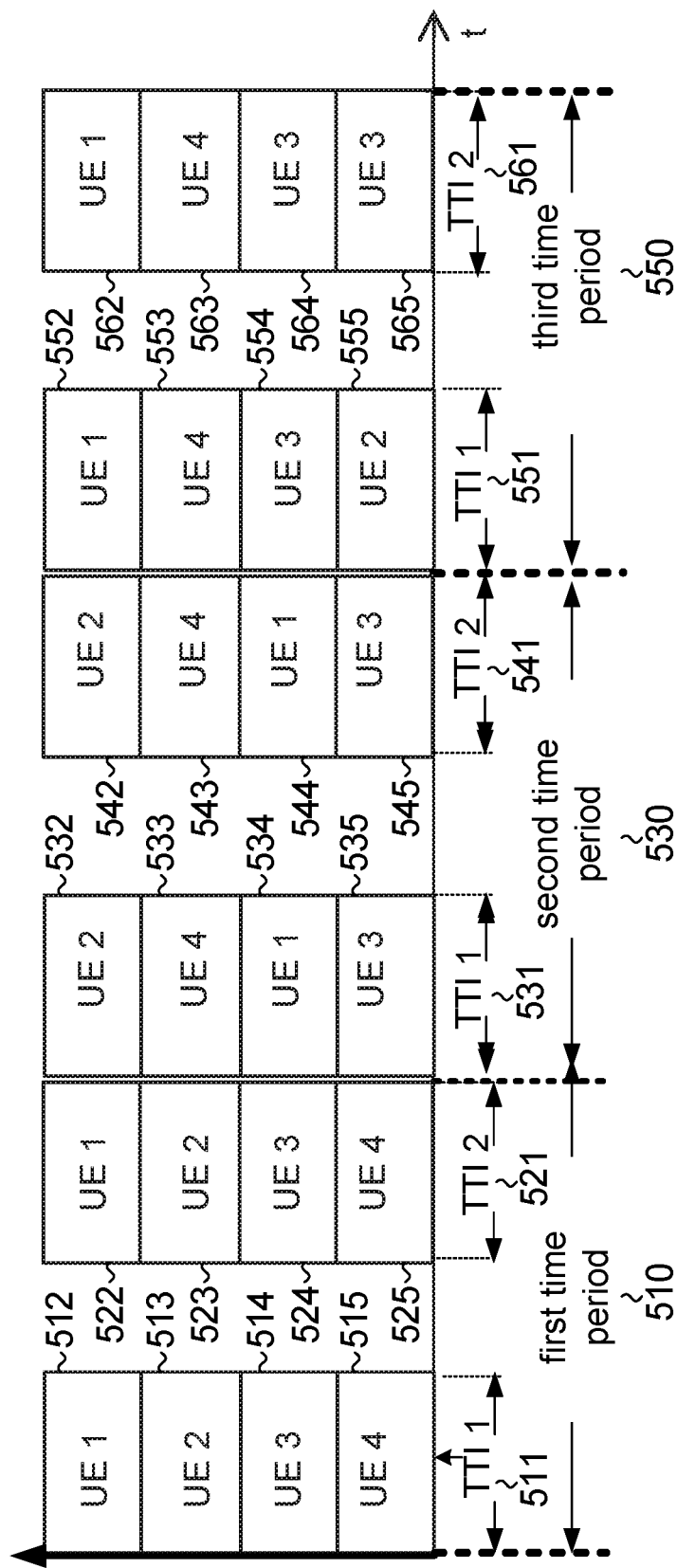
FIGS. 5A, 5B and 5C illustrate grant free allocation of resources for single user per resource (FIG. 5A), multiple users per resource (FIG. 5B) and a mixture of single and multiple users per resource (FIG. 5C)

FIG. 5A illustrates three time periods 510, 530, 550, in which each time period includes multiple transmission time intervals (TTI), two of which are TTI 1 (511, 531, 551) and TTI 2 (521, 541, 561). Each TTI includes four multiple access contention transmission units (MA CTU), which are transmission resources of a set of time-frequency resources that are shared amongst a group of UEs and must be allocated using a contention scheme. FIG. 5A illustrates an example in which only a single UE is allocated to each of the transmission resources. As can be seen in the first time period 510, in TTI 1 511, UE1 is allocated to a first resource element 512, UE2 is allocated to a second resource element 513, UE3 is allocated to a third resource element 514 and UE4 is allocated to a fourth resource element 518. In a subsequent TTI, i.e. TTI 2 521, a similar allocation for each of the UEs is made. In a second time period 530, in TTI 1 531 and TTI 2 541, UE1, UE2, UE 3 and UE4 are allocated to different resource elements than the first time period. In the third period 550, in TTI 1 551 and TTI 2 561, UE1, UE2, UE 3 and UE4 are allocated once again to different resource elements than the first and second time periods.

Figure 5B:
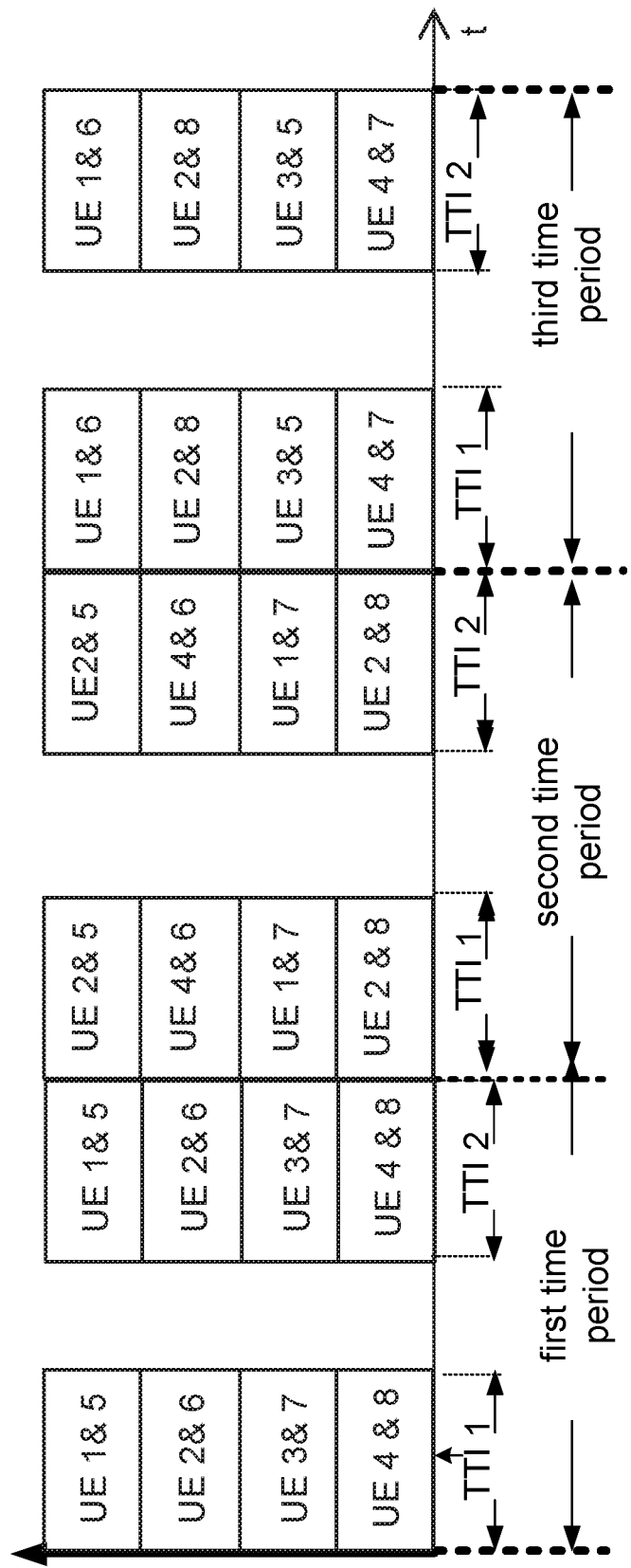
Figure 5C:
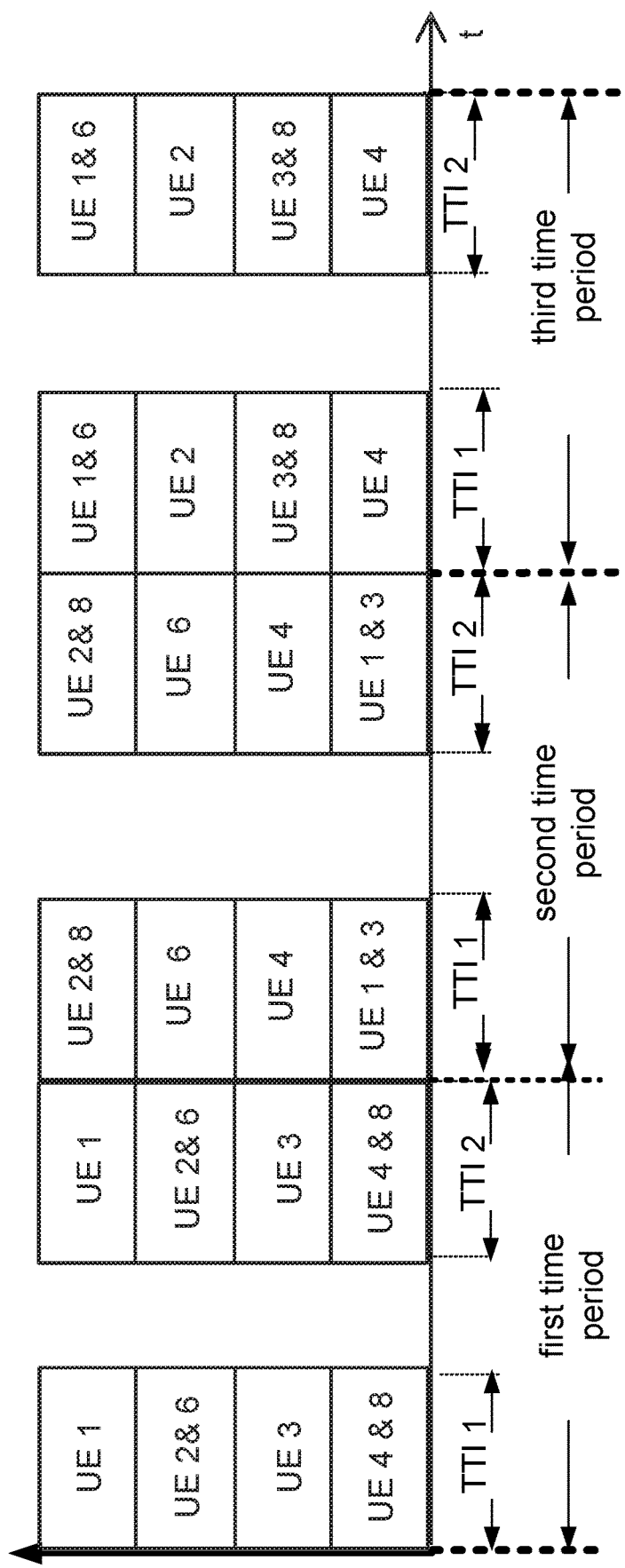

FIGS. 5B and 5C include a similar arrangement of three time periods, each having multiple TTIs, two of which are TTI 1 and TTI 2. For FIG. 5B, each of the resource elements is allocated to two UEs. In FIG. 5C, each of the resource elements may be either allocated to a single UE or two UEs.

Referring to FIG. 5A, in the first time period, the transmission resource elements 512 to 515 in TTI 1 511 are pre-configured for initial transmission, for example, the UE 1 transmits a first initial data package 1 using resource element 512 of the first time period 510. The transmission resource 522 in TTI 2 521 is pre-configured for retransmission and UE 1 transmits the first retransmission of the data package 1 in the TTI 2 522 in the first time period 510. Alternatively, the transmission resource 522 in TTI 2 521 is pre-configured for a second initial data package 2, and the UE 1 transmits the second initial data package 2 in the TTI 2 522 in the first time period 521.

The transmission resource may also be pre-configured using a periodicity scheme. The TRP allocates the transmission resources using the periodicity scheme. For an example, UE 1 can transmit an initial data packet 1 using allocated transmission resource 534 in the TTI 1 531 in the second time period 530, and UE 1 ca transmit the retransmission of data packet 1 or a second initial data packet 2 using transmission resource 544 in the TTI 2 541 in the second time period 530.

FIG. 5A shows UE1 using only a single MA CTU. More generally, the TRP can allocate multiple MA CTUs for UE1 in the initial transmission and/or retransmission based on the data traffic.

The assigned resource can be used by more than one UE. FIG. 5B illustrates that multiple UEs can be assigned to a same transmission resource. In particular, FIG. 5B shows two UEs allocated to the same transmission resource.

FIG. 5C illustrates the combination of a single UE assigned to one transmission resource for some transmission resources and multiple UEs assigned to a same transmission resource for other transmission resources.

If the pre-assigned resources are shared by more than one UE, different demodulation reference signals (DMRS) should be applied by the UEs sharing the same resources, which is shown in FIG. 3A. In this embodiment, the DMRS can be allocated using one of two options, either signaled by the network or selected by the UE according to a pre-defined rule. The DMRS allocation can support any one of multiple schemes of FDM, TDM or CDM.

Different DMRS or pilots, either orthogonal or non-orthogonal, can be effectively assigned to avoid or reduce pilot collisions amongst UEs due to the fact that the number of UEs in a shared MA resource group is small.

HARQ may be performed for the grant-free uplink transmissions. For example, if the data in the initial grant-free uplink transmission is not successfully decoded by the TRP, then a retransmission may be performed by the UE. The retransmission may include a retransmission of the initial data and/or further information for decoding the initial data. For example, the retransmission data may include some or all of the original data and/or parity information. The TRP may perform HARQ combining as follows: instead of discarding unsuccessfully decoded initial data, the unsuccessfully decoded initial data may be stored at the TRP in memory and combined with received retransmission data to try to successfully decode the initial data. When HARQ combining is performed, the retransmission data from the UE may not need to be a complete retransmission of the initial data. The retransmission may carry less data, such as some or all of the parity bits associated with the initial data. One type of HARQ combining that may be used is soft combining, such as chase combining or incremental redundancy.

The TRP detects the data after receiving the first batch data transmission. In some embodiments, when the UE sends a message to the TRP, the TRP first attempts to detect the MA signature. Detecting the MA signature is referred to as activity detection. By successfully performing activity detection, the TRP knows that a UE has sent a grant-free uplink transmission. However, successful activity detection may or may not reveal the identity of the UE to the TRP. If there is a predefined RS pattern between a UE and an MA signature, then successful activity detection reveals the identity of the UE that sent the grant-free uplink transmission. In some embodiments, activity detection may further include obtaining the UE ID, e.g. if the UE ID is encoded separately from the data.

After activity detection is successful, the TRP then attempts to perform channel estimation based on the MA signature and optionally additional reference signals multiplexed with the data message, and then decode the data.

ACK/NACK Communication

When the TRP successfully decodes the data of a grant-free uplink transmission, a positive acknowledgement (ACK) may be sent to the UE. In some embodiments, a negative acknowledgement (NACK) may be sent from the TRP when the data is not successfully decoded. Methods for communicating the ACK and/or NACK from the TRP to the UEs are described below.

Figure 6A:
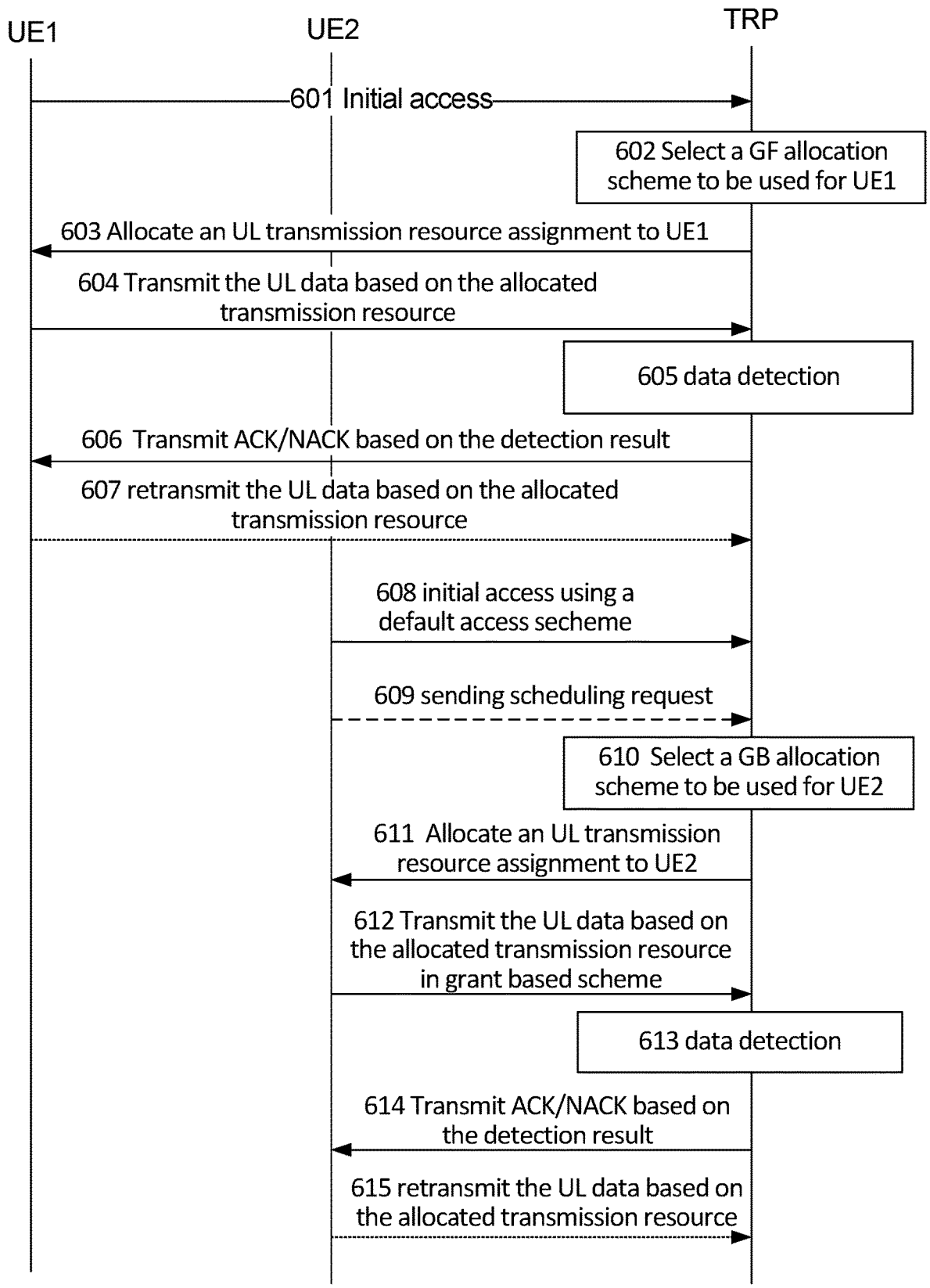
FIG. 6A is a signalling diagram illustrating an example of communications between a grant free UE and a base station and a grant based UE and a base station according to embodiments disclosed herein.

FIG. 6A shows a signalling diagram for grant-free and grant-based communication including use of ACK/NACK communications between two UEs and TPR. In step 601 the UE1 initially accesses the network. In step 602, the TRP selects the grant free allocation scheme to be used by UE1. Factors involved in how this decision is made are described above. In some embodiments, the UE is initially in a grant free allocation mode. In the step 603, a detailed resource allocation is provided to UE1 by the TPR. In step 604, UE1 operating in GF mode, performs the UL transmission based on the assigned transmission resource. Steps 601 to 604 are performed in a similar fashion to step 401 to 404 of FIG. 4A as described above.

At step 605, the TRP receives and detects the data sent by UE1. In some embodiments, this may be performed by activity detection as described above. At step 606 the TRP transmits an ACK/NACK based on whether the detection of the data was successful or not in step 605. If necessary, at step 607, i.e. if a NACK was transmitted by the TRP, UE1 retransmits the data using an allocated GF resource.

For the second UE, UE2, in step 608 UE2 performs initial access to the network. In some embodiments, the initial access may also serve as a first time scheduling request (SR). In such a case, step 609 may not be required.

In step 609, UE2 transmits a SR once UE2 has configured a UL control channel such as Physical Uplink Control Channel (PUCCH). Step 610 involves the TRP selecting an allocation scheme for UE2. Step 611 involves the TRP transmitting the allocation to UE2. Step 612 involves UE2 transmitting at the appropriate time based on the GB scheduling. Steps 609 to 612 are performed in a similar fashion to steps 405 to 409 of FIG. 4A as described above.

At step 613, the TRP receives and detects the data sent by UE2. At step 614 the TRP transmits an ACK/NACK based on whether the detection of the data was successful or not in step 613. If necessary, at step 615, i.e. if a NACK was transmitted by the TRP, UE2 retransmits the data using an allocated GB resource.

While the above description is described with respect to combined grant-free and grant-based uplink scheduling and transmission, it should be understood that a similar procedure could be implemented for each of grant-free and grant-based uplink scheduling and transmission, respectively.

FIG. 6A illustrates the signaling diagram for UE1 for which a grant free allocation scheme is selected and for UE 2 for which a grant based allocation scheme is selected. It is to be understood that this is simply representative of UEs of each allocation type. During implementation, there may be multiple UEs of each type in communication with the TRP. The following discussion provides additional details of HARQ operation for multiple UEs.

In a first implementation scenario, one or more UEs each send respective data to the TRP in a respective grant-free uplink transmission. The respective grant-free uplink transmissions may or may not be transmitted using the same resources. In any case, the TRP successfully decodes all of the transmitted data. Therefore, ACK message(s) is/are sent from the TRP to the UEs. In one embodiment, a separate ACK is transmitted from the TRP for each UE that sent uplink data in a grant-free uplink transmission. Each ACK is coupled with information uniquely specifying the UE to which the ACK belongs. For example, each ACK may be associated with a UE ID. As another example, if there is a one-to-one mapping between the UEs and MA signatures, then each ACK may be associated with an index identifying the MA signature of the uplink transmission being acknowledged. Each UE knows which MA signature it used to send its transmission, and so each UE will know from the indication of the MA signature which ACK is for the UE. If there is a one-to-one mapping between UEs and MA signatures, then a UE ID may not even be needed. In some embodiments, the TRP may transmit the ACK(s) on a dedicated downlink acknowledgement channel (e.g. a physical HARQ indicator channel (PHICH)). There may be a one-to-one mapping between the fields of the downlink acknowledgement channel and the uplink grant-free resources. A field of the downlink acknowledgement channel may be a time-frequency location of the downlink acknowledgement channel and/or a sequence used in the downlink acknowledgement channel. For example, the sequences used in the downlink acknowledgement channel may be four orthogonal codes, which can be mapped to four different MA signatures. For example, if the UE used time-frequency location A to send its grant-free uplink transmission, then the ACK for the UE is sent at time-frequency location B in the downlink acknowledgement channel. As another example, if the UE used time-frequency location A to send its grant-free uplink transmission, then the ACK for the UE is sent using code sequence C. In other embodiments, there may be a one-to-one mapping between the fields in the downlink acknowledgement channel and the UE ID. For example, any ACK for the UE is always sent at time-frequency location D and/or using sequence E in the downlink acknowledgement channel. In other embodiments, there may be a one-to-one mapping between the fields in the downlink acknowledgement channel and the MA signature. For example, whenever an MA signature is used for a grant-free uplink transmission, then any ACK corresponding to that uplink transmission is always sent at time-frequency location F and/or using sequence G in the downlink acknowledgement channel.

In some embodiments, the TRP may transmit an ACK without any UE information. If a UE that sent a grant-free uplink transmission subsequently sees the ACK, then the UE assumes that the data of its grant-free uplink transmission was successfully decoded.

In some embodiments, the TRP may transmit a group ACK. The group ACK may comprise a single ACK payload and a CRC. The payload may include an aggregation of all UE IDs or MA signatures corresponding to uplink transmissions that have been successfully decoded and are acknowledged by the TRP. Each UE that sent a grant-free uplink transmission then decodes the group ACK to see if a matching UE ID or MA signatures can be found in the group ACK payload and whether its grant-free uplink transmission was acknowledged. In some embodiments, a group ACK may be associated with a temporal group ID. The group ID may be derived from the grant-free resources. For example, if a group of UEs all use uplink resources C to respectively send a grant-free uplink transmission, then that group of UEs may be associated with a group ID corresponding to uplink resources C. In some embodiments, there may be a specific 1-bit field indicating that the ACK is a group ACK, and the location of time and frequency resources of the ACK is directly linked to the grant free transmission resources and a group ID may not be necessary. In some embodiments, there may be a reserved field (e.g. time-frequency location) in the downlink for sending a group ACK. The time-frequency location of the reserved field may be determined based on the location of the uplink resources used for the grant-free uplink transmissions. For example, if a group of UEs each send their grant-free uplink transmission within time-frequency region A, then the reserved field for the group ACK may be at time-frequency location B. The group ACK may be one bit: "0" for ACK and "1" for N/A, or vice versa. The bit value corresponding to "N/A" would be sent when no ACK needs to be transmitted by the TRP.

In another implementation scenario, one or more of the UEs each send respective data in a respective grant-free uplink transmission and the TRP successfully performs activity detection, but all decoding of the data fails. For example, if the MA signatures are reference signals, then reference signal detection may be successfully performed, but data decoding may still fail. Reference signal detection may be successful due to the following possible reasons: (1) there may be no collision of the reference signals, and any reference signal errors due to noise in the channel and interference from other reference signals are corrected because of the more robust MCS of the reference signal sequence; or (2) there may be reference signal collision, but any reference signal errors due to the collision and channel noise are corrected because of the more robust MCS of the reference signal sequence; or (3) due to the orthogonal characteristics among reference signals. Because activity detection was successful, but data decoding was unsuccessful, NACK message(s) may be sent from the TRP.

In one embodiment, a separate NACK is transmitted from the TRP for each uplink transmission for which data decoding failed. Each NACK may be associated with UE identifying information. For example, each NACK may be associated with an index identifying the MA signature of the uplink transmission corresponding to the NACK. If there is a one-to-one mapping between UEs and MA signatures, then a UE will be able to determine that the NACK belongs to it based on the MA signature identification coupled to the NACK. Even if there is not a one-to-one mapping between UEs and MA signatures, then any UE using a particular MA signature will retransmit its data if a NACK is received that is associated with that particular MA signature. In such a situation, unnecessary uplink retransmissions may sometimes occur, e.g. if two UEs use the same MA signature, and the data from one UE is successfully decoded by the TRP, and the data from another UE is not successfully decoded. The receipt of the NACK by both UEs will cause both UEs to retransmit the data even though one of the UEs does not need to retransmit its data.

In some embodiments, the variations described earlier for ACK can also be used for transmitting a NACK. As an example, the TRP may transmit the NACK(s) on a dedicated downlink acknowledgement channel, and there may be a one-to-one mapping between the fields in the downlink acknowledgement channel and the uplink resources used to send the uplink grant-free transmission. There may instead be a one-to-one mapping between the fields in the downlink acknowledgement channel and the UE ID or the MA signature used to send the uplink grant-free transmission. As another example, the TRP may transmit the NACK without any UE information. If a UE that sent a grant-free uplink transmission subsequently sees the NACK, then the UE assumes that the data of its grant-free uplink transmission was not successfully decoded. As another example, the TRP may transmit a group NACK. The group NACK may comprise a single NACK payload and a CRC. The payload may include an aggregation of all MA signatures corresponding to uplink transmissions that have been unsuccessfully decoded. The UE ID may be used instead of MA signatures if the UE ID is separate from the data, as in example 128 of FIG. 3A. Each UE that sent a grant-free uplink transmission decodes the group NACK to determine whether the UE's grant-free uplink transmission resulted in a NACK. In some embodiments, a group NACK may be associated with a temporal group ID. The group ID may be derived from the grant-free resources. In some embodiments, there may be a specific 1-bit field indicating that the NACK is a group NACK, and a group ID may not be necessary. In some embodiments, there may be a reserved field (e.g. time-frequency location) in the downlink for sending a group NACK. The time-frequency location of the reserved field may be determined based on the location of the uplink resources used for the grant-free uplink transmissions. For example, if a group of UEs each send their grant-free uplink transmission within time-frequency region A, then the reserved field for the group NACK may be at time-frequency location B. The group NACK may be one bit: "0" for NACK and "1" for N/A, or vice versa. The bit value corresponding to "N/A" would be sent when no NACK needs to be transmitted by the TRP. In another example, group NACK and group ACK may be used in the same time-frequency region A. The group NACK may be one bit: "0" for NACK and "1" for ACK, or vice versa.

In another implementation scenario, one or more of the UEs each send respective data in a respective grant-free uplink transmission, the TRP successfully performs activity detection, some data decoding is successful, and other data decoding fails. In one embodiment, an ACK is sent for each uplink data transmission that was successfully decoded by the TRP. Each ACK is coupled with corresponding UE identifying information, e.g. the UE ID or a MA signature index identifying what MA signature was used in the uplink transmission. A NACK is also sent for each uplink data transmission that was unsuccessfully decoded by the TRP. Each NACK may be coupled with corresponding UE identifying information, e.g. a MA signature index identifying what MA signature was used in the uplink transmission. In some embodiments, a single payload together with a CRC, may be transmitted from the TRP. The payload may include an aggregation of ACK and/or NACK information for different uplink transmissions.

In some embodiments, each ACK or NACK may be associated with an index identifying the MA signature of the uplink transmission corresponding to the ACK or NACK. If there is not a one-to-one mapping between UEs and MA signatures, then (as mentioned earlier) when a NACK is sent an unnecessary uplink retransmission may sometimes occur. Similarly, there may be situations in which a UE's data is not successfully decoded by the TRP, but the UE does not send a retransmission of the data, e.g. if two UEs use the same MA signature, and the data from one UE is successfully decoded by the TRP, and the data from another UE is not successfully decoded. An ACK may be sent that identifies the MA signature. The receipt of the ACK by both UEs will cause both UEs to consider their data transmission to have been successfully decoded, even though one of the UEs should instead retransmit its data. In this situation, if the UE ID of the successfully decoded UE is identified, the BS may choose to send an ACK with UE ID instead of MA signature. The UE that is not decoded successfully may not be able to find the matching ID in the ACK field and therefore does not assume the transmission is successful. In some embodiments, if the TRP receives two or more transmissions from different UEs having the same MA signature, a NACK identifying the MA signature is always sent if at least one of the transmissions is unsuccessfully decoded. In such a method, having some UEs possibly unnecessarily retransmit successfully decoded data is favoured over having some UEs not retransmit unsuccessfully decoded data. Regardless of the different scenarios discussed above, in some embodiments the TRP may not send NACKs for grant-free uplink transmissions. The UEs are configured to assume a NACK in the absence of an ACK. The following benefits of not sending a NACK may be achieved. The amount of signaling may be reduced by not sending NACKs. Also, ambiguities associated with sending a NACK may be eliminated. For example, if a NACK is being sent, then the UE ID associated with the NACK may not have been decoded by the TRP. Therefore, the NACK may not be linked to a specific UE, thereby causing ambiguity as to which UE the NACK belongs. There may not always be a one-to-one mapping between MA signatures and a UE, such that coupling the NACK with an MA signature index may not indicate to which UE the NACK belongs. Therefore, even with activity detection, there may be ambiguities due to the UE ID possibly not being available.

As discussed above, there may be a one-to-one mapping between UEs and MA signatures, e.g. each UE may be assigned a different reference signal. One-to-one mapping between UEs and MA signatures may be more feasible in URLLC applications compared to m-MTC applications, because in m-MTC applications there may be a very large number of UEs. In some applications, such as in some URLLC applications, the pool of possible MA signatures may be larger or equal to the pool of UEs performing grant-free uplink transmissions, thereby permitting the one-to-one mapping. Another possible benefit of one-to-one mapping not mentioned above is that having a one-to-one mapping may avoid MA signature collision. For example, if the MA signature is a reference signal, then the reference signals of different UEs may not collide (particularly if the reference signals are orthogonal), thereby increasing the probability of successful activity detection at the TRP. In some embodiments in which there is a one-to-one mapping, HARQ ACK/NACK feedback for a particular UE may be one bit that is multiplexed on a resource that is determined by the MA signature used by the UE. A bit value of "0" may indicate an ACK, and a bit value of "1" may indicate a NACK, or vice versa. For example, the UE may send its initial grant-free uplink transmission using reference signal p11 in 302 of example FIG. 3B. Assuming successful activity detection, the TRP knows to send the ACK or NACK using a predetermined time-frequency location corresponding to reference signal p11. The UE knows to look for the ACK or NACK at the predetermined time-frequency location because reference signal p11 was used. Therefore, there may be a reduction in NACK/ACK signaling compared to schemes in which more than one bit needs to be sent for each ACK/NACK. More generally, the ACK/NACK feedback may use a particular time-frequency location and/or a particular sequence or codebook in the downlink channel corresponding to the MA signature used to send the uplink transmission.

Operation of a UE pertaining to HARQ processes will now be described in more detail. In some embodiments, when the UE receives an ACK (or group ACK) with matching identifying information, then the UE assumes that the grant-free uplink transmission was successful, i.e. the data was successfully decoded by the TRP. The matching identifying information may be a UE ID or the identification of a MA signature (e.g. a reference signal) corresponding to that used by the UE for the uplink transmission. In some embodiments, when the UE receives a NACK (or group NACK) with matching identifying information, such a matching MA signature index, then the UE assumes that the grant-free uplink transmission failed, but that activity detection was successful. In some embodiments, when the UE does not receive an ACK or a NACK, or when the UE receives mismatched ID info, then the UE assumes that both data detection and activity detection failed. However, in embodiments in which the TRP does not send NACKs, then the UE assumes that data detection failed, but the UE does not know whether activity detection was successful. In some embodiments described above, the MA signature may be, or may include, a reference signal. The reference signal can be a demodulation reference signal. In some applications, such as mMTC, the number of UEs that perform grant-free uplink communication may exceed the number of available reference signals. In such applications, the reference signals may include non-orthogonal reference signals in addition to orthogonal reference signals to increase the pool of available reference signals. Multiple UEs may be mapped to each reference signal. Additionally or instead, each UE may randomly select a reference signal from the pool when sending a grant-free uplink transmission.

In other applications, such as URLLC, the number of UEs that perform grant-free uplink communication may be less than the number of available reference signals. The reference signals may or may not include non-orthogonal reference signals in addition to orthogonal reference signals. As discussed above, in some embodiments there may be a one-to-one mapping between reference signals and UEs. In some embodiments, the configuration of the one-to-one mapping between reference signals and UEs may change over time. For example, the mapping of UEs to tuple indices may change over time according to a known and fixed hopping pattern. The one-to-one mapping may avoid collision and assist in signaling in the manner discussed above.

Figure 6B:
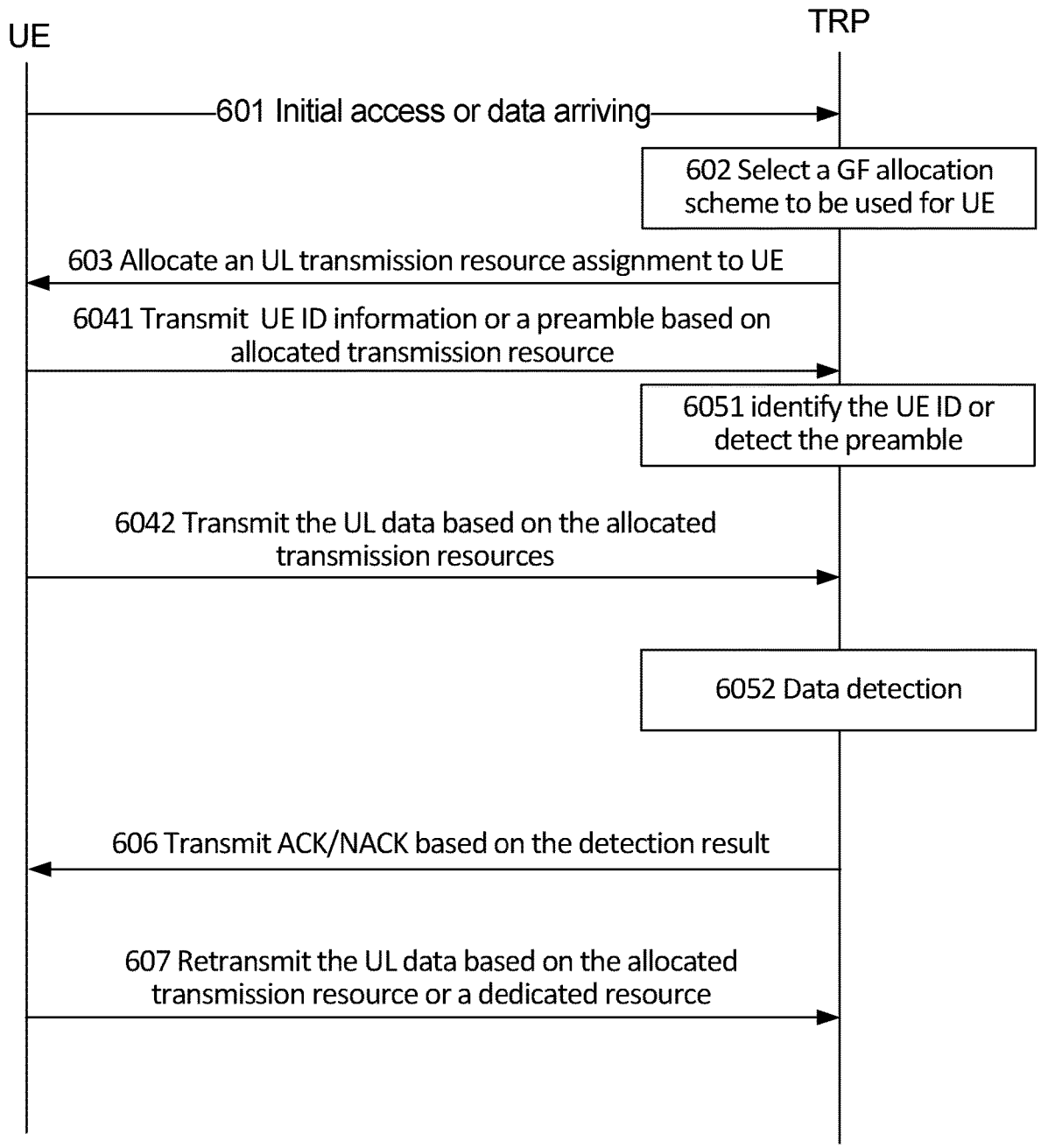
FIG. 6B is a signalling diagram illustrating an example of communications between a grant free UE and a base station according to embodiments disclosed herein.

FIG. 6B provides a signalling diagram illustrating an example of communications between a grant free UE and a TRP including use of ACK/NACK communications utilizing the embodiment of the format of FIG. 3C for the message.

In step 601 the UE initially accesses the network, or data is arriving at the TRP. In step 602, the TRP determines the allocation scheme to be used by the UE. Factors involved in how this decision is made are described above. In some embodiments, the UE is initially in a grant free allocation mode. In step 603, the detailed allocation is provided to the UE by the TRP. Steps 601 to 603 may be performed in a similar fashion to step 601 to 603 of FIG. 6A as described above.

Step 6041 includes transmitting UE ID information or a preamble based on allocated transmission resource according to the message format 328 and 329 as shown in FIG. 3C. At step 6051 the UE ID is identified after the TRP receives the UE ID or after the TRP detects the preamble. A detailed implementation has been described above with regard to FIG. 3C.

At the Step 6042 the UL data is transmitted by the UE based on the allocated transmission resource. In one embodiment, steps 6041 and 6042 transmit in the same TTI or consecutive TTIs. In some embodiments step 6042 may happen before 6051 since it does not depends on UE ID identification.

At step 6052, the TRP detects the data sent by the UE. In some embodiments, this may include activity detection. At step 606, the TRP transmits an ACK/NACK based on whether the detection of the data was successful or not in step 605. If necessary, at step 607, i.e. if a NACK was transmitted by the TRP, the UE retransmits the data using an allocated GF resource or a dedicated resource.

Figure 6C:
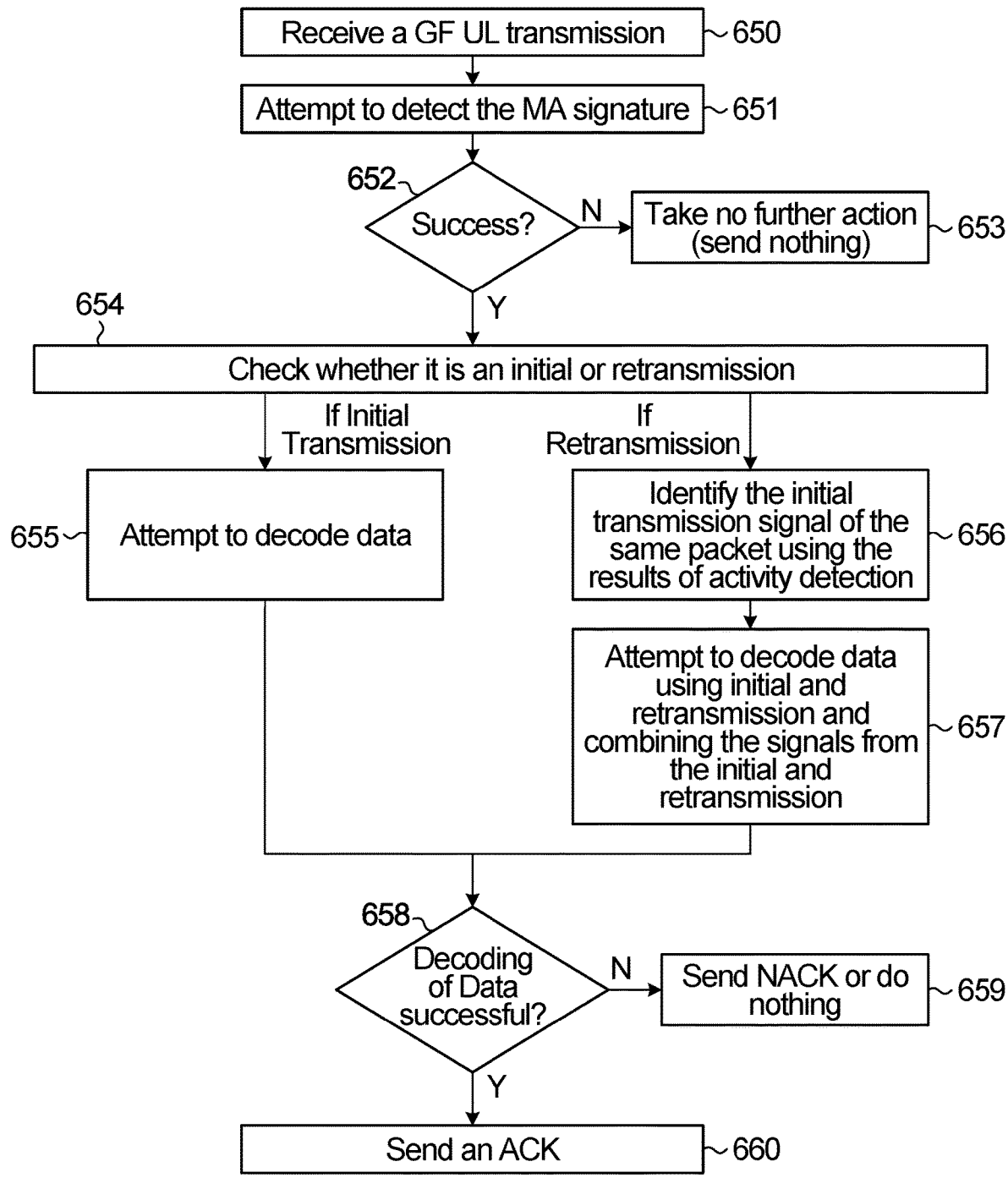
FIG. 6C is a flow chart illustrating decoding a transmission using HARQ according to an embodiment disclosed herein.

FIG. 6C illustrates an embodiment of using HARQ for grant free transmission detection. In step 650, the TRP receives a grant free UL transmission from a UE. At step 651, the TRP attempts to detect the MA signature. In some embodiments, this may include activity detection. Step 652 is a decision point. If the detection is unsuccessful, no (N) path, then at step 653, no further action is taken. For example, the TRP may not send a response to the UE at this stage and wait for another transmission by the UE. If the detection is successful, yes (Y) path, at step 654, the TRP determines whether the transmission is an initial transmission or a retransmission. If the transmission is an initial transmission, the TRP attempts to decode the data at step 655. If the transmission is determined to be a retransmission then at step 656, the TRP identifies the initial transmission signal of the same packet using the results of activity detection, as described above. At step 657, the TRP attempts to decode the data using the initial transmission and one or more retransmission. In some embodiments, this may include combining the signals from the initial transmission and one or more retransmission.

Step 658 is another decision point. If the decoding of the data is unsuccessful from either step 655 or step 657, no (N) path, then at step 659 the TRP sends a NACK to the UE, but instead waits for a further retransmission. In some embodiments, instead of sending a NACK, the TRP may not send any acknowledgement at step 659. If the decoding of the data is successful from either step 655 or step 657, yes (Y) path, then at step 660. the TRP sends an ACK to the UE.

In steps in FIG. 6C in which the TRP does not respond to the UE and waits for a further transmission, the UE may send from 1 to K retransmissions if no acknowledgement is received from the TRP.

Figure 6D:
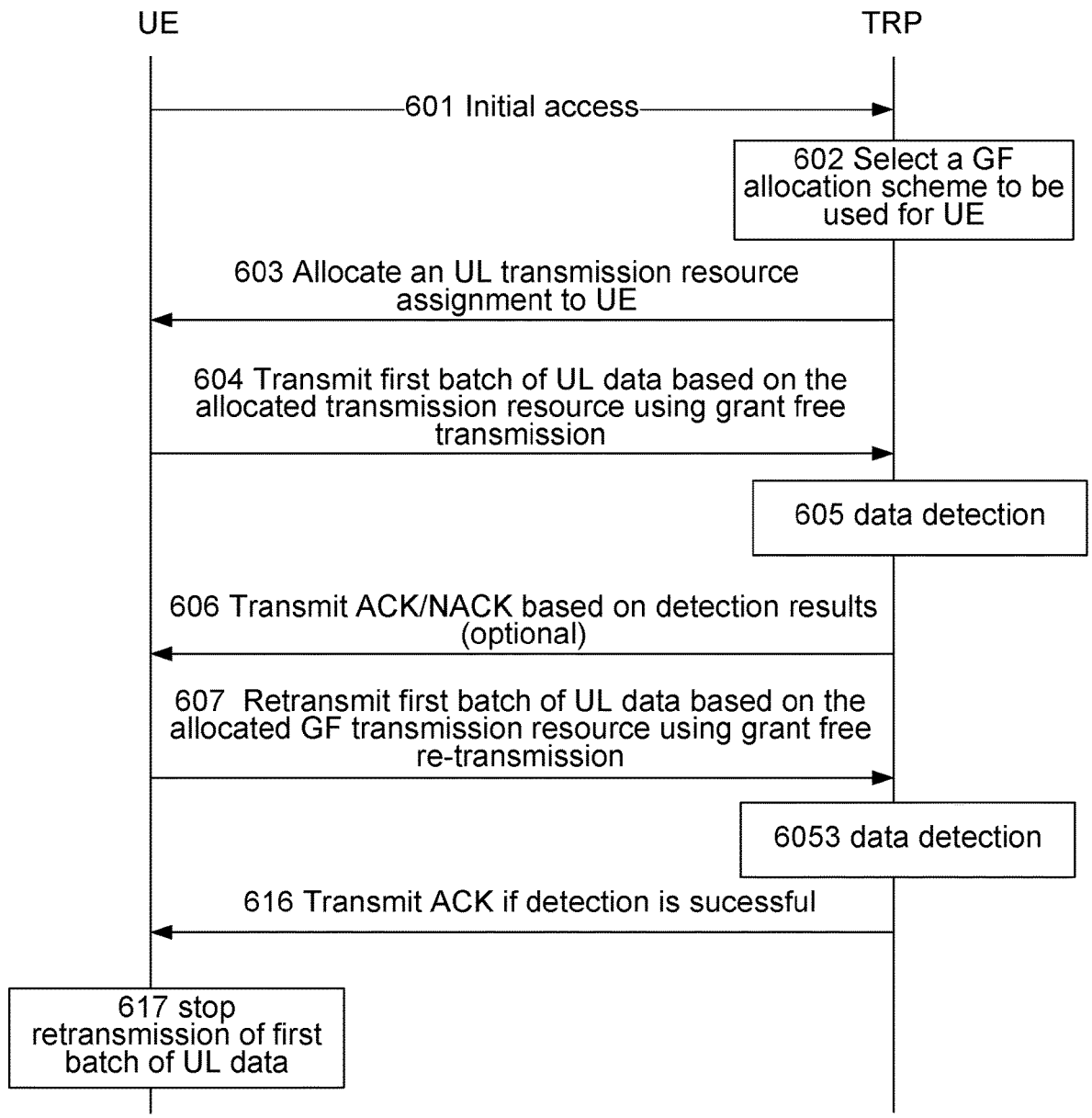
FIGS. 6D to 6G are signalling diagrams illustrating various examples of communications between a UE and a base station according to embodiments disclosed herein.

FIG. 6D provides a signalling diagram illustrating an example of communications between a grant free UE and a TRP including use of ACK/NACK communications in which the TRP uses a GF resource for a re-transmission.

In step 601 the UE initially accesses the network. In step 602, the TRP determines the allocation scheme to be used by the UE. Factors involved in how this decision is made are described above. In some embodiments, the UE is initially in a grant free allocation mode. In step 603, the detailed allocation is provided to the UE by the TRP. In step 604, the UE operating in GF mode performs the UL transmission based on the assigned transmission resource. Steps 601 to 604 may be performed in a similar fashion to step 601 to 604 of FIG. 6A as described above.

At step 605, the TRP detects the data sent by the UE. In some embodiments, this may include activity detection. In optional step 606, the TRP transmits an ACK/NACK based on whether the detection of the data was successful or not in step 605. If necessary, at step 607, i.e. if a NACK is transmitted by the TRP at step 606, or if no ACK is received by the UE, the UE retransmits the first batch of UL data based on the allocated GF resource using GF re-transmission. Different scenarios may include the UE monitoring for an ACK/NACK after transmission. In some embodiments, if the UE receives an ACK, it stops retransmission of the data. If the UE receives a NACK, it retransmits on an allocated transmission resource. In some scenarios, there may be no NACK in the feedback. If the UE does not detect a NACK before the end of a predefined waiting period, the UE retransmit the data. In some scenarios, the UE continuously performs retransmission until an ACK is received. In all of the above scenarios, the transmission resources are based on preconfigured grant-free resources.

At step 6053, the TRP detects the data sent by the UE. In some embodiments, this may include activity detection. At step 616, the TRP transmits an ACK if detection is successful in step 6053. Based on receiving the ACK, at step 617, the UE stops re-transmission of the first batch of UL data.

Figure 6E:
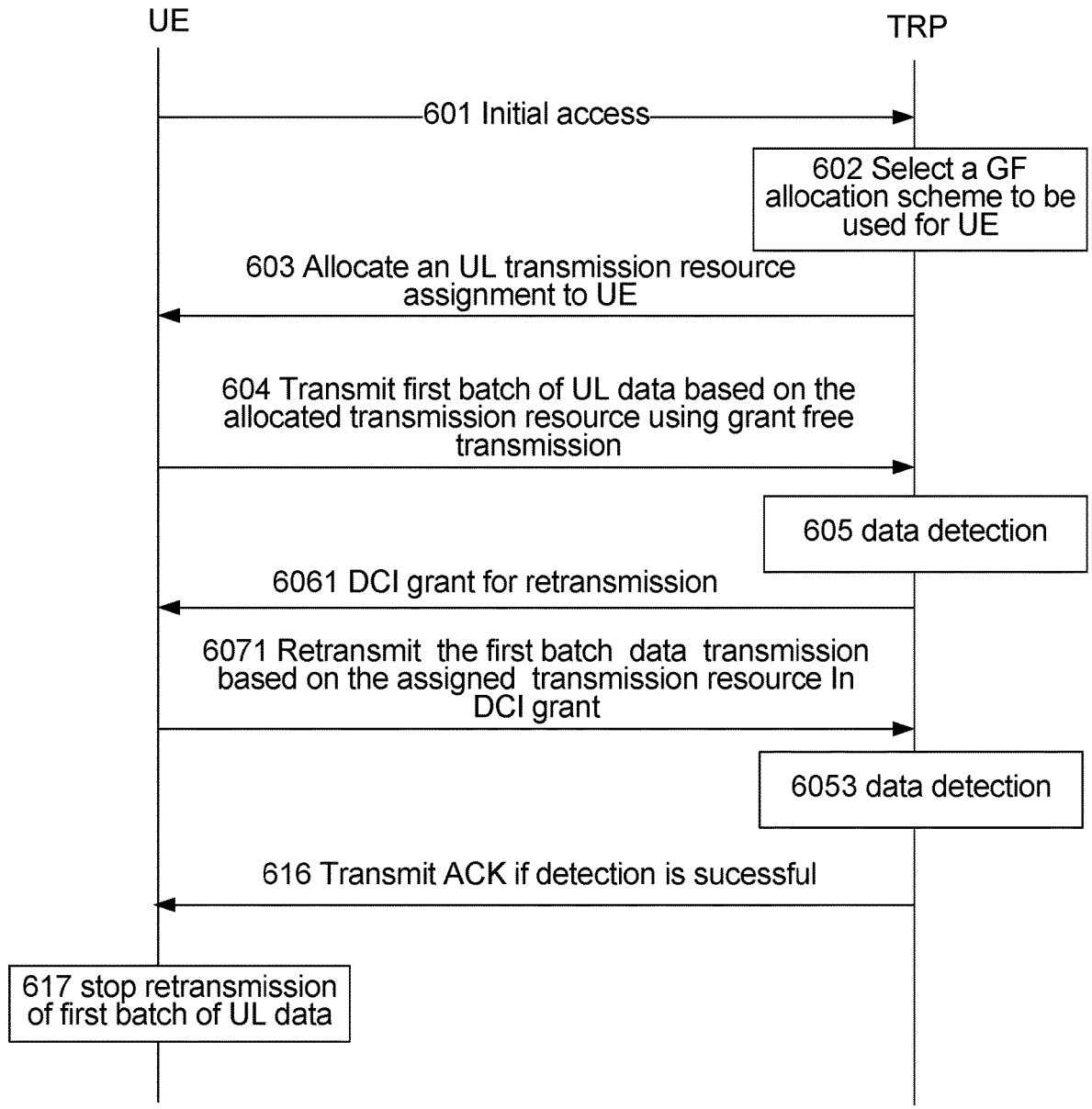

FIG. 6E provides a signalling diagram illustrating an example of communications between a grant free UE and a TRP including use of ACK/NACK communications in which the TRP changes the allocation resource to a GB resource for a re-transmission.

In step 601 the UE initially accesses the network. In step 602, the TRP determines the allocation scheme to be used by the UE. Factors involved in how this decision is made are described above. In some embodiments, the UE is initially in a grant free allocation mode. In step 603, the detailed allocation is provided to the UE by the TRP. In step 604, the UE operating in GF mode performs the UL transmission based on the assigned transmission resource. Steps 601 to 604 may be performed in a similar fashion to step 601 to 604 of FIG. 6A as described above.

At step 605, the TRP detects the data sent by the UE. In some embodiments, this may include activity detection that identifies the UE. In step 6061, the TRP transmits a DCI grant for retransmission. The DCI grant may be sent in a similar way to the DCI grant for grant-based retransmission used in LTE. For example, DCI may be sent at a search space defined for the UE ID (e.g. C RNTI) and include information for a scheduling grant of a transmission where the new data indicator field is set to 0, indicating the scheduling grant is for a retransmission. At step 6071 the UE re-transmits the first batch of UL data based on the allocated grant based resource in the DCI grant.

At step 6053, the TRP detects the data sent by the UE. In some embodiments, this may include activity detection. At step 616, the TRP transmits an ACK if detection is successful in step 6053. Based on receiving the ACK, at step 617 the UE stops re-transmission of the first batch of UL data.

After step 6071 or step 607, where the first retransmission of the data using grant-based transmission is done, in some embodiments, the UE may by default stay in grant based transmission mode for the subsequent uplink transmissions/retransmission. In some other embodiments, the UE may by default switch back to GF transmission mode for subsequent uplink transmissions/retransmissions. In some embodiments, the DCI grant in step 6061 may also include an indicator of whether the UE should stay in grant-based mode or switch back to grant-free transmission mode after step 6071. For example, a one bit indicator may be "1" to stay in GB mode and "0" to switch to GF mode, or vice versa. In which case, UE will perform grant-free or grant-based transmission/retransmissions after step 6071 based on this indicator.

Figure 6F:
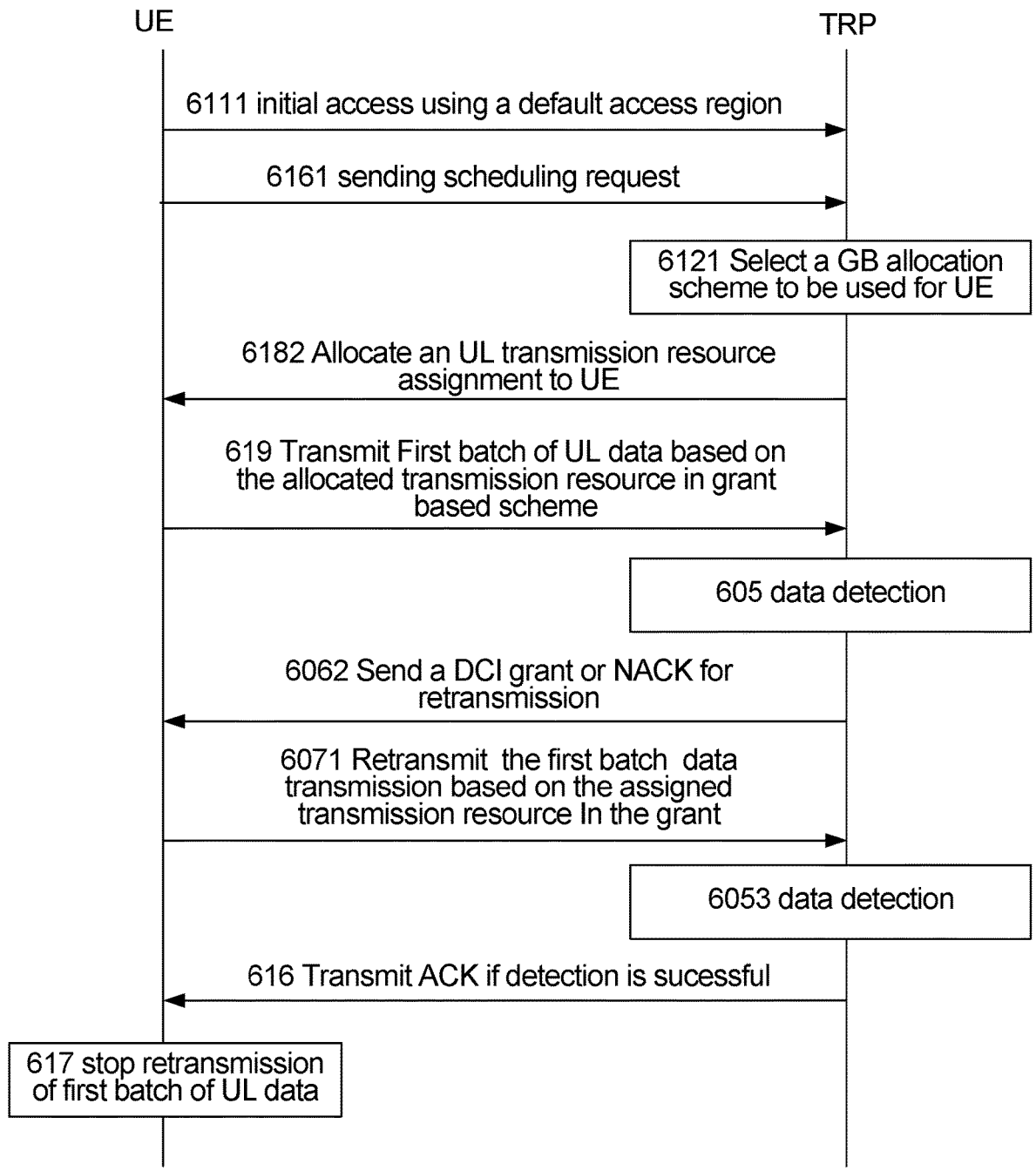

FIG. 6F provides a signalling diagram illustrating an example of communications between a grant based UE and a TRP including use of ACK/NACK communications in which the TRP uses a GB resource for a re-transmission.

In step 6111 the UE initially accesses the network using a default access region known to the UE for such a purpose. In some embodiments, the default access region may be defined for the UE based on system signaling broadcast by the TRP.

In step 6161, the UE transmits a scheduling request once the UE has configured a UL control channel such as Physical Uplink Control Channel (PUCCH) for communicating the scheduling request to the TRP. In some other embodiments, the scheduling request sent in 6161 may be among part of the initial access process in step 6111. For example, the scheduling request can be sent implicitly, or explicitly, together with a preamble by the UE to the TRP in the initial access process.

In step 6121, when the TRP selects an allocation scheme to be used by the UE the scheme selected is a GB scheme. This determination may be made as described above.

In response to determining that the UE should use the GB scheme, in step 6182, the TRP transmits an UL transmission resource allocation assignment to the UE. The transmission of the assignment uses a GB transmission resource. In some embodiments, the assignment of the scheduling grant is transmitted using RRC signaling, or DCI, or a combination thereof.

Step 619 involves the UE transmitting at the appropriate time based on the GB transmission resource sent in step 6182.

At step 605, the TRP detects the data sent by the UE. In some embodiments, this may include activity detection. In step 6062, the TRP transmits a DCI grant for re-transmission or a NACK for re-transmission. At step 6071 the UE retransmits the first batch of UL data transmission based on the assigned transmission resource in the grant for re-transmission.

At step 6053, the TRP detects the data sent by the UE. In some embodiments, this may include activity detection. At step 616, the TRP transmits an ACK if detection is successful in step 6053. In response to receiving the ACK, at step 617 the UE stops re-transmission of the first batch of UL data.

Figure 6G:
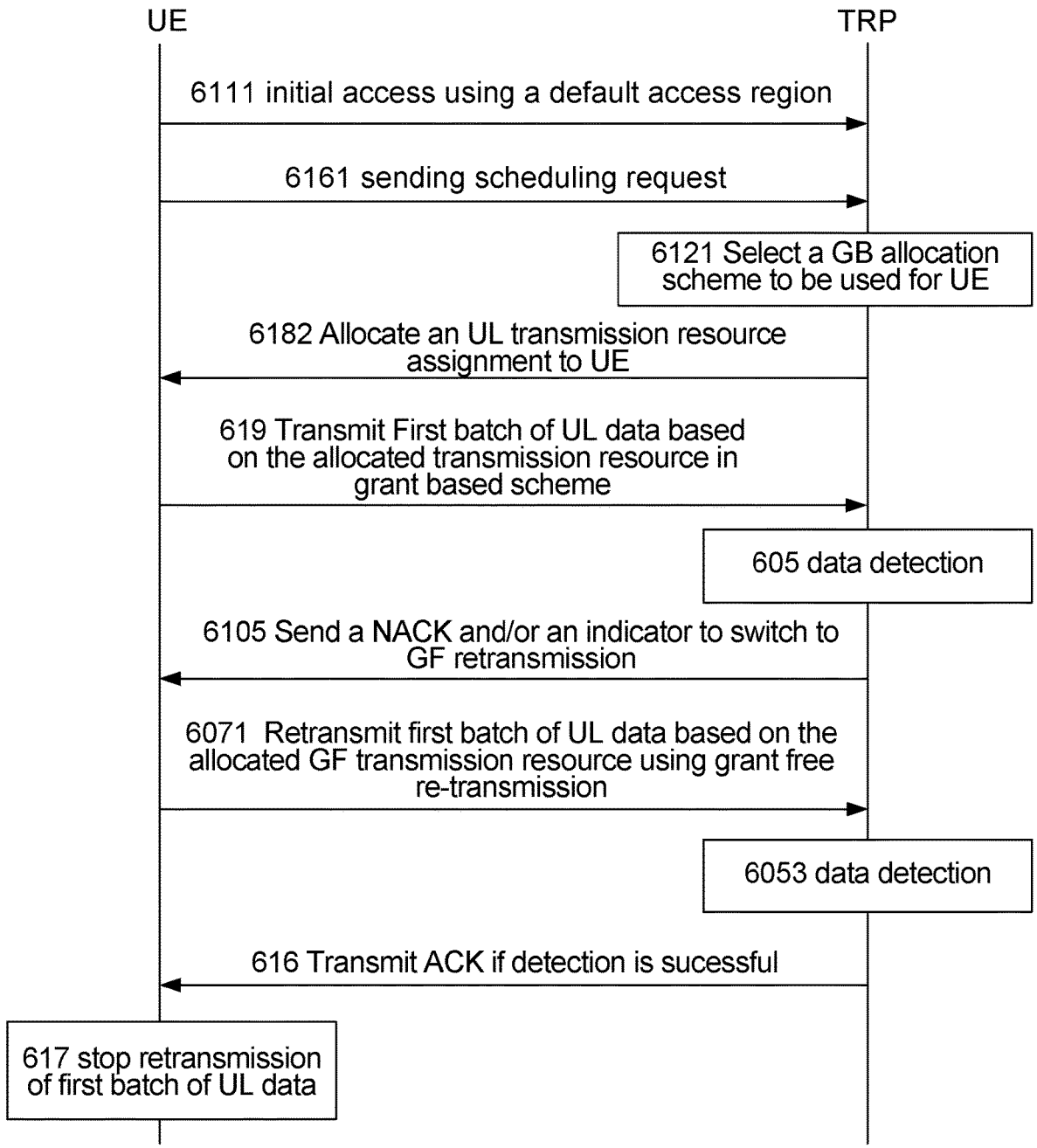

FIG. 6G provides a signalling diagram illustrating an example of communications between a grant based UE and a TRP including use of ACK/NACK communications in which the TRP uses a GF resource for a re-transmission.

In step 6111 the UE initially accesses the network using a default access region known to the UE for such a purpose. In some embodiments, the default access region may be defined for the UE based on system signaling broadcast by the TRP.

In step 6161, the UE transmits a scheduling request once the UE has configured a UL control channel such as Physical Uplink Control Channel (PUCCH) for communicating the scheduling request to the TRP. In some other embodiments, the scheduling request send in 6161 may be among part of the initial access process in step 6111. For example, the scheduling request can be sent implicitly, or explicitly, together with a preamble by the UE to the TRP in the initial access process.

In step 6121, when the TRP selects an allocation scheme to be used by the UE the scheme selected is a GB scheme. This determination may be made as described above.

In response to determining that the UE should use the GB scheme, in step 6182, the TRP transmits an UL transmission resource assignment to the UE. The transmission of the assignment uses a GB transmission resource. In some embodiments, the assignment of the scheduling grant is transmitted using RRC signaling, or DCI, or a combination thereof.

Step 619 involves the UE transmitting the first batch of UL data at the appropriate time based on the GB transmission resource sent in step 6182.

At step 605, the TRP detects the data sent by the UE. In some embodiments, this may include activity detection.

At step 6105 the TRP sends a NACK and/or an indicator to switch to a GF allocation scheme for re-transmission. The NACK can be sent using a Physical HARQ Indication Channel (PHICH)-like channel or DCI. The NACK without an explicit full scheduling grant may by default imply that UE should switch to GF mode for retransmission. Alternatively, TRP can send an indicator, which indicates the UE to switch to GF retransmission. The indicator may be one bit and can be sent via DCI or RRC signalling etc.

At step 6071, the UE retransmits the first batch of UL data transmission based on the allocated GF transmission resource using grant free re-transmission.

At step 6053, the TRP detects the data sent by the UE. In some embodiments, this may include activity detection. At step 616, the TRP transmits an ACK if detection is successful in step 6053. In response to receiving the ACK, at step 617 the UE stops re-transmission of the first batch of UL data.

After step 6071 or step 617 where the first retransmission of the data using grant-free transmission is done, in some embodiments, the UE may by default stay in grant-free transmission mode for the subsequent uplink transmissions/retransmission. In some other embodiments, the UE may by default switch back to grant-based transmission mode for subsequent uplink transmissions/retransmissions. In some embodiments, the signal in step 6105 may also include another indicator that whether the UE should stay in grant-free mode or switch back to grant-based transmission mode after step 6071. In which case, UE will perform grant-free or grant-based transmission/retransmissions after step 6071 based on this indicator.

Configuration of UE for Grant-Free Uplink Transmissions

In some embodiments, the resource configuration for UL grant-free transmissions includes at least the following components: an identification of the basic resource unit(s) that are being allocated got grant free transmission, frequency location(s) of the basic resource unit(s) in each transmission, other related information such as default MCS, and information for UE identification from the network perspective, especially in the case that multiple UEs share the same resource unit(s). A basic resource unit can be pre-configured as the total number of time/frequency resource elements to transmit a physical layer packet size (for example for URLLC this may be 32 bytes) for a particular MCS. As an example, a basic resource unit can be 1 slot×N RB (N>=1).

A physical resource may consist of one or more basic resource units and can be shared by multiple UEs. The network can decide how many basic resource units should be pre-configured for UEs, depending on, but not limited to, such factors as traffic loading and the level of contention that is allowed in a system. Because a reference signal (RS) is transmitted together with data, the RS can be used as an UE activity indication in addition to channel estimation. To reduce the complexity of blind detection, the MCS used for transmission can be pre-configured. High-layer signaling can be employed to pre-configure the UE time-frequency resources and associated parameters, such as RS and MCS, and the configuration can be updated semi-statically. Because the grant-free transmissions can support UE packet "arrive and go" transmission, the resource configuration can be performed at UE initial network entry by broadcast and/or higher layer signaling (e.g., RRC) without necessarily requiring DCI activation.

In some embodiments, the grant-free transmission resource and parameters are configured at least by higher layer signaling, e.g., RRC signaling. The signaling includes such information as: an identification and/or location of time and frequency resources; a modulation and coding scheme; reference signal parameters; and a maximum number (K) of grant-free repetitions. It is understood that other parameters may also be included in the signaling.

Alternatively, some or all of the parameters above may be indicated via DCI information instead of using the higher layer RRC signaling. The UE would then be configured to check for the DCI. The DCI may include the resource configuration that enables the UE to perform the grant-free uplink transmission, e.g. an assignment of which resources to use. In some embodiment, DCI may include the maximum number of grant-free repetitions K.

Grant-Free Repetitions

The number K of grant-free repetitions refers to a maximum number of consecutive transmissions (K>=1) of the same transport block (TB) on the pre-configured grant-free resources. The consecutive transmissions could follow a pre-configured pattern in the pre-configured grant-free resources, which may not be continuous in every TTI.

An UL transmission scheme without grant may also support K (K>=1) repetitions including the initial transmission (with the same or different redundancy version (RV) and optionally with different MCS) for the same TB. The number of maximum repetitions, K, is a configurable parameter, which is determined by criteria, such as, but not limited to, delay budget, UE channel conditions and MCS schemes. Merely by way of example, to support URLLC service, the number of repetitions can be determined according to the delay budget, numerology and slot duration to operate efficiently with the grant-free transmission.

In some embodiments, the UE will keep repeating transmissions until 1) the UE receives an ACK from the TRP or 2) until the UE reaches the limit of the K transmissions. For case 1), after the initial transmission, the UE monitors in each time slot for any ACK message from the TRP so that the UE can terminate the transmissions once the ACK is received. As an example, when an ACK is received by the UE before the fourth repetition, the UE stops any further repetitions and the total number of repetitions for that TB is three. For case 2), if a packet cannot be decoded successfully after the K transmissions, the packet will be dropped. The UE may remove the packet from the data buffer after the K transmissions.

In some other embodiments, such as in case 2), the UE will transmit the packet up to a maximum of K times and then stops the packet transmission regardless of whether an ACK or NACK (or neither) is received due to the latency window constraints. The packet will be dropped after the UE reaches K repetitions. For this case, the UE may not need to monitor the ACK.

In another embodiment, the UE will transmit the packet up to a maximum of K times and then stops the packet transmission. However, for this case, the UE may still monitor for any potential ACK from the TRP during the K transmissions. If an ACK is received during the K transmissions, the UE will stop any further retransmissions and may transmit less than K transmissions.

In another embodiment, the UE will perform grant-free retransmission with K repetitions for each retransmission. The UE first continues transmission of a packet until the maximum number of repetitions configured (K) in performed, and then the UE will stop and wait for ACK/NACK feedback. If an ACK is received, the UE stops any further transmissions; otherwise, if the UE receives a NACK, or nothing, within the predefined period, the UE will perform grant-free re-transmissions, where the UE again continues re-transmission for K times and stops and waits for ACK/NACK feedback. The process continuous until an ACK is received or the packet reaches its maximum latency bound. In this case, the UE does not monitor ACK/NACK feedback at each TTI, but at some pre-configured timing.

In all cases, the UE may be configured to monitor only ACK/NACK feedback after initial transmission, but does not necessarily monitor for a scheduling grant. The scheduling grant may be transmitted in DCI and in this scenario ACK/NACK feedback is not interpreted as an UL scheduling grant. In some other embodiments, the UE may be configured to monitor DCI as well. This is because sometimes the TRP may send a DCI to switch the grant-free transmission to a grant-based retransmission. Examples of this are described above.

In all cases, hopping mechanisms such as UE re-grouping may be applied over the multiple transmissions.

Grant-free repetitions are supported for an UL transmission scheme without grant, in which K grant-free repetitions refer to a maximum of K consecutive transmissions (K>=1) of the same transport block (TB) on the grant-free resources. The value of K can be semi-statically adjusted. The UE will only keep repeating transmissions until a maximum of K transmissions is reached.

Figure 7:
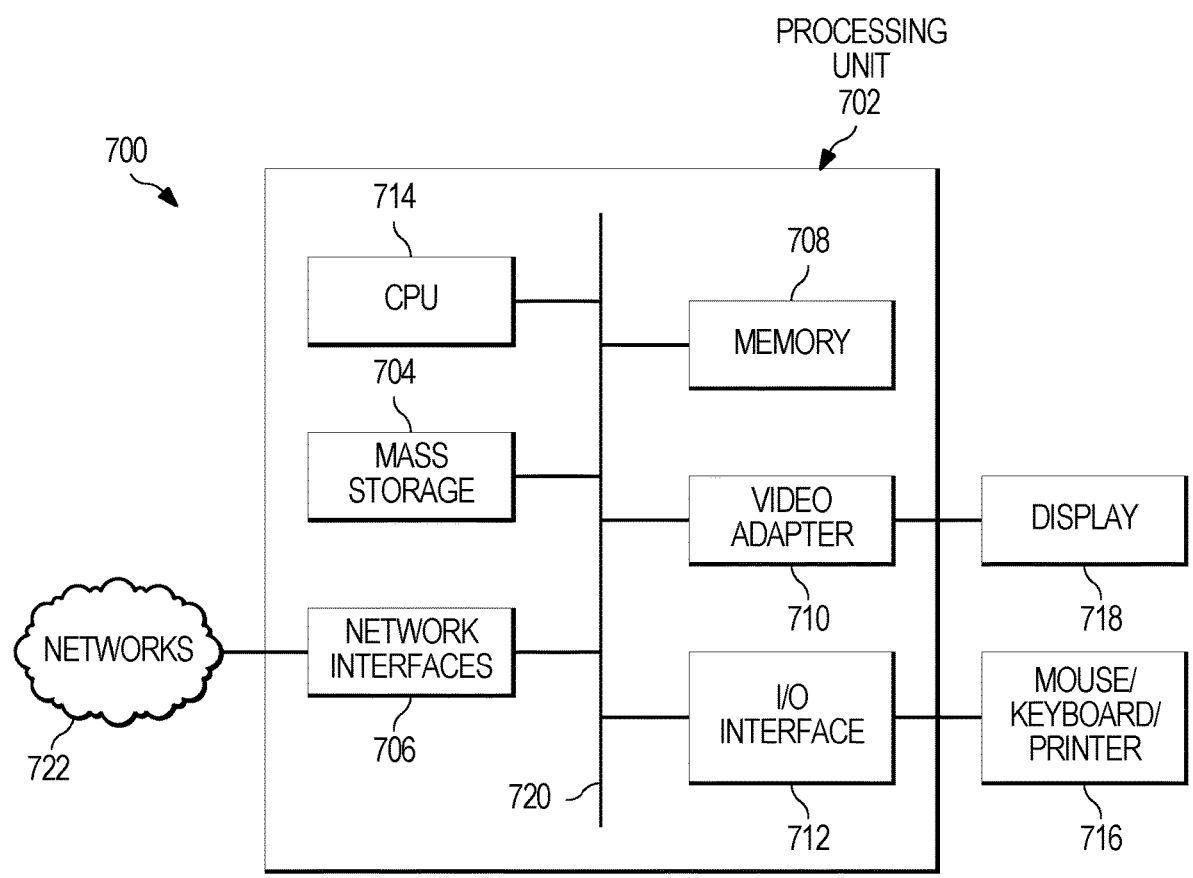
FIG. 7 is a block diagram of a computing system that may be used for implementing the devices and methods disclosed herein according to one embodiment.

FIG. 7 is a block diagram of a computing system 700 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 700 includes a processing unit 702. The processing unit 702 includes a central processing unit (CPU) 714, memory 708, and may further include a mass storage device 704, a video adapter 710, and an I/O interface 712 connected to a bus 720.

The bus 720 may be one or more of any type of several bus architectures including a memory bus or memory controller, a peripheral bus, or a video bus. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, or an optical disk drive.

The video adapter 710 and the I/O interface 712 provide interfaces to couple external input and output devices to the processing unit 702. As illustrated, examples of input and output devices include a display 718 coupled to the video adapter 710 and a mouse/keyboard/printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device.

The processing unit 702 also includes one or more network interfaces 706, which may comprise wired links, such as an Ethernet cable, and/or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module for establishing a serving cluster, a instantiating unit/module, an establishing unit/module for establishing a session link, an maintaining unit/module, other performing unit/module for performing the step of the above step. The respective units/modules may be hardware, software, or a combination thereof. For instance, one or more of the units/modules may be an integrated circuit, such as field programmable gate arrays (FPGAs) or application-specific integrated circuits (ASICs).

Figure 8A:
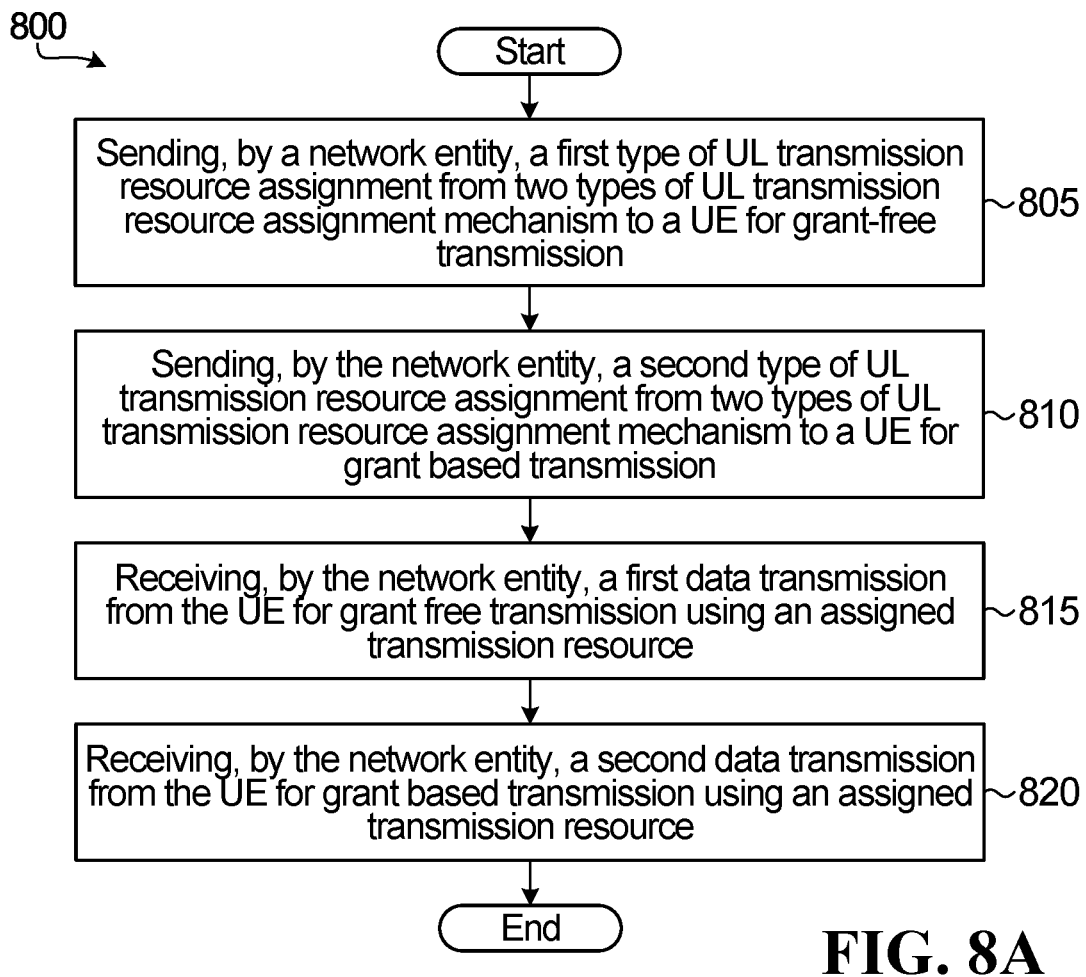
FIG. 8A is a flowchart of a method performed by a base station, according to one embodiment.

FIG. 8A is a flow chart 800 describing a method for data transmission. The method involves a step 805 of sending, by a network entity, a first type of UL transmission resource assignment from two types of UL transmission resource assignment mechanism to a UE for grant-free transmission. A further step 810 involves sending, by the network entity, a second type of UL transmission resource assignment from two types of UL transmission resource assignment mechanism to a UE for grant based transmission. A further step 815 involves receiving, by the network entity, a first data transmission from the UE for grant free transmission using an assigned transmission resource. Another step 820 involves receiving, by the network entity, a second data transmission from the UE for grant based transmission using an assigned transmission resource.

Figure 8B:
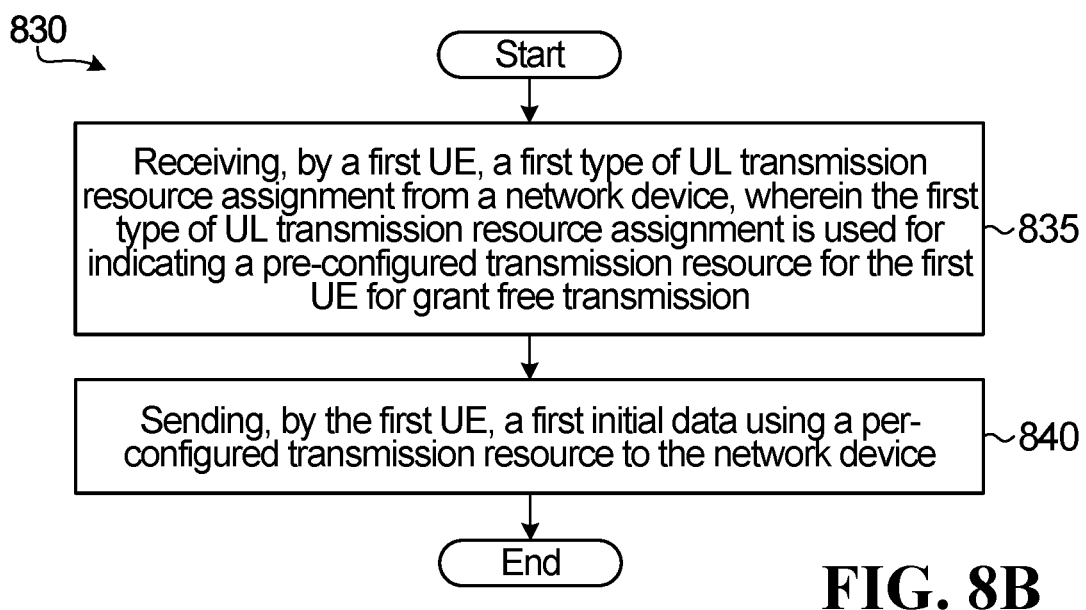
FIG. 8B is a flowchart of a method performed by a UE, according to one embodiment.

FIG. 8B is a flow chart 830 describing a method for data transmission. The method involves a step 835 of receiving, by a first UE, a first type of UL transmission resource assignment from a network device, wherein the first type of UL transmission resource assignment is used for indicating a pre-configured transmission resource for the first UE for grant free transmission. A further step 840 involves sending, by the first UE, a first initial data using a per-configured transmission resource to the network device. The first type of UL transmission resource assignment is one of two types of UL transmission resource assignment mechanisms, and the two types of UL transmission resource assignment mechanisms include a second type of UL transmission resource assignment assigned to a UE for grant based transmission.

Figure 8C:
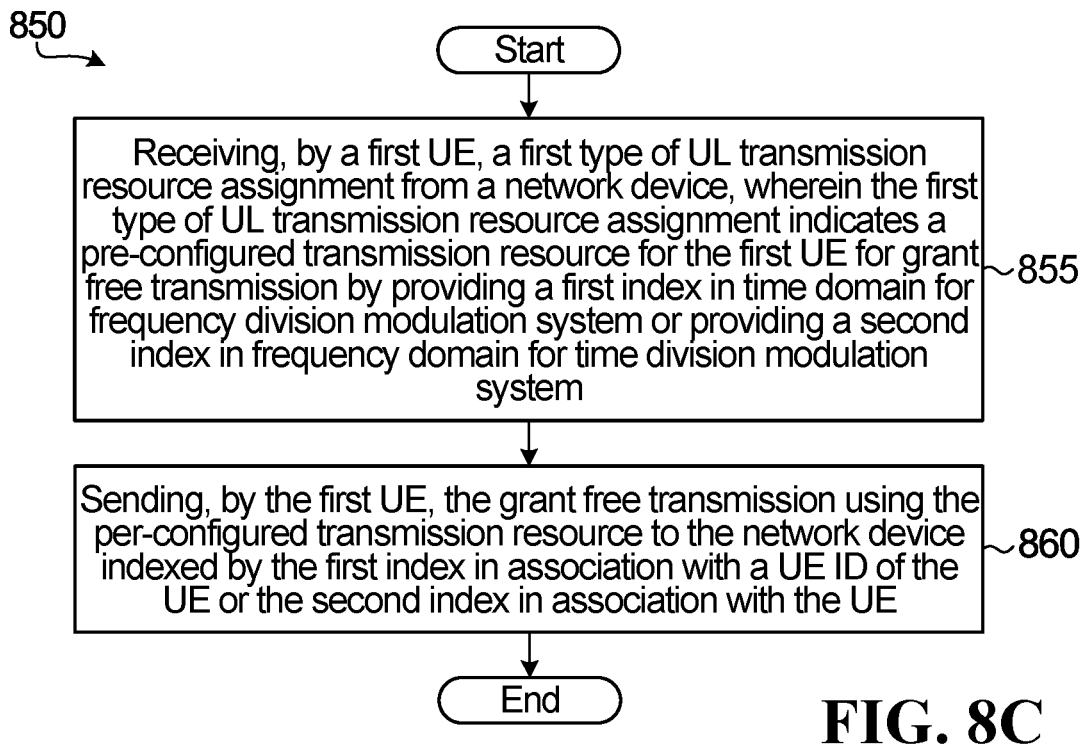
FIG. 8C is a flowchart of a method performed by a UE, according to one embodiment.

FIG. 8C is a flow chart 850 describing a method for data transmission. The method involves a step 855 of receiving, by a first UE, a first type of UL transmission resource assignment from a network device, wherein the first type of UL transmission resource assignment indicates a pre-configured transmission resource for the first UE for grant free transmission by providing a first index in the time domain for frequency division modulation system or providing a second index in the frequency domain for time division modulation system. Another step 860 involves sending, by the first UE, the grant free transmission using the per-configured transmission resource to the network device indexed by the first index in association with a UE ID of the UE or the second index in association with the UE ID.

Figure 8D:
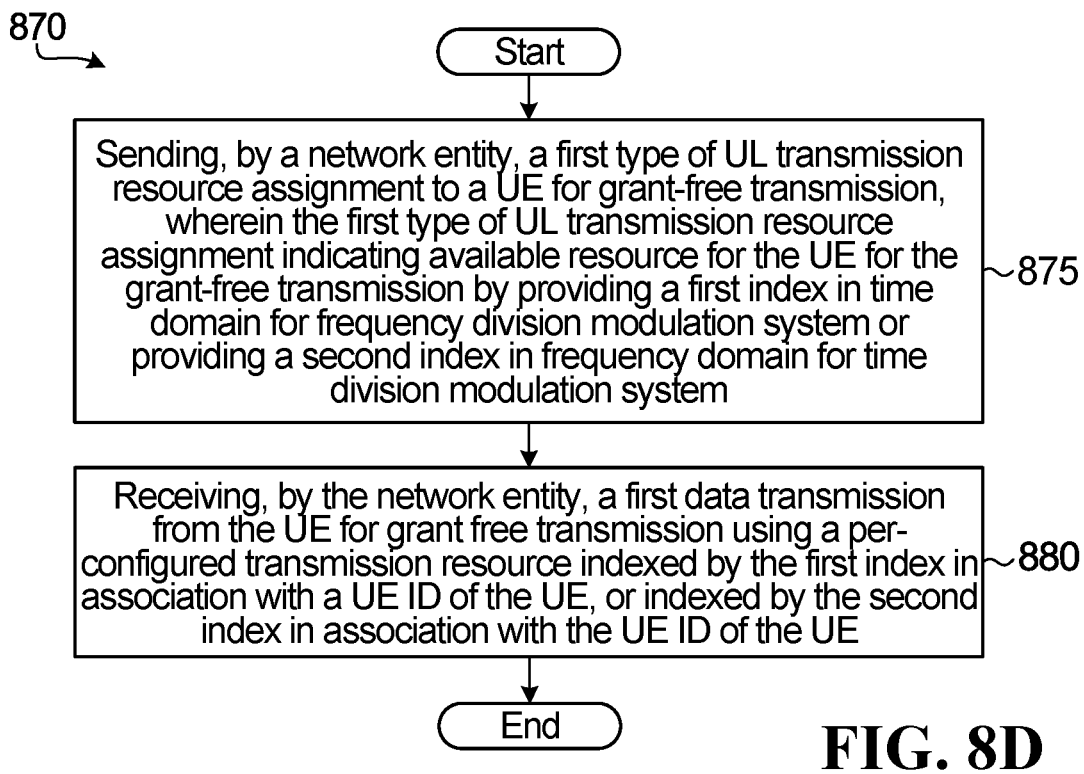
FIG. 8D is a flowchart of a method performed by a base station, according to one embodiment.

FIG. 8D is a flow chart 870 describing a method for data transmission. The method involves a step 875 of sending, by a network entity, a first type of UL transmission resource assignment to a UE for grant-free transmission, wherein the first type of UL transmission resource assignment indicates available resource for the UE for the grant-free transmission by providing a first index in the time domain for a frequency division modulation system or providing a second index in the frequency domain for a time division modulation system. The method further involves a step 880 of receiving, by the network entity, a first data transmission from the UE for grant free transmission using a per-configured transmission resource indexed by the first index in association with a UE ID of the UE, or indexed by the second index in association with the UE ID of the UE.

Figure 9A:
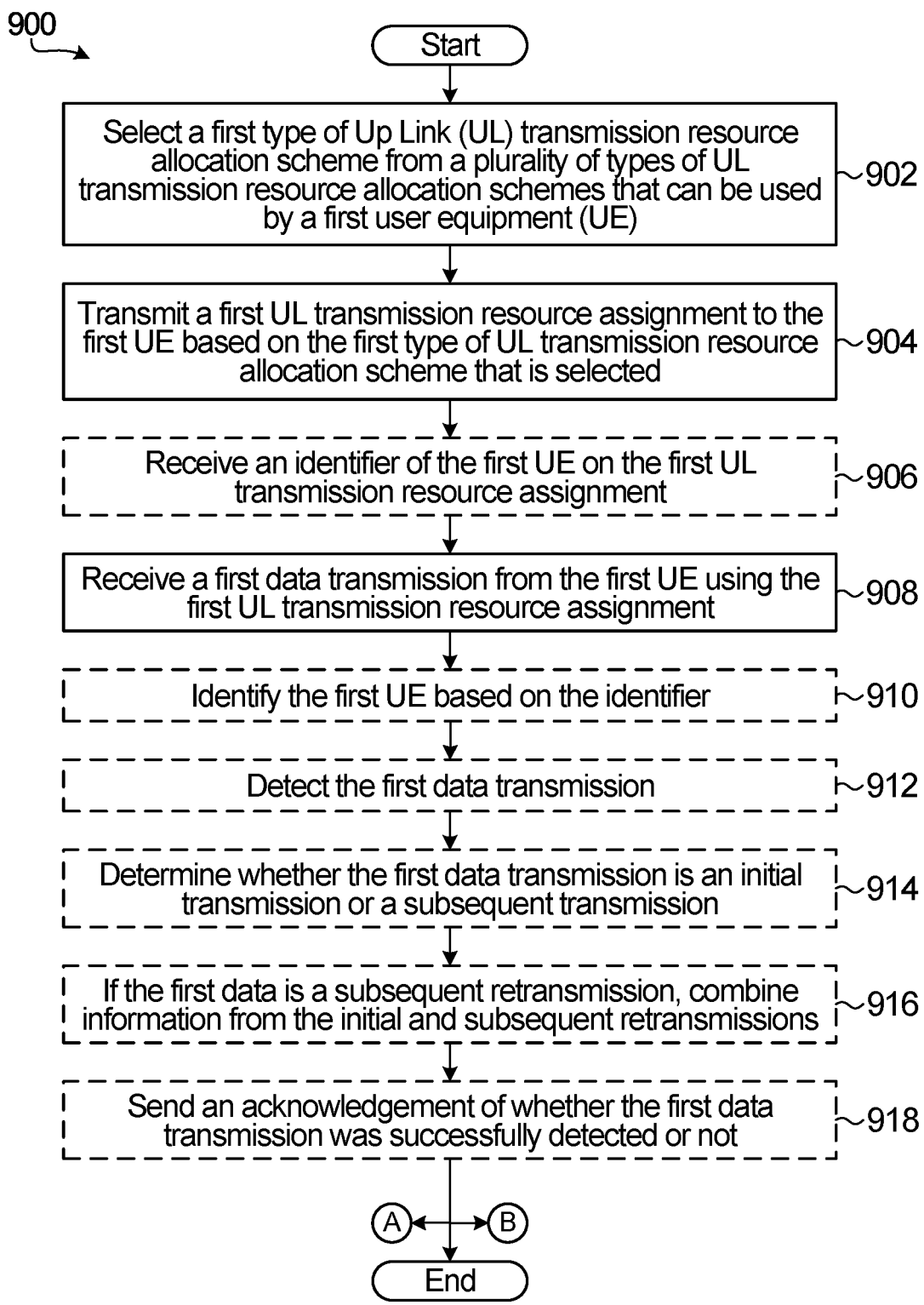
FIG. 9A is a flowchart of a method performed by a base station, according to one embodiment.

FIG. 9A is a flow chart 900 describing a method for data transmission. The method involves a step 902 of selecting a first type of Up Link (UL) transmission resource allocation scheme from a plurality of types of UL transmission resource allocation schemes that can be used by a first user equipment (UE). The plurality of types of transmission resource allocation schemes may include grant free or grant based. The selection may be performed as described above. The reasoning for the selection is also described above.

A further step 904 involves transmitting a first UL transmission resource assignment to the first UE based on the first type of UL transmission resource allocation scheme that is selected. Again multiple examples of this are described above for either grant free or grant based transmission modes. An optional step 906 involves receiving an identifier of the first UE on the first UL transmission resource assignment. An example of this may correspond to the description of step 6041 shown in FIG. 6B.

Step 908 involves receiving a first data transmission from the first UE using the first UL transmission resource assignment.

Step 910 may be optional and involves identifying the first UE based on the identifier received in step 906.

The next several steps generally refer to detecting the received data transmission. They are optional from the point of view of the process of selecting, assigning a transmission resource allocation scheme and assigning a resource based on the selected allocation scheme, but describe in fuller detail the process of detecting a data transmission that is transmitted on a transmission resource assignment of the allocation scheme.

Step 912 involves detecting the first data transmission received in step 908. Step 914 involves determining whether the first data transmission is an initial transmission or a subsequent transmission. If the first data is a subsequent retransmission, step 916 involves combining information from the initial and subsequent retransmissions. Step 918 involves sending an acknowledgement of whether the first data transmission was successfully detected or not. This may involve sending an ACK if successful or a NACK if not successful. This step may be optional as sometimes the base station may not send a NACK if not successful, for example.

After step 916 there are several options for proceeding. One is simply that the process is completed (END), a second is to follow the steps shown in FIG. 9B (decision A), which describe a method for changing from one resource allocation scheme to another and a third (decision B) is to select, for a different UE than selected in FIG. 9A, a different resource allocation scheme, which is detailed in FIG. 9C.

Figure 9B:
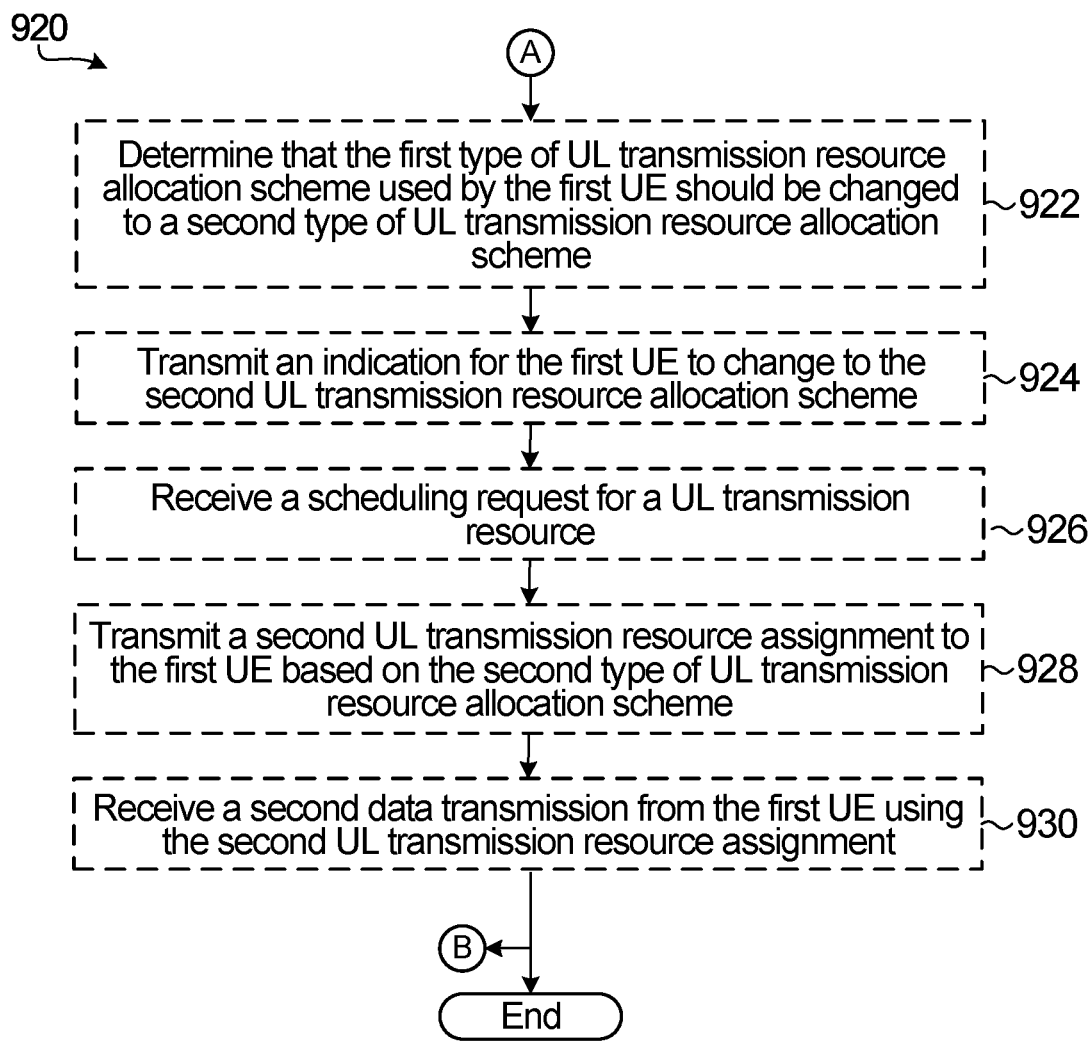
FIG. 9B is a flowchart of another method performed by a base station, according to one embodiment.

Flow chart 920 in FIG. 9B, shows a method for a changing from one resource allocation scheme to a second resource allocation scheme. These steps are all optional from the more general process of of selecting, assigning a transmission resource allocation scheme and assigning a resource based on the selected allocation scheme, but describe in fuller detail the process of changing from a current allocation. For example, this may include changing from grant free to grant based or grant based to grant free.

Step 922 involves the base station determining that the first type of UL transmission resource allocation scheme used by the first UE should be changed to a second type of UL transmission resource allocation scheme. This may include from a grant based resource allocation scheme to a grant free resource allocation scheme or vice versa. Step 924 involves transmitting an indication for the first UE to change to the second UL transmission resource allocation scheme. Step 926 involves receiving a scheduling request for a UL transmission resource. Step 928 involves transmitting a second UL transmission resource assignment to the first UE based on the second type of UL transmission resource allocation scheme. Step 930 involves receiving a second data transmission from the first UE using the second UL transmission resource assignment.

In a similar fashion to FIG. 4A, there are several options for proceeding after step 930 in FIG. 9B. One is simply that the process is completed (END) and a second is to follow the steps shown in FIG. 9C (selection B), which describes a method for selecting, for a different UE than selected in FIG. 9A, a different resource allocation scheme.

Figure 9C:
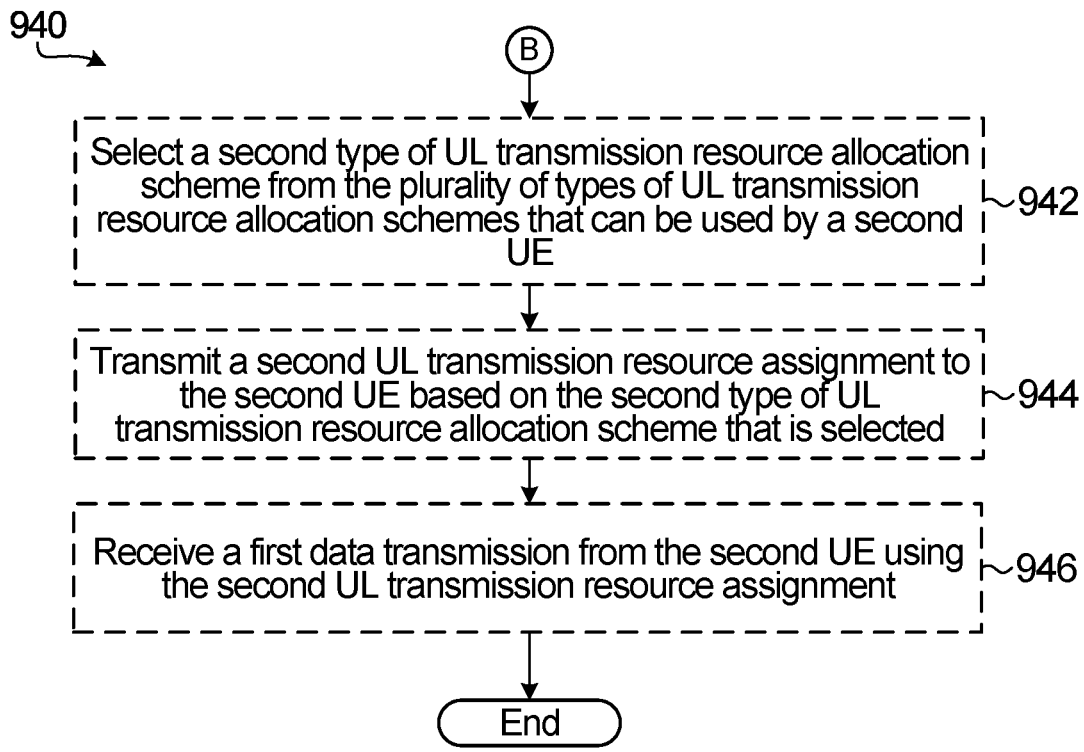
FIG. 9C is a flowchart of a further method performed by a base station, according to one embodiment.

Flow chart 940 in FIG. 9C, shows a method for selecting, for a different UE than selected in FIG. 9A, a different resource allocation scheme. Step 942 involves selecting a second type of UL transmission resource allocation scheme from the plurality of types of UL transmission resource allocation schemes that can be used by a second UE. The reasoning for selection of the different resource allocation scheme is described in detail in the examples above. Step 944 involves transmitting a second UL transmission resource assignment to the second UE based on the second type of UL transmission resource allocation scheme that is selected. This transmission resource assignment is also described above and may include one or more of broadcast signaling or semi-persistent signaling, using RRC signaling, dedicated RRC signaling, DCI and broadcasting system information. Step 946 involves receiving a first data transmission from the second UE using the second UL transmission resource assignment.

Figure 9D:
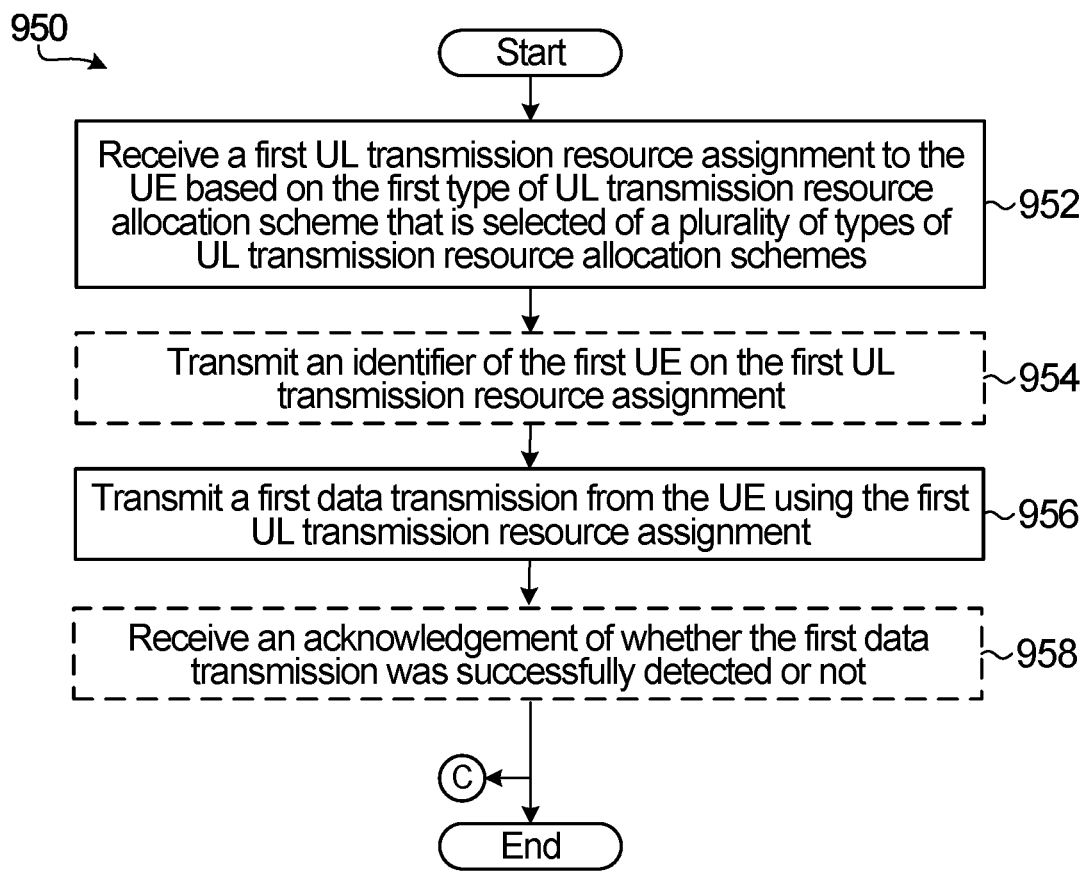
FIG. 9D is a flowchart of a method performed by a UE, according to one embodiment.

Flow chart 950 in FIG. 9D, shows a method for transmitting a first data transmission from a UE using a first resource allocation scheme. Step 952 involves receiving a first UL transmission resource assignment to the UE based on the first type of UL transmission resource allocation scheme that is selected of a plurality of types of UL transmission resource allocation schemes. The reasoning for selection of the first resource allocation scheme is described in detail in the examples above. Step 954 is an optional step, that when performed involves transmitting an identifier of the first UE on the first UL transmission resource assignment. This transmission resource assignment is also described above and may include one or more of broadcast signaling or semi-persistent signaling, using RRC signaling, dedicated RRC signaling, DCI and broadcasting system information. Step 956 involves transmitting a first data transmission from the UE using the first UL transmission resource assignment. Step 958 is another optional step, that when performed, involves receiving an acknowledgement of whether the first data transmission was successfully detected or not.

There are several options for proceeding after step 958 in FIG. 9D. One is simply that the process is completed (END) and a second is to follow the steps shown in FIG. 9E (selection C), which describes a method for changing, for the same UE than selected in FIG. 9D, a different resource allocation scheme.

Figure 9E:
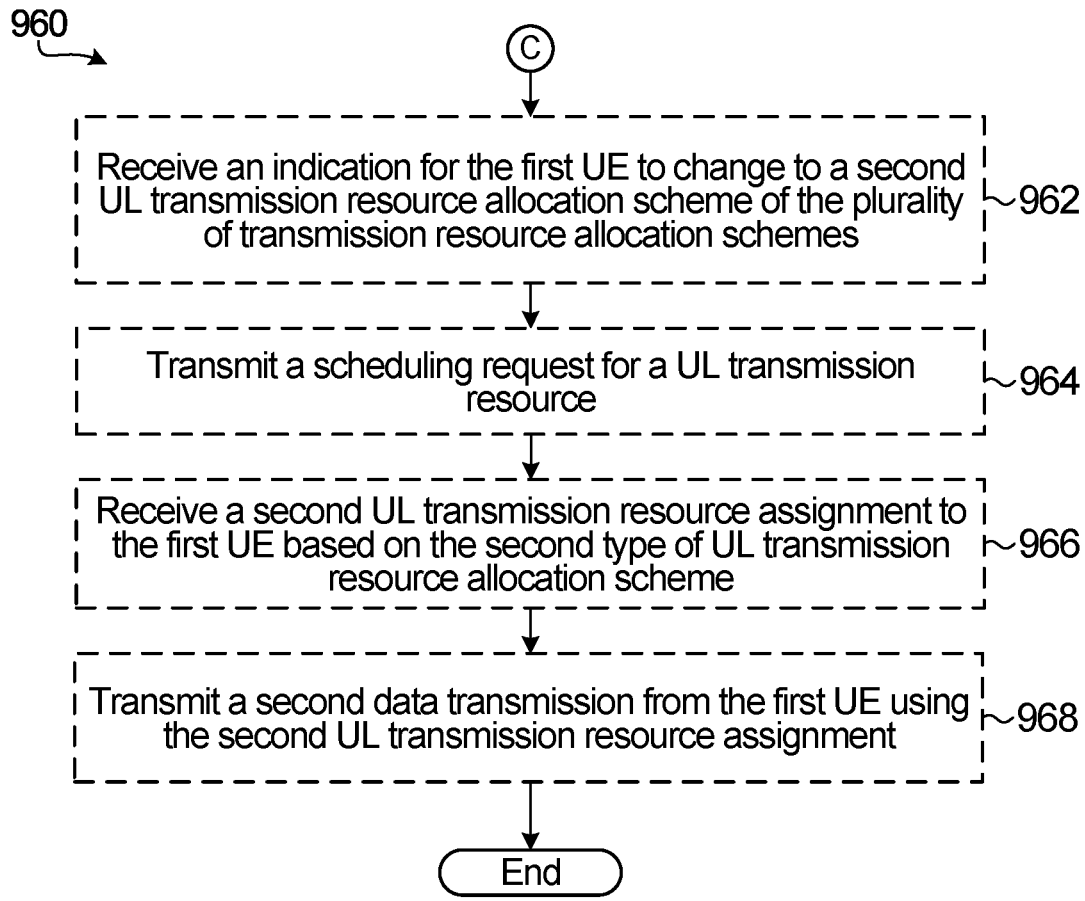
FIG. 9E is a flowchart of another method performed by a UE, according to one embodiment.

Flow chart 960 in FIG. 9E, shows a method for changing, for the same UE than selected in FIG. 9D, a different resource allocation scheme. Step 962 is an optional step, that when performed, involves receiving an indication for the first UE to change to a second UL transmission resource allocation scheme of the plurality of transmission resource allocation schemes. The reasoning for selection of the second resource allocation scheme is described in detail in the examples above. Step 964 is an optional step, that when performed involves transmitting a scheduling request for the UL transmission resource. This transmission resource is also described above and may include one or more of broadcast signaling or semi-persistent signaling, using RRC signaling, dedicated RRC signaling, DCI and broadcasting system information. Step 966 is another optional step, that when performed, involves receiving a second UL transmission resource assignment to the first UE based on the second type of UL transmission resource allocation scheme. Step 968 is another optional step, that when performed, involves transmitting a second data transmission from the first UE using the second UL transmission resource assignment.

Figure 10:
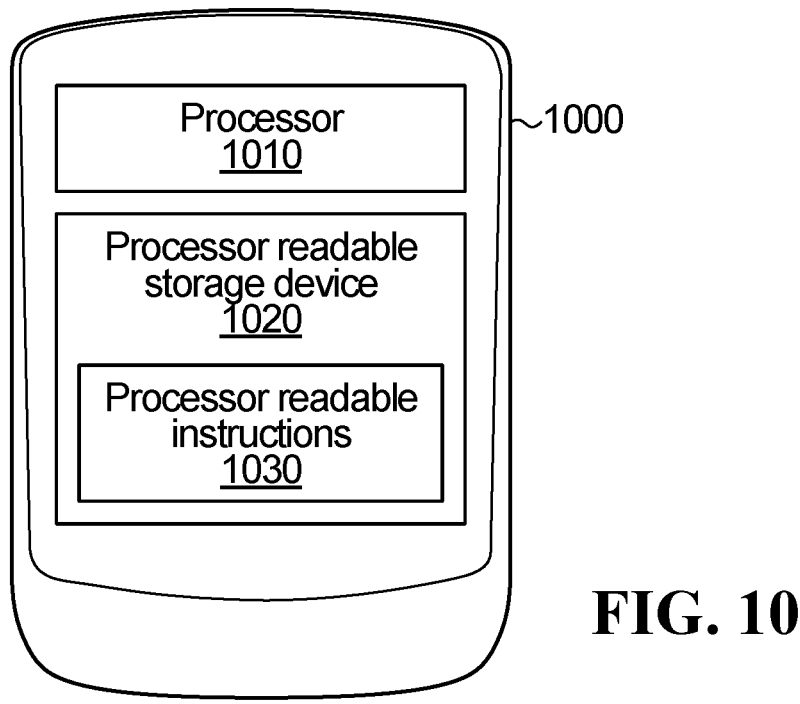
FIG. 10 is a block diagram of an example UE that may be used for implementing embodiments of methods disclosed herein.
Figure 11:
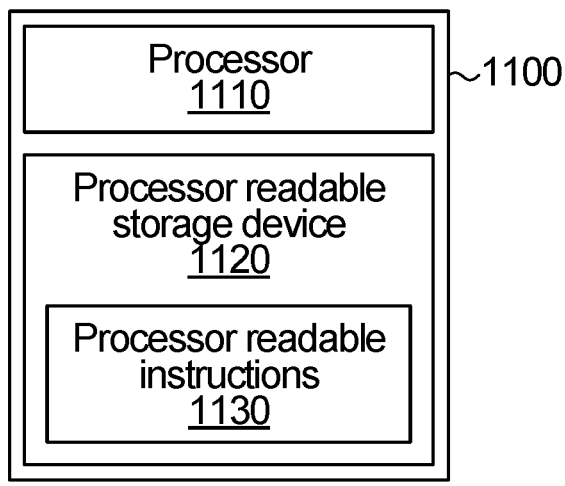
FIG. 11 is a block diagram of a base station that may be used for implementing embodiments of methods disclosed herein.

FIG. 10 is a block diagram of an example apparatus 1000 that operates according to aspects of the application as described herein. The example apparatus 1000 may be a UE and thus may have various elements that would normally be a part of such an apparatus, such as a key pad, display screen, speaker, microphone, etc. The example apparatus 1000 includes a processor 1010 and a processor readable storage device 1020. The processor readable storage device 1020 has stored thereon processor executable instructions 1030 that when executed by the processor cause the processor to perform a method consistent with the methods described above. FIG. 11 is a block diagram of an example network side apparatus 1100 that operates according to aspects of the application as described herein. Such a network side apparatus may include physical structure for performing other network side tasks and be located anywhere within the network that allows the device to operate accordingly. The example apparatus 1100 includes a processor 1110 and a processor readable storage device 1120. The processor readable storage device 1120 has stored thereon processor executable instructions 1130 that when executed by the processor cause the processor to perform a method consistent with the methods described above.

In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

The invention claimed is:

1. A method for data transmission, comprising:
  receiving, by an apparatus from a network device, a first type of uplink (UL) transmission resource assignment, wherein the first type of UL transmission resource assignment supports two types of signalling comprising radio resource control (RRC) signaling or a combination of a RRC signaling and dynamic signaling; and
  sending, by the apparatus to the network device, first data using grant free transmission;
  receiving, by the apparatus from the network device, a second type of UL transmission resource assignment, wherein the second type of UL transmission resource assignment supports dynamic signaling; and
  sending, by the apparatus to the network device, second data using grant based transmission.

2. The method of claim 1, wherein the grant free transmission is a transmission mode without the apparatus receiving scheduling grant for the first type of UL transmission resource from the network device; and
  wherein the grant based transmission is a transmission mode with the apparatus receiving scheduling grant for the second type of UL transmission resource from the network device.

3. The method of claim 1, further comprising:
  receiving, by the apparatus, an UL transmission resource assignment of the second type of UL transmission resource assignment, wherein the UL transmission resource assignment indicates that the apparatus is to be switched to a grant based mode and includes an allocated grant based transmission resource; or
  receiving, by the apparatus, a signal to switch to a grant based mode, and transmitting an UL transmission resource assignment of the second type of UL transmission resource assignment to the apparatus based on a scheduling request, wherein the UL transmission resource assignment indicates an allocated grant based transmission resource.

4. The method of claim 1, further comprising:
  receiving, by the apparatus, a signal to switch to a grant free mode, and receiving an UL transmission resource assignment of the first type of UL transmission resource assignment, wherein the UL transmission resource assignment indicates an allocated grant free transmission resource.

5. The method of claim 1, further comprising:
  transmitting, by the apparatus, the first data from the apparatus as a grant free retransmission using the grant free transmission resource; or
  receiving, by the apparatus, a downlink control information (DCI) grant for retransmission to the apparatus, and transmitting the first data from the UE based on an assigned retransmission resource in the DCI grant.

6. The method of claim 1, before sending, by the apparatus, a first data from the apparatus, further comprising:
  sending, by the apparatus, a preamble, wherein the preamble has a predefined relationship with a user equipment identifier (ID), and the user equipment ID has a predefined relationship with the grant free transmission resource; or
  sending, by the apparatus, a user equipment ID, wherein the user equipment ID has a predefined relationship with the grant free transmission resource.

7. The method of claim 1, further comprising:
  receiving, by the apparatus, a DCI grant or negative acknowledgement (NACK) for retransmission, and transmitting the second data from the apparatus based on an assigned retransmission resource; or
  receiving, by the apparatus, a NACK or an indicator to switch to grant free retransmission mode and grant free retransmission resource, and transmitting the second data as a grant free transmission using the grant free transmission resource.

8. A non-transitory tangible computer readable storage medium storing programming for execution by a processor, the programming including instructions to:
  receive from a network device a first type of uplink (UL) transmission resource assignment, wherein the first type of UL transmission resource assignment supports two types of signalling comprising radio resource control (RRC) signaling or a combination of a RRC signaling and dynamic signaling; and
  send to the network device, first data using grant free transmission;
  receive from the network device, a second type of UL transmission resource assignment, wherein the second type of UL transmission resource assignment supports dynamic signaling; and
  send to the network device, second data using grant based transmission.

9. The non-transitory tangible computer readable storage medium of claim 8, wherein the grant free transmission is a transmission mode without an apparatus comprising the processor receiving scheduling grant for the first type of UL transmission resource from the network device; and
  wherein the grant based transmission is a transmission mode with the UE receiving scheduling grant for the second type of UL transmission resource from the network device.

10. The non-transitory tangible computer readable storage medium of claim 8, wherein the programming includes further instructions to:
  receive an UL transmission resource assignment of the second type of UL transmission resource assignment, wherein the UL transmission resource assignment indicates that a UE comprising the processor is to be switched to a grant based mode and includes an allocated grant based transmission resource; or
  receive a signal to switch to a grant based mode, and transmit an UL transmission resource assignment of the second type of UL transmission resource assignment to the apparatus based on a scheduling request, wherein the UL transmission resource assignment indicates an allocated grant based transmission resource.

11. The non-transitory tangible computer readable storage medium of claim 8, wherein the programming includes further instructions to:
receive a signal to switch to a grant free mode, and receive an UL transmission resource assignment of the first type of UL transmission resource assignment, wherein the UL transmission resource assignment indicates an allocated grant free transmission resource.

12. The non-transitory tangible computer readable storage medium of claim 8, wherein the programming includes further instructions to:
transmit the first data as a grant free retransmission using the grant free transmission resource; or
receive a downlink control information (DCI) grant for retransmission, and transmit the first data based on an assigned retransmission resource in the DCI grant.

13. The non-transitory tangible computer readable storage medium of claim 8, wherein the programming includes further instructions to, before sending the first data:
send a preamble, wherein the preamble has a predefined relationship with a user equipment identifier (ID), and the user equipment ID has a predefined relationship with the grant free transmission resource; or
send a user equipment ID, wherein the user equipment ID has a predefined relationship with the grant free transmission resource.

14. The non-transitory tangible computer readable storage medium of claim 8, wherein the programming includes further instructions to:
receive a DCI grant or negative acknowledgement (NACK) for retransmission, and transmit the second data transmission based on an assigned retransmission resource; or
receive a NACK or an indicator to switch to grant free retransmission mode and grant free retransmission resource, and transmit the second data transmission as a grant free transmission using the grant free transmission resource.

15. A network system, comprising:
a base station communicating with a first user equipment (UE) and a second UE; and
the first UE is configured to:
receive, from the base station, a first type of uplink (UL) transmission resource assignment, wherein the first type of UL transmission resource assignment supports two types of signalling comprising radio resource control (RRC) signaling or a combination of a RRC signaling and dynamic signaling; and
send, to the base station, first data using grant free transmission, wherein the grant free transmission is a transmission mode without the first UE receiving scheduling grant for the first type of UL transmission resource from the base station;
the second UE is configured to:
receive, from the base station, a second type of UL transmission resource assignment, wherein the second type of UL transmission resource assignment supports dynamic signaling; and
send, to the base station, second data using grant based transmission,
wherein the grant based transmission is a transmission mode with the second UE receiving scheduling grant for the second type of UL transmission resource from the base station.

16. The network system of claim 15, wherein the first UE is further configured to:
receive an UL transmission resource assignment of the second type of UL transmission resource assignment, wherein the UL transmission resource assignment indicates that the first UE is to be switched to a grant based mode and includes an allocated grant based transmission resource; or
receive a signal to switch to a grant based mode, and transmit an UL transmission resource assignment of the second type of UL transmission resource assignment to the first UE based on a scheduling request, wherein the UL transmission resource assignment indicates an allocated grant based transmission resource.

17. The network system of claim 15, wherein the second UE is further configured to:
receive a signal to switch to a grant free mode, and receive an UL transmission resource assignment of the first type of UL transmission resource assignment, wherein the UL transmission resource assignment indicates an allocated grant free transmission resource.

18. The network system of claim 15, wherein the first UE is further configured to:
transmit the first data from the first UE as a grant free retransmission using the grant free transmission resource; or
receive a downlink control information (DCI) grant for retransmission to the UE, and transmit the first data from the UE based on an assigned retransmission resource in the DCI grant.

19. The network system of claim 15, wherein the second UE is further configured to:
send a preamble, wherein the preamble has a predefined relationship with a UE identifier (ID), and the UE ID has a predefined relationship with the grant free transmission resource; or
send a UE ID, wherein the UE ID has a predefined relationship with the grant free transmission resource.

20. The network system of claim 15, wherein the first UE is further configured to:
receive a DCI grant or negative acknowledgement (NACK) for retransmission, and transmit the second data from the first UE based on an assigned retransmission resource; or
receive a NACK or an indicator to switch to grant free retransmission mode and grant free retransmission resource, and transmit the second data as a grant free transmission using the grant free transmission resource.

* * * * *